(12) United States Patent
Oledzki

(10) Patent No.: US 7,717,410 B2
(45) Date of Patent: May 18, 2010

(54) SMOOTH NON-LINEAR SPRINGS, PARTICULARLY SMOOTH PROGRESSIVE RATE STEEL SPRINGS, PROGRESSIVE RATE VEHICLE SUSPENSIONS AND METHOD

(76) Inventor: Wieslaw Julian Oledzki, UL. Lipowa 18A M2, Bialystok, 15-427 (PL)

( * ) Notice: Subject to any disclaimer, the term of this patent is extended or adjusted under 35 U.S.C. 154(b) by 636 days.

(21) Appl. No.: 11/590,935

(22) Filed: Oct. 24, 2006

(65) Prior Publication Data

US 2008/0093786 A1   Apr. 24, 2008

(51) Int. Cl.
*F16F 1/18* (2006.01)
(52) U.S. Cl. .................. 267/158; 267/36.1; 267/229
(58) Field of Classification Search ............. 267/36.1, 267/47, 246, 228, 229, 7, 158
See application file for complete search history.

(56) References Cited

U.S. PATENT DOCUMENTS

| 5,322,459 A * | 6/1994 | Spinnato .............. 439/843 |
| 6,530,562 B1 * | 3/2003 | Sutton et al. ............ 267/36.1 |
| 6,530,587 B2 * | 3/2003 | Lawson et al. ......... 280/124.17 |
| 7,322,580 B2 * | 1/2008 | Suzuki et al. ........... 280/5.502 |

* cited by examiner

*Primary Examiner*—Melanie Torres

(57) ABSTRACT

The invention solves the problem of designing and manufacturing springs made of elastic materials, particularly steel springs, with prescribed characteristic (dependence of flex on external load) given by a smooth (i.e. differentiable) non-linear function. The method according to the invention consists in forming an elastic body with suitably shaped regions of diversified stiffness and (possibly) diversified initial internal stresses (this suitable shape of the regions lies at the hart of the invention and is covered by separate patent claims).

13 Claims, 64 Drawing Sheets

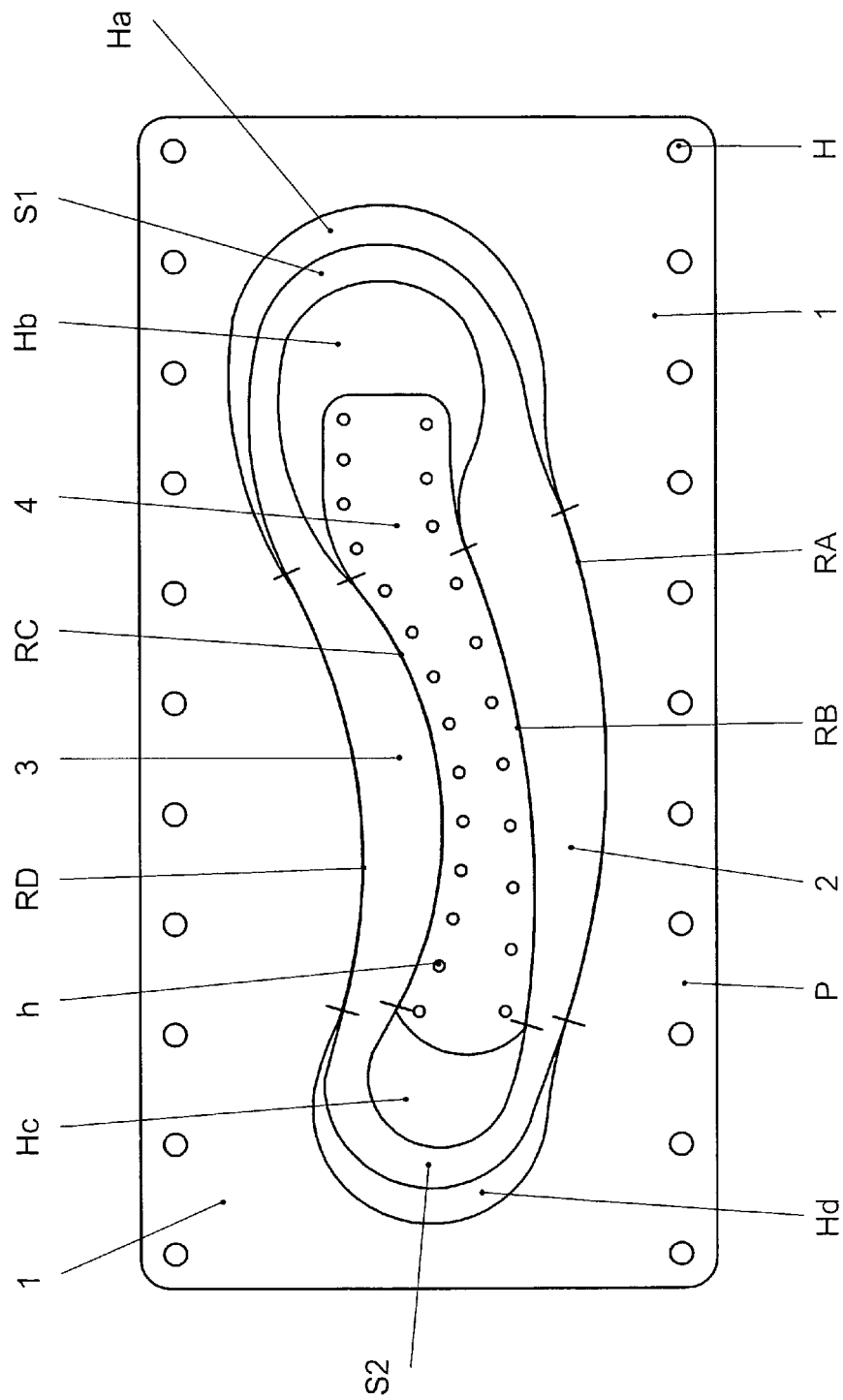

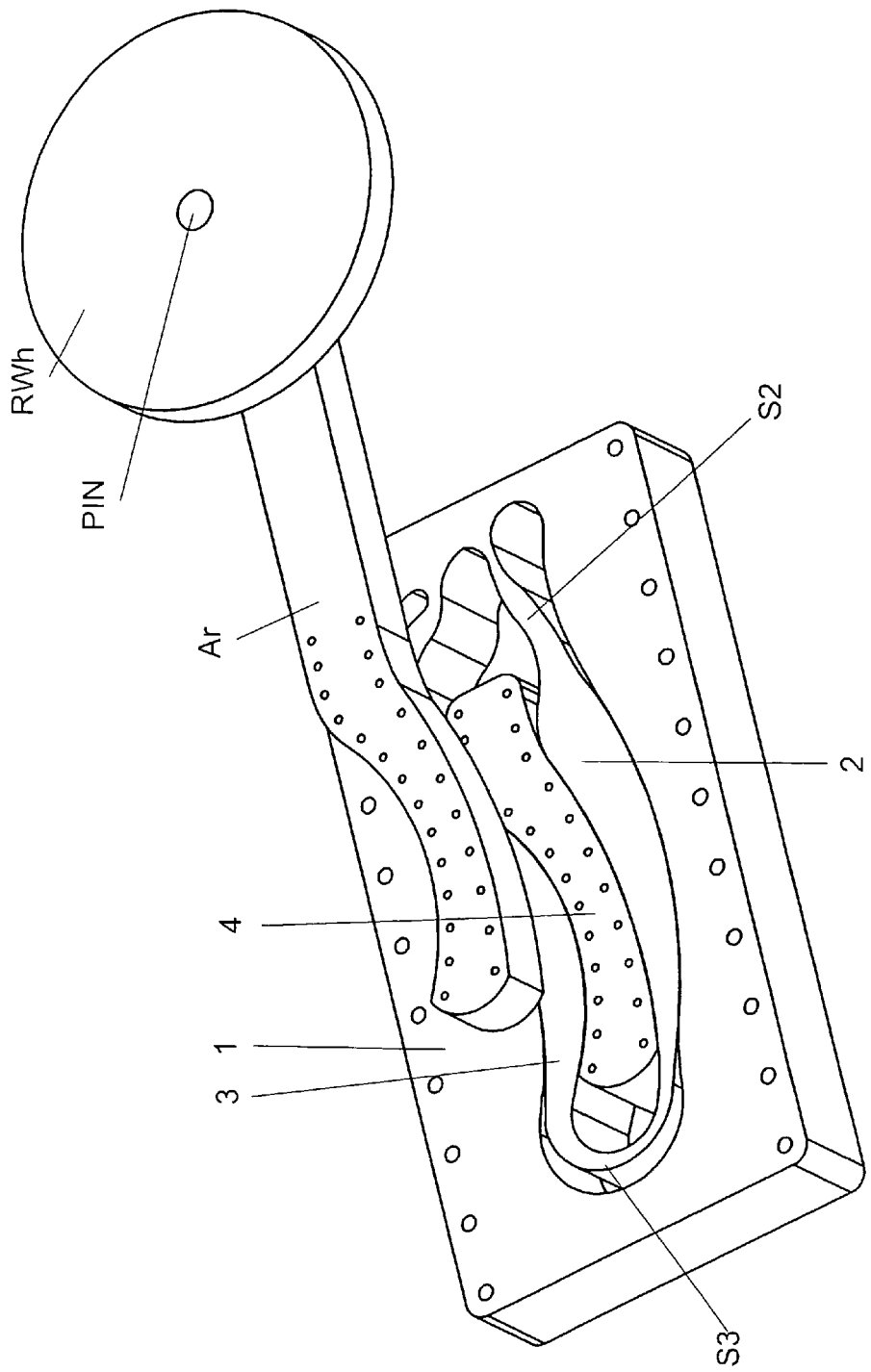

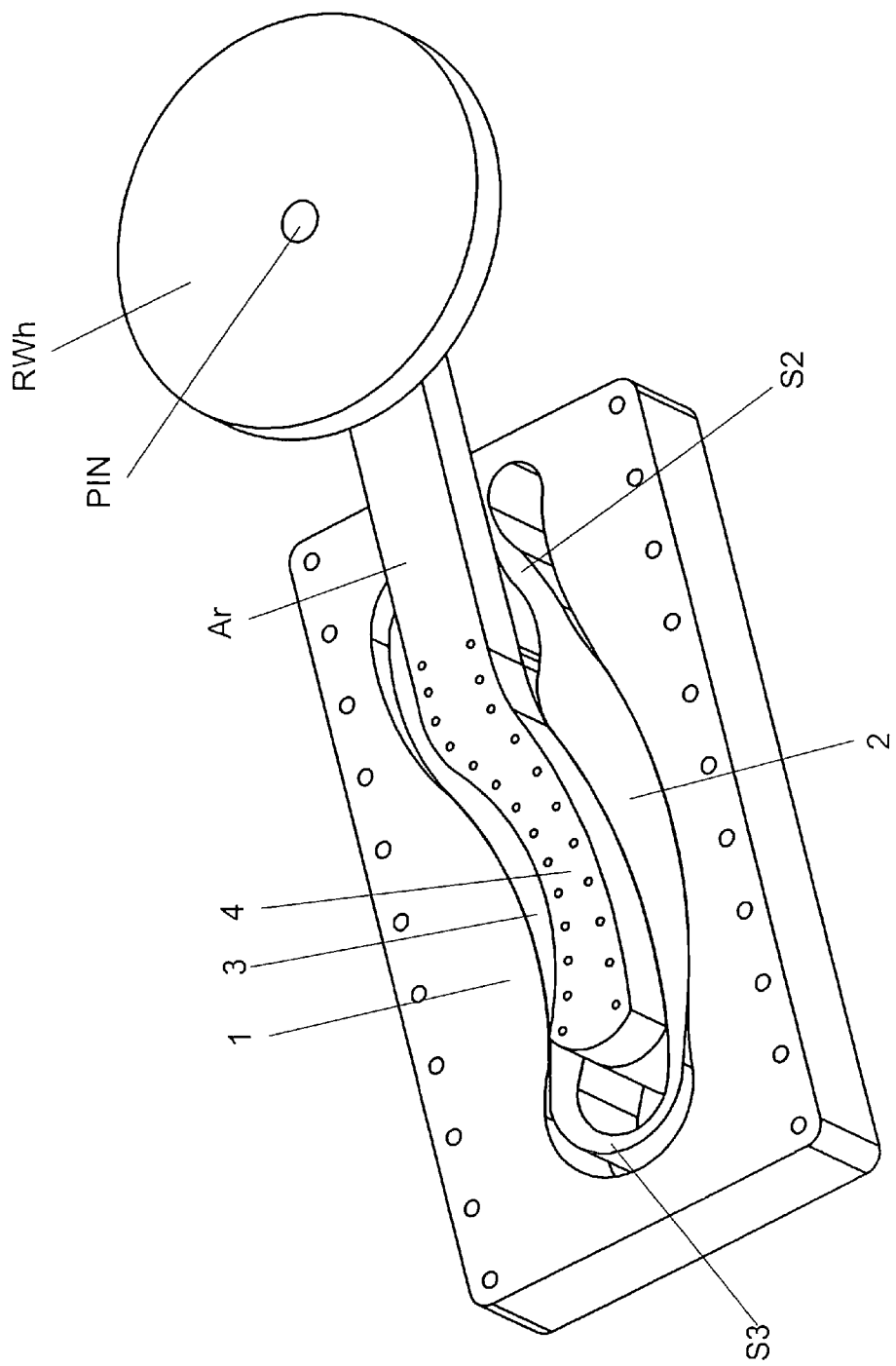

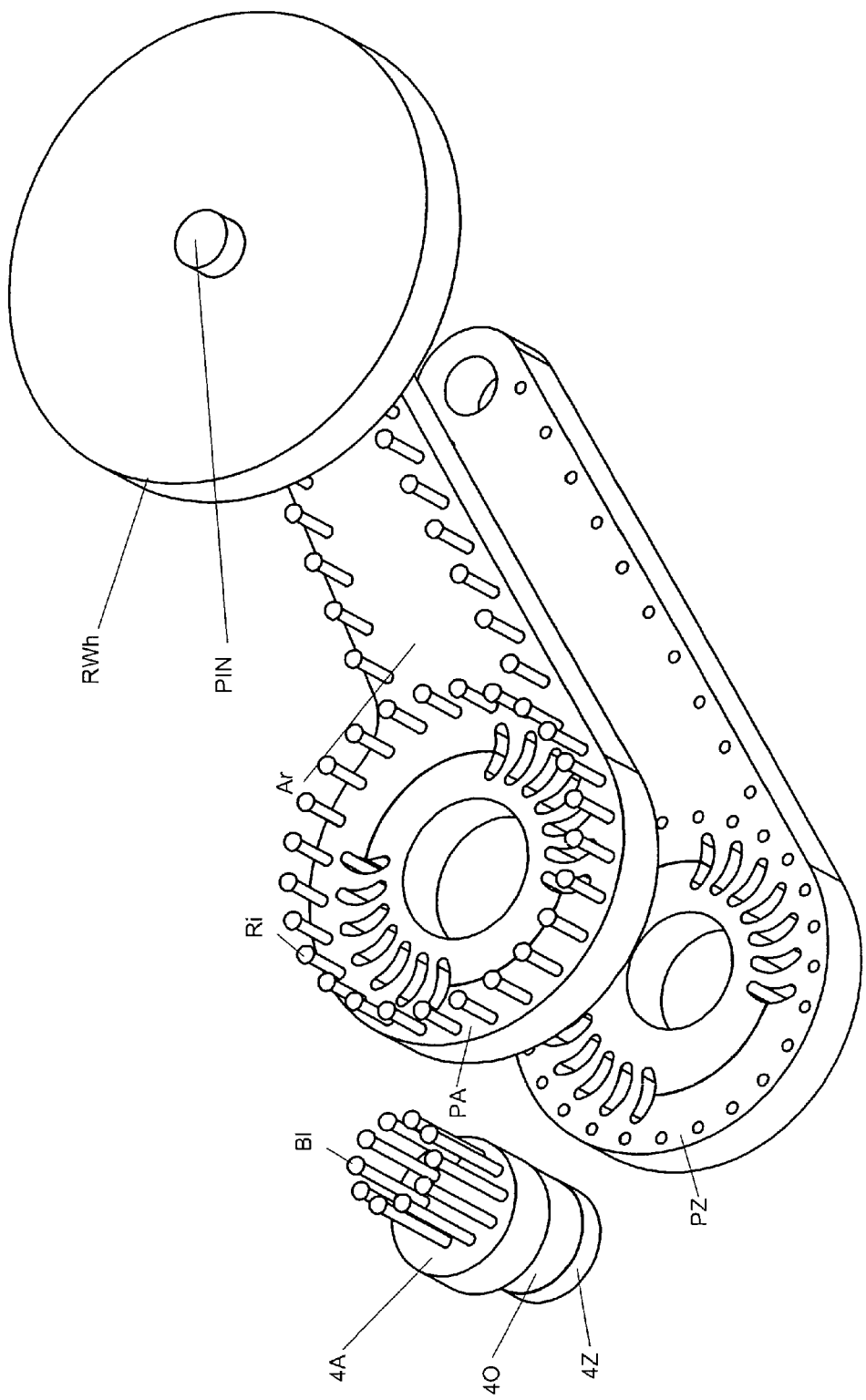

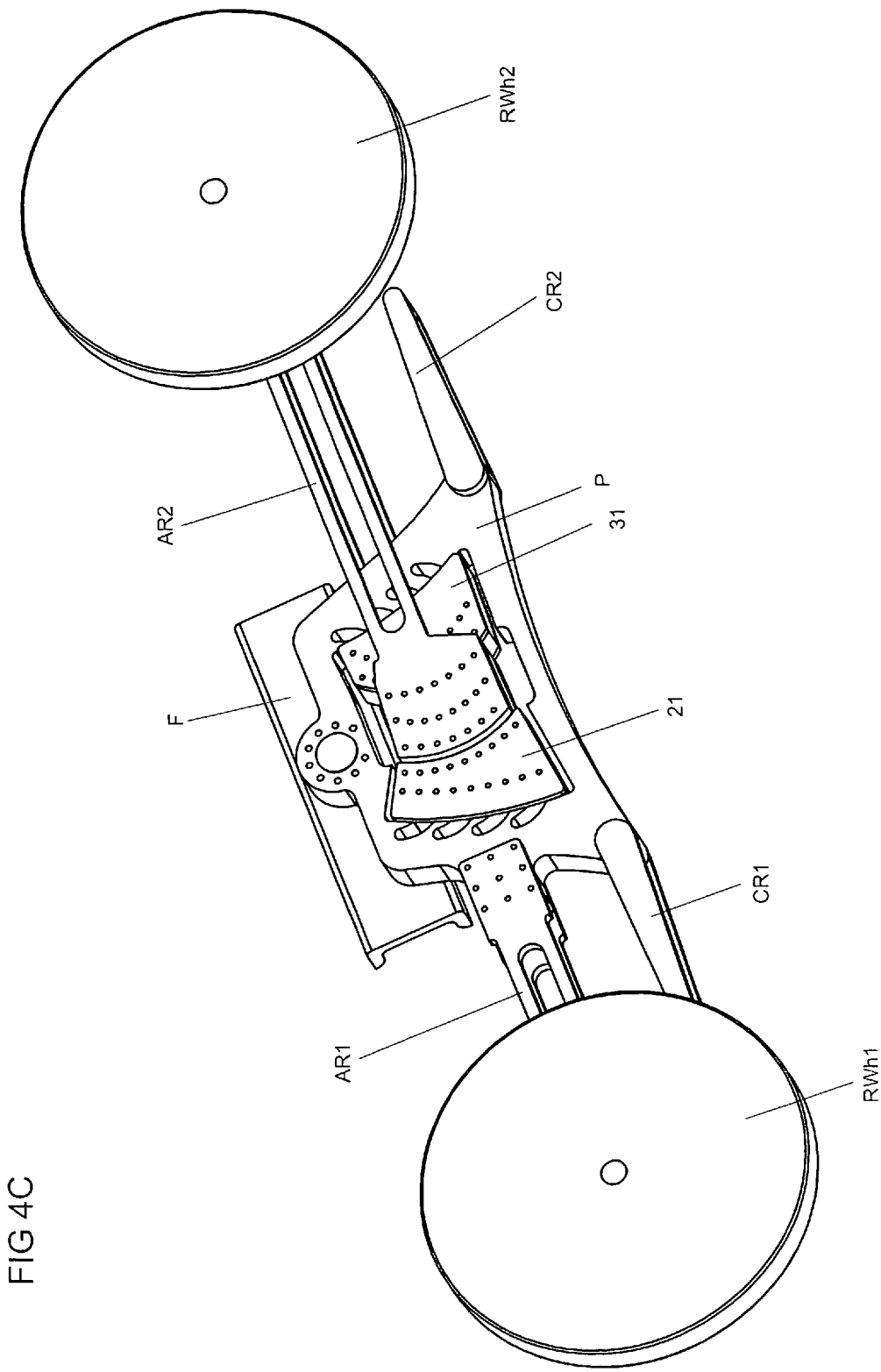

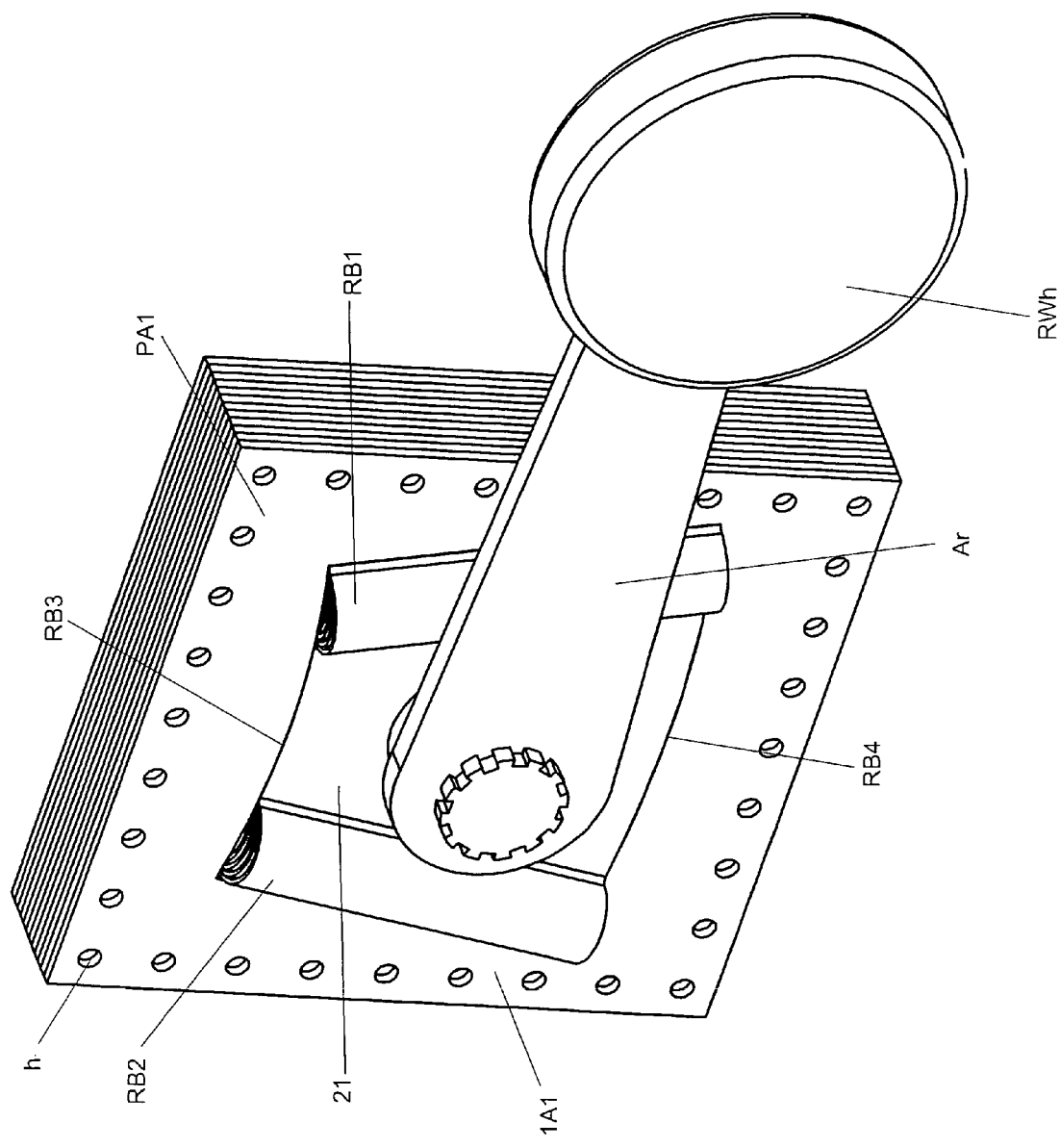

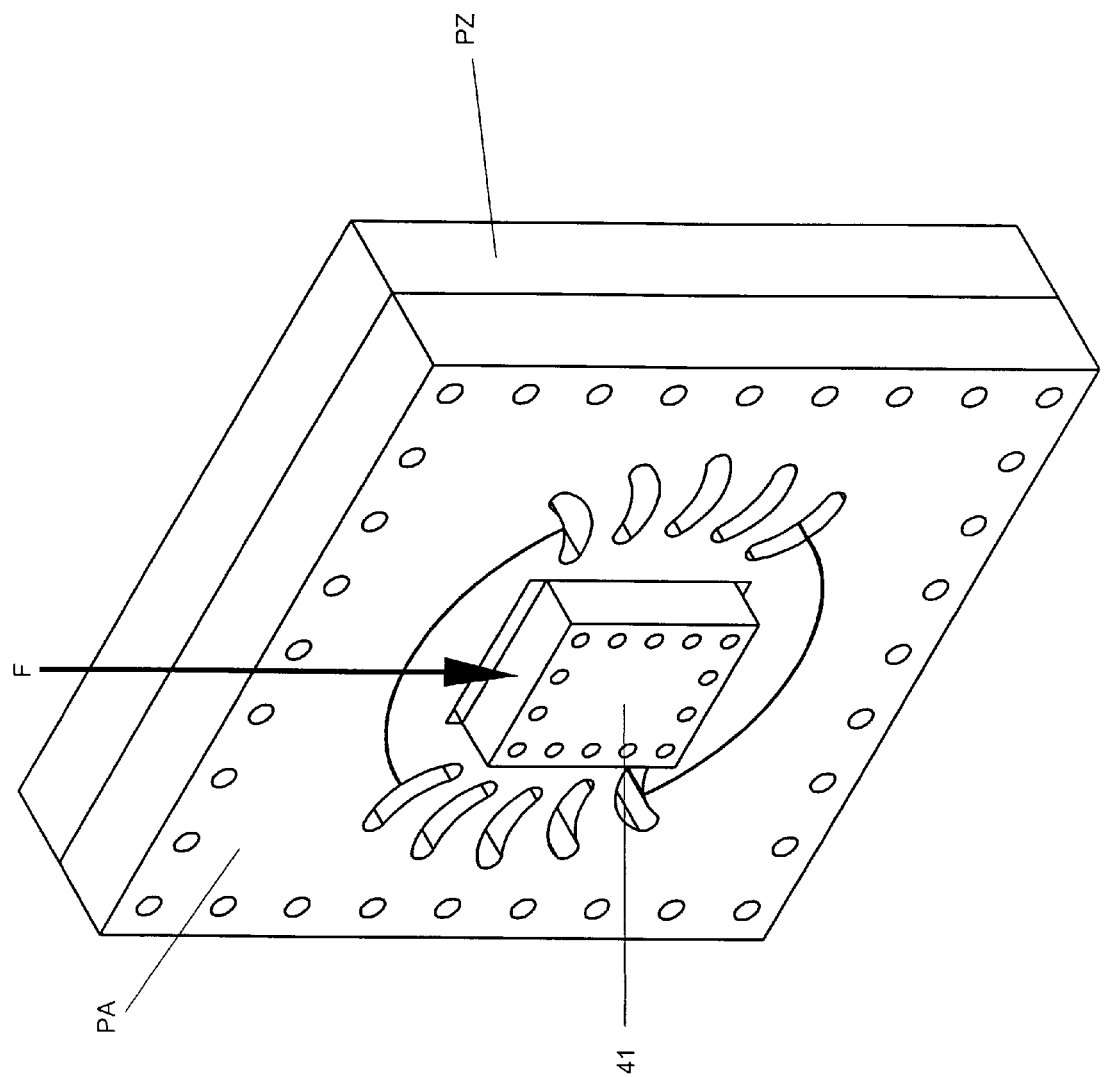

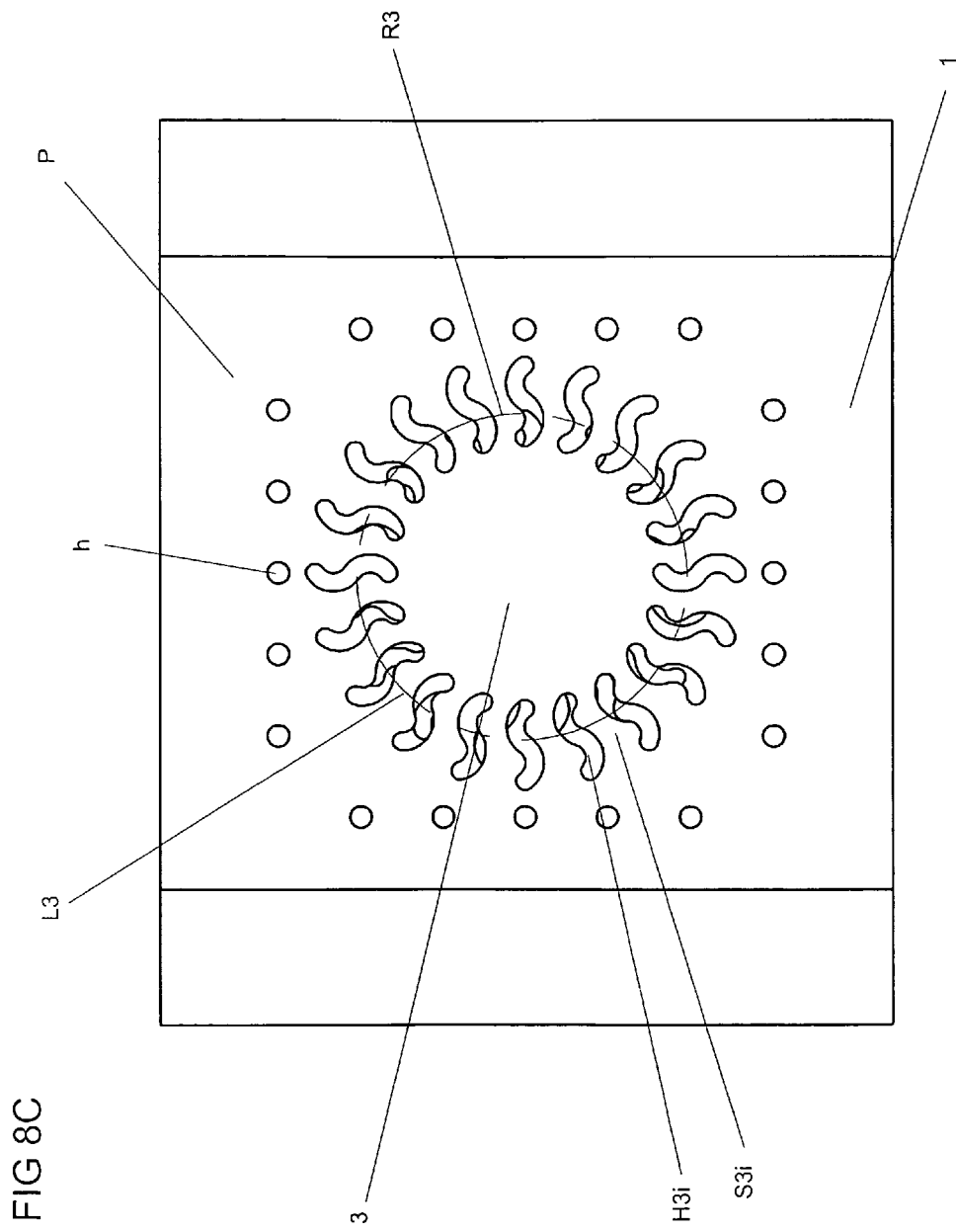

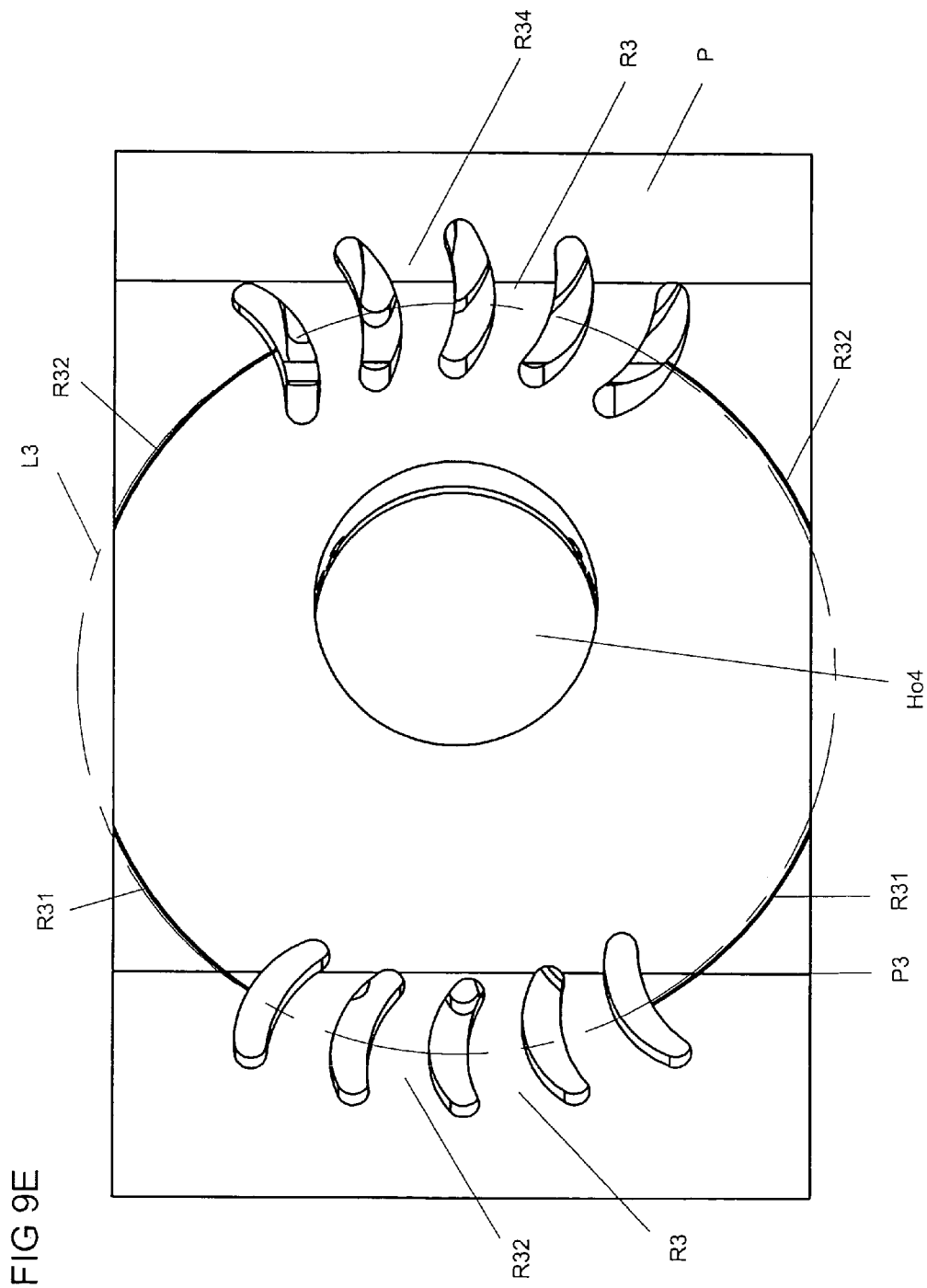

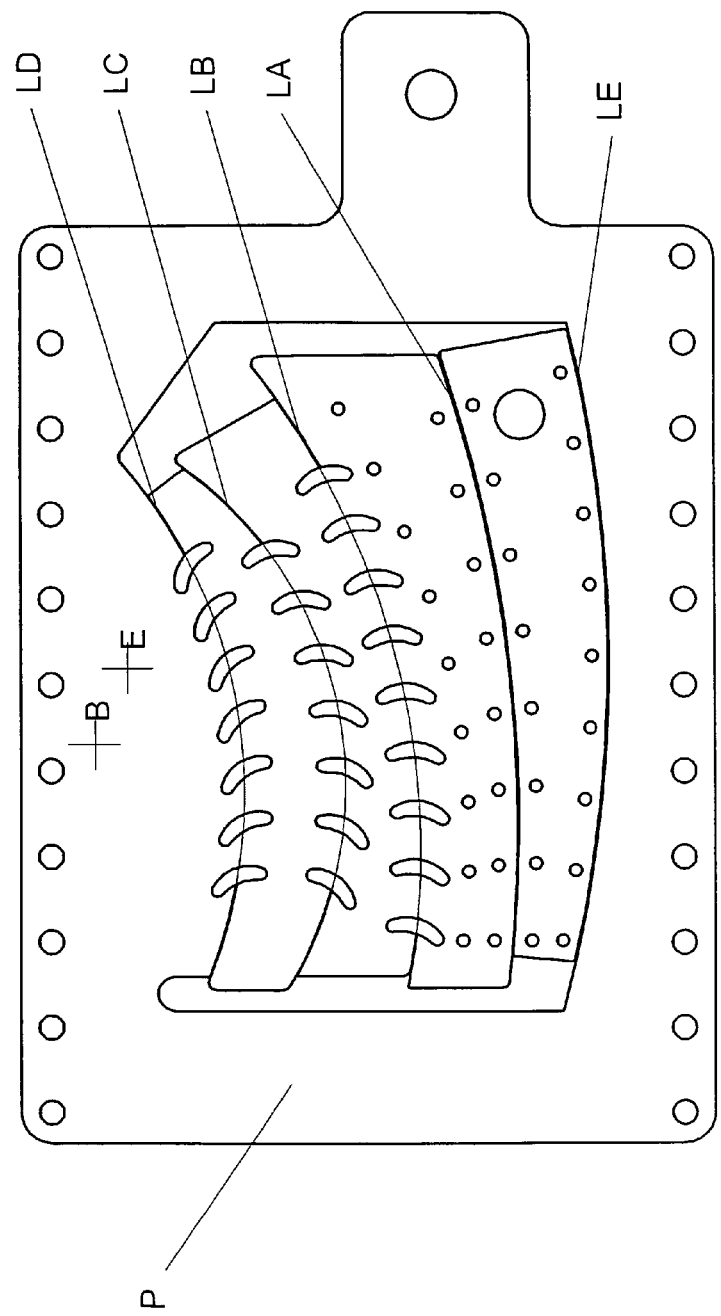

SMOOTH NON-LINEAR SPRINGS, PARTICULARLY SMOOTH PROGRESSIVE RATE STEEL SPRINGS, PROGRESSIVE RATE VEHICLE SUSPENSIONS AND METHOD

TECHNICAL FIELD OF THE INVENTION

The present invention relates to springs and vehicle suspensions, particularly steel springs and suspensions, and is particularly concerned with the problem of obtaining steel springs with differentiable non-linear (progressive) spring rate and vehicle suspensions with optimal damping characteristic. The invention provides springs (particularly steel springs) with highly non-linear differentiable characteristic (dependence of the spring force on the external load), in particular progressive rate steel springs (steel springs the stiffness (spring "constant") of which rises as the external load of the spring rises). The invention also provides a method of producing steel springs with progressive spring rate as well as complete vehicle suspension units utilizing such springs.

STATE OF THE ART AND BACKGROUND OF THE INVENTION

It is well known that progressiveness of the damping characteristic of vehicle suspension is a highly desirable feature that substantially improves shock absorption transmitted from the road wheels to the body of a vehicle. It is also well known that progressive rate vehicle suspensions with smooth (i.e. differentiable) damping characteristic commonly in use are pneumatic and hydro-pneumatic ones. However, these suspensions are inferior to steel ones in many aspects such as strength, durability, reliability and cost, and their damping characteristic, being determined by the thermodynamic properties (adiabatic exponent) of the gas (air or nitrogen) they utilize, cannot be freely adjusted and is far from optimum.

There are also some progressive rate vehicle suspensions fitted with steel springs, but they usually feature inferior non-differentiable damping characteristic.

The problem of constructing purely mechanical steel progressive rate vehicle suspension has been undertaken by many inventors (see U.S. Pat. Nos. 3,157,394, 4,010,941 and International Publication WO-A-96 11815 of the International Application PCT/CA 95/00570), but none of such suspensions proposed in the past was a success. This is due to the fact that those suspensions used unreliable and perishable cam mechanisms to achieve required non-linearity of damping characteristic.

Recently, a very satisfactory solution to the problem of achieving progressive steel vehicle suspension was proposed (U.S. Pat. No. 6,851,690, European Patent 1,210,236, HK Patent 1,033,149, Polish Patent 192,322). This suspension uses an innovative, extraordinarily robust and compact 4-link mechanism (the strongest mechanism in existence) and is capable of producing very favorable progressive rate differentiable damping characteristic out of linear characteristic of ordinary (e.g. steel) springs of any kind. Moreover, the damping characteristic can be freely shaped and adjusted to any specific requirements (in particular suspension with optimal exponential-like damping characteristic can be constructed).

However, achieving steel springs with differentiable progressive spring rate (by a method as simple as possible) is still of great interest, as applying such springs in vehicle suspensions would result in simpler, lighter, more compact and cheaper vehicles. Moreover, progressive rate springs could find many other applications (aircraft landing gears, foundations of heavy machines (hammers, presses, engines) with highly improved vibrations damping capability, buffers with improved energy absorbtion capability, earth quake-proof building foundations etc.).

Some non-linear (progressive) rate steel springs, e.g. coil and leaf springs, are well known from the prior art, however these springs are far from being completely satisfactory. Progresiveness of coil springs is achieved e.g. by altering the tightness of a coil's winding: first few windings of progressive coil spring are made tighter (and therefore of smaller stiffness), and then spaced wider (and therefore stiffer). This assures only unsatisfactory discrete (approximately) change of the spring rate. Namely, as a rising force is loading the spring, first both the tighter and wider spaced coils are being compressed simultaneously and the spring displays a (smaller) spring rate resulting from the spring rates of these two types of its coils. Only after the tighter coils have completed their movement (as the force is still rising) and only the wider spaced coils of the spring have remained active, the spring starts to display increased stiffness (greater spring rate). Another method of making coil springs progressive is to give them conical shape. This method also provides springs with unsatisfactory characteristic, which is not differentiable (essentially, the discussion above applies also in this case).

Also leaf springs can be made non-linear) progressive. Commonly, this is achieved by applying a number of in turn activating leafs or by altering the effective spring length (using suitably shaped surfaces supporting the ends of the leaf spring). Again, these methods of achieving progressiveness of steel springs are well known to be not satisfactory.

There are also some patented methods of making leaf springs progressive. Some of them utilize dependence of the leaf spring rate on its effective length (e.g. U.S. Pat. No. 6,435,485, GB Patents 1,245,636 and 2,135,752, DE Patent 3,431,793, also US Patent Application Publications US 2002/0167121 and US 2003/0122293). Another method, provided by GB Patents 1,212,411 and 1,212,412 granted to Ford Motor Company Limited, utilizes dependence of the leaf spring rate on the longitudinal tensile loads (there are some other later patents based on the same idea). Yet another method of achieving progressiveness of leaf spring is known from JP Patent 55,112,436. In principle, the method provided by this patent is also based on dependence of the leaf spring rate on the longitudinal tensile loads, only the method of generating tensile loads in the leaf spring differs from that provided by GB Patents 1,212,411 and 1,212,412.

Another kind of non-linear springs well known from prior art are springs made of elastic bodies, usually assuming general shape of solid cylinder or cylindrical pipe, with elastic portions formed between slits cut in said elastic bodies (see U.S. Pat. No. 5,062,619 granted to Masahide Sato and References cited in this Patent). The non-linearity of the spring characteristic is obtained by varying elasticity of said elastic portions. This resembles the situation met with in the case of coil springs, the tighter and wider spaced coils of which can be compared to the portions with varying elasticity, and the discussion of the work of non-linear coil springs presented above applies almost literarily also to these springs. Consequently, the characteristic of the spring in question is not differentiable (it is piecewise linear). In particular, the spring with exponential-like characteristic cannot be produced by this method, and the variety of spring characteristics achievable in this way is surely limited, thus preventing springs of this type from being optimized for given application. Moreover, there is no algorithm for designing the characteristic of such springs, which therefore is to be determined experimentally, which substantially increases cost.

Springs with non-linear characteristic, which are typically made of spring steel by cold forming (e.g. stamping) or by bringing it into a stressed condition and then rendering a portion of the spring substantially stress-free by local heat treatment are also known from prior art (see GB Patent 1,550,877). However these springs have very special characteristic that can be hardly predicted and designed and range of applications of them is limited (they are used e.g. in snap-switches).

The invented method differs from these known from prior art (see for example U.S. Pat. No. 5,062,619 and GB Patent 1,550,877) in that it enables producing non-linear springs with precisely predictable (unlike the springs of GB Patent 1,550,877) and smooth (unlike the springs of U.S. Pat. No. 5,062,619) characteristic.

Let us also note that known vehicle suspensions are relatively complex and expensive and some of them (e.g. those utilizing leaf springs) are bulky and heavy, and making vehicle suspension simpler lighter and cheaper is undoubtedly an important task.

Thus there is a need for lightweight springs with variable (progressive) spring rate depending differentiably on external load applied to the spring and capable of being adjusted to any specific requirements, as well as there is a need for lightweight vehicle suspensions of simple structure utilizing such springs. There is also a need for an effective method for designing (algorithm) and manufacturing such springs (with any pre-assigned characteristic) and suspensions.

SUMMARY OF THE INVENTION

It is therefore an object of the present invention to provide lightweight springs made of elastic material, particularly steel springs, with variable (progressive) spring rate and non-linear smooth characteristic capable of being adjusted to any specific requirements.

Another object of the invention is to provide an effective method (algorithm) for designing smooth non-linear springs having prescribed characteristic with satisfactory precision.

Yet another object of the invention is to provide an effective method for manufacturing smooth non-linear springs (in particular steel springs) with the prescribed characteristic with satisfactory precision.

Yet another object of the present invention is to provide springs made of elastic material, particularly steel springs, with variable spring non-linear smooth characteristic capable of being adjusted to changing conditions (e.g. for suspensions of vehicles destined to move both on and off road while carrying varying loads).

Yet another object of the invention is to provide lightweight vehicle suspensions of simple structure utilizing such springs.

For the purposes of this patent specifications and all the appended patent claims we make the following definitions:

DEFINITION 1. By the region with decreased (respectively increased) stiffness (decreased, respectively increased coefficient of elasticity) in an elastic solid body is understood any region R of this body that satisfies the following condition C (respectively C'):

C. When the body is loaded with some fixed external loads and therefore is deformed, the average mutual displacement of the points of the body within the region R is greater than the average mutual displacement of the points of the body within some other region of said body.

C'. When the body is loaded with some fixed external loads and therefore is deformed, the average mutual displacement of the points of the body within the region R is smaller than the average mutual displacement of the points of the body within some other region of said body.

(By the mutual displacement of two points A and B of an elastic solid body is understood the change of the ordinary Euclidean distance between the points A and B).

DEFINITION 2. By the elastic solid body with regions of diversified stiffness (elasticity) is meant any elastic solid body with a number of regions of decreased stiffness (and therefore a number of regions of increased stiffness). It is to be stressed that said regions in the elastic body need not to be boldly distinguished by any means for the body to fall within this definition (in particular this definition allows for vague limits of the regions).

DEFINITION 3. By the region with decreased (respectively increased) initial internal stresses in an elastic solid body is understood any region R of this body that satisfies the following condition C1 (respectively C1'):

C1. When no external loads are applied to the body, the average internal stresses of any kind (e.g. tensile, torsional, compressive, or any combination of these) within the region R are smaller than the average internal stresses of the same kind in some other region of said body.

C1'. When no external loads are applied to the body, the average internal stresses of any kind (e.g. tensile, torsional, compression, or any combination of these) within the region R are greater than the average internal stresses of the same kind in some other region of said body.

DEFINITION 4. By the elastic solid body with regions of diversified initial internal stresses is meant any elastic solid body with a number of regions of decreased initial internal stresses (and therefore a number of regions of increased initial internal stresses).

DEFINITION 5. By the smooth non-linear spring, or the spring with non-linear (and smooth i.e. (infinitely) differentiable) characteristic (or the spring with smoothly variable spring "constant"), is understood any spring (elastic solid body) made of an elastic solid material, the characteristic (dependence of the spring flex on the external load applied to the spring) of which is substantially non-linear and smooth.

By the smooth progressive spring is meant a smooth non-linear spring which is progressive, i.e. a smooth non-linear spring the spring constant of which rises with the spring deflection.

In particular, a spring (e.g. Belleville spring) with virtually linear characteristic, only a small portion of which (usually not utilized during normal operation process) is non-linear is not a spring with non-linear characteristic in the sense of Definition 5. The spring described in U.S. Pat. No. 5,062,619 is not the spring with non-linear and smooth characteristic.

The invention is based on the following four fundamental observations:

Observation 1

The magnitude of the change of strain of an elastic solid body, subjected to external loads of changing absolute value but substantially constant direction, corresponding to given magnitude of the change of the external load may depend smoothly (differentiably) on the absolute value of the load, provided that suitable (see below for a more precise description) regions of lower stiffness and regions of higher stiffness are formed in said elastic body, or suitable regions of lower initial internal stresses and regions of higher initial internal stresses are formed in said elastic body, or regions of both types are formed in the elastic body.

Observation 2

The stress pattern within elastic body subjected to external loads of changing absolute value but substantially constant direction may vary smoothly (differentiably) with the change of the external load, provided that suitable regions of lower stiffness and regions of higher stiffness are formed in said elastic body, or suitable regions of lower initial internal stresses and regions of higher initial internal stresses are formed in said elastic body, or regions of both types are formed in the elastic body.

Observation 3

Tensile, compression, torsional or flexural stiffness of spring, subjected to external loads of changing absolute value but substantially constant direction, may vary differentiably (e.g. may rise (differentiably) as the external load (of constant direction) rises) with the change of the magnitude of the external load, provided that suitable regions of lower and higher stiffness or regions of suitably chosen pattern of initial internal stresses or regions of both these types are formed in said spring.

Conclusion

It is a common consequence of any of the Observations 1-3 is that dependence of the absolute value of the vector of spring reaction force of given direction on the strain of the spring can be made non-linear and smooth.

Observation 4

The characteristic of the smooth non-linear spring with regions of diversified stiffness can be made precisely predictable and can be precisely designed so as to approximate any desired characteristic with satisfactory precision, provided that suitable regions of lower and higher stiffness or regions of suitably chosen pattern of initial internal stresses or regions of both these types are formed in said spring.

The spring of this type can be manufactured using standard techniques so as to obtain the desired spring characteristic with satisfactory precision.

See the Remarks and the description of Main Procedure below for a more detailed discussion.

Conclusion

Springs with any required non-linear smooth (infinitely differentiable) characteristic (i.e. smooth non-linear springs, in particular smooth progressive rate springs in the sense of Definition 5 above) could be produced by suitably forming elastic material of the spring.

REMARK. There are many methods for forming elastic bodies with regions of different stiffness (elasticity) and/or different initial internal stresses. For example, such (homogeneous) bodies can be formed by decreasing the stiffness of certain regions of an elastic body by mechanical machining (e.g. cutting holes), heat treatment, chemical treatment or any combination of these methods. Initial internal stresses in some regions of an elastic body can be formed by deforming some regions of the body beyond the elasticity limit by exerting on some regions of the body suitable forces (e.g. forces of direction opposite to or concordant with the direction of forces loading the body during operation process) e.g. by compressing or bumping or/and bending. An elastic body of this type (inhomogeneous) also can be formed by joining elastic bodies of different stiffness (more precisely, different coefficients of the tensor of elasticity). All these methods are applicable in the method of the present invention.

Thus the essence of the method of producing smooth progressive rate springs with any prescribed characteristic, particularly smooth progressive steel springs, according to the present invention consists in forming in an elastic body (typically plate of spring steel) suitable regions of decreased stiffness e.g. by cutting holes (laser or wire cutting is preferable, but any method of precise cutting, e.g. plasma or waterjet (e.g. abrasive) cutting can be applied), or by stamping, or heat treatment, or deep drawing, or chemical treatment, or combination of these methods.

Besides this principal step, the method according to the present invention can comprise at least one of the following two steps (having impact on the spring characteristic):

1. The step of increasing stiffness of some other regions of the spring e.g. by attaching to the spring suitably formed elements (e.g. by riveting or screwing down) of great stiffness.
2. The step of forming regions of diversified patterns of initial internal stresses in the spring.
3. The step of providing means for changing characteristic of the spring (e.g. attaching hydraulic or pneumatic motor to the spring to change configuration of the regions of diversified stiffness and/or internal stresses within the spring).

For practical applications, it is of highest importance to have a method (algorithm) for designing and producing springs having precisely defined characteristic. The invention touches upon also this problem, and provides a method of designing and producing progressive springs, in particular progressive steel springs, of precisely predictable smooth characteristic (see Main Procedure below).

The method according to the present invention can comprise also some additional steps not directly related to achieving non-linear characteristic of the spring, e.g. the step of additional heat treatment or/and the step of finishing (e.g. polishing).

The method of producing complete vehicle suspension units utilizing said progressive rate springs is also within the scope of the present invention. This method includes the method of producing progressive rate springs according to the present invention as described above and comprises the step of attaching to the spring additional elements to hold vehicle's axle or to attach the suspension unit to vehicle's frame, or additional elements intended to do the job of friction damper.

Thus the invention provides a method for designing and producing smooth progressive rate springs (in particular smooth progressive steel springs), also springs with adaptable spring characteristic, utilizing only standard computer software, machines and processes, which is therefore simple and inexpensive.

Exhaustive discussion of how the regions of lower and higher stiffness in elastic body should be formed in order to achieve smooth progressiveness of the spring rate is beyond the patent specification thus will not be presented here (this requires some theory of elasticity and lengthy computations), rather some examples of most practical springs according to the present invention (as well as the method for designing and producing them) will be presented in detail.

In general, the most effective method for designing and producing smooth progressive rate spring with a prescribed characteristic according to the invention is the following procedure (called Main Procedure) comprising four, five or six principal steps:

Main Procedure (a) Taking a suitable plate made of an elastic material (e.g. high strength spring steel used to fabricate Belleville springs).

(b) Suitably choosing four points, say A, B, C, D, in the plane of the plate; any of the points A, B, C, D may be positioned in the plate or outside the plate; one of the points may be placed at infinity. Position of the points is determined using appropriate mathematical formulas so as to achieve the required spring characteristic with satisfactory precision (see Remarks below).

(c) Drawing in the plate four circular arcs LA, LB, LC and LD with centers at the points A, B, C, and D respectively. The arcs LA, LB, LC and LD should be suitably spaced (separated one from another).

(d) Forming in the plate four regions RA, RB, RC and RD of decreased stiffness e.g. by any method mentioned above; the regions RA, RB, RC and RD are placed substantially along the arcs LA, LB, LC and LD respectively; the regions RA, RB, RC and RD should be boldly separated.

For certain purposes, e.g. obtaining springs with adaptable spring characteristic (i.e. springs the characteristic of which can be changed) a more elaborate variant of Main Procedure may be needed.

Main Procedure 1

(a) Taking a suitable plate made of an elastic material (e.g. high strength spring steel used to fabricate Belleville springs).

(b) Suitably choosing five points, say A, B, C, D, and E in the plane of the plate; any of the points A, B, C, D, E may be positioned in the plate or outside the plate; one of the points may be placed at infinity. Position of the points is determined using appropriate mathematical formulas so as to achieve the required spring characteristic with satisfactory precision (see Remarks below).

(c) Drawing in the plate five circular arcs LA, LB, LC, LD and LE with centers at the points A, B, C, D and E respectively. The arcs LA, LB, LC, LD and LE should be suitably spaced (separated one from another).

(d) Forming in the plate four regions RA, RB, RC, RC and RE of decreased stiffness e.g. by any method mentioned above; the regions RA, RB, RC, RD and RE are placed substantially along the arcs LA, LB, LC, LD and LE respectively; the regions RA, RB, RC, RD and RE should be boldly separated. Note that by forming the regions RA, RB, RC, RD and RE of decreased stiffness some regions R1, . . . , Rn of relatively large stiffness are also formed in the plate of the spring.

In addition to the principal steps (a), (b), (c) and (d) the method of producing progressive rate spring according to the invention may comprise at least one of the following two additional steps:

(e) Forming suitably shaped additional elements of large stiffness and suitably attaching (e.g. by riveting) these elements to the regions of the plate of larger stiffness (i.e. the regions of the plate in question, the stiffness of which wasn't decreased in Step (d)).

(f) Introducing in at least one of the regions RA, RB, RC and RD (and RE in the case of Main Procedure 1) initial internal stresses e.g. by applying to the plate forces (e.g. in directions concordant with the directions of forces loading the spring during operation process or in the opposite directions) so as to deform the regions (of decreased stiffness) in question beyond the elasticity limit.

(g) Attaching to the spring a hydraulic, pneumatic or electric motor to change spring characteristic (in the case of Main Procedure 1). To be more precise, one end of the hydraulic motor should be fastened to one of the regions R1, . . . , Rn of large stiffness and the other end of the hydraulic motor should be fastened to another region of large stiffness (see Examples 11 and 12 in the paragraph Detailed description of preferred embodiments).

The following remarks concerning the method described above and the spring obtained by this method are of particular importance.

REMARK 1. Many various patterns of regions of diversified stiffness in the material of the spring, not necessarily coming from Main Procedure, can be applied to obtain non-linear smooth characteristic of the spring, however the required specific characteristic of the spring may be hard to obtain due to complicated dependence of the characteristic on various parameters of the regions.

REMARK 2. In order to produce a spring with the prescribed characteristic by altering stiffness of various places of the spring, it is necessary to understand the influence of these alterations on the spring characteristic. Thus a mathematical model of this dependence is needed, and it is highly desirable that this model be as simple as possible.

REMARK 3. The method of altering stiffness of the spring alluded to above should be acceptable for industry in order to be of any practical value.

REMARK 4. A method of forming clearly separated regions of various stiffness in an elastic body rather than just an elastic body of diversified stiffness substantially facilitates obtaining the required characteristic of the spring at both the stages of designing (simple discrete models can be applied) and manufacturing (simple software for CAM processes, standard machines and manufacturing technology) (this is the reason, for which we use in this patent specification the notion of "elastic body with regions of diversified stiffness" (Definitions 1 and 2) rather than the notion of "elastic body of diversified stiffness").

REMARK 5. General form of the characteristic (spring reaction force as a function of deflection of the spring) of the spring obtained by applying Main Procedure depends mainly on the relative position of the points A, B, C, and D. Dependence of the spring characteristic on the position of the points A, B, C, D is well understood, and there are mathematical formulas describing this dependence. These formulas can be used to determine the position of the points A, B, C and D so as to obtain the spring with characteristic of the (substantially) required shape (this can be done on computer using only standard software). The same formulas can be used in CAM process of producing springs.

REMARK 6. Given relative position of the points A, B, C, D and a fixed material strength and plate thickness, the (changing) spring stiffness (varying spring constant) at any particular point of the spring characteristic depends on the particular shape and dimensions (in particular radius and length of the arcs LA, LB, LC and LD) of the regions RA, RB, RC and RD substantially via the global stiffness (coefficient of elasticity of the whole region) of these regions (shape and dimensions of the regions clearly determine the stiffness of these regions).

REMARK 7. Global stiffness of any of the regions RA, RB, RC and RD influences the spring stiffness and the general shape of the spring characteristic. Dependence of the spring characteristic (including its varying spring constant) on the global stiffness of the regions RA, RB, RC and RD is also well understood, and there are mathematical formulas describing this dependence.

Thus care must be taken to choose points A, B, C, and D and precisely form the regions RA, RB, RC and RD in order to produce spring of required characteristic.

REMARK 8. Particular form of the regions RA, RB, RC and RD has also impact on the spring characteristic. Influence of particular shape of the regions RA, RB, RC and RD on the spring characteristic is of more subtle nature and harder to describe mathematically, however this can be easily established experimentally. Moreover, this influence is weak and therefore can be neglected, provided that strain of these regions is not too large.

REMARK 9. Main Procedure comprises a step of forming clearly separated regions of diversified stiffness, the influence of which on the spring characteristic has simple mathematical model. The structure of these regions is simple, thus the regions are easy to form by standard methods. Moreover, the characteristic of the spring depends on many mutually independent continuous parameters, which therefore offers considerable freedom of shaping the spring characteristic.

Thus Main Procedure provides a very effective method for producing springs having required characteristic with satisfactory precision.

REMARK 10. Large number of springs with various characteristics (theoretically infinitely many) can be obtained just by varying relative position of the points A, B, C, and D. For example, spring with exponential-like characteristic can be obtained.

Again, care must be taken to properly choose points A, B, C, and D and precisely form the regions RA, RB, RC and RD in order to produce spring of required characteristic (stiffness).

REMARK 11. The spring of the type provided by Main Procedure can combine large capacity with low weight; the capacity to weight ratio of this spring is comparable to that of the Belleville spring.

REMARK 12. Unlike the Belleville spring, the spring according to the present invention is capable of combining large capacity with large deflections (this can be achieved by suitably forming the regions of decreased stiffness and applying the external load to a suitably chosen region of large stiffness of the spring; this will be discussed in more detail in the section Proffered Embodiments).

REMARK 13. There is a general rule that, given other parameters (general shape and dimensions of the regions RA, RB, RC and RD, elasticity of the material of the spring etc.) fixed, the smaller stiffness of the regions RA, RB, RC and RD the smaller stiffness of the whole spring and the greater its maximum allowable flex. In particular, by forming some of the regions RA, RB, RC and RD with zero stiffness, a progressive spring combining large capacity with large allowable maximum flex can be obtained.

REMARK 14. More complex patterns of regions of decreased stiffness may be formed in the plate of the spring by applying (another variant of) Main Procedure. To be more precise, a larger number (6, 7, 8, . . . ) of points can be chosen in the plane of the spring plate, and a larger number of (substantially) circular arc-shaped regions of decreased stiffness corresponding to these points can be formed in the spring plate. Predictability of the spring characteristic is preserved (only some mathematical expressions become more complicated and harder to handle on computer), and a larger family of springs with various characteristics can be obtained in this way. There is a general rule that the larger number of points are used in (a variant of) Main Procedure the better approximation of the desired characteristic can be obtained (however at a greater effort).

REMARK 15. Large frictional force between various regions of the spring can be attained by appropriately forming the regions. Thus the spring can be produced so as to do the job of shock absorber (friction damper). This would substantially simplify the structure of the vehicle suspension unit utilizing this spring.

REMARK 16. The most effective method for producing complete vehicle suspension unit in accordance with the present invention comprises, besides the steps (a)-(g) described above, may comprise at least one of the following additional steps:

(h) Forming (e.g. by cutting from another steel plate to preserve the unity of the technology) a rocking arm (or arms and/or reaction bars) to hold vehicle's road wheel and attaching it (them) suitably (e.g. by riveting) to a region (regions) of the plate of the spring of large stiffness. Finally, by equipping the spring with means to attach it to vehicle's body, we get a complete vehicle suspension unit.

(i) Forming a road wheel arm as a unique whole with the spring plate (see Example 3 below).

This is believed to be an extremely effective method of producing (on the same producing line) a large family of simple, inexpensive and lightweight, progressive rate vehicle suspension units, which can be optimized for any kind of vehicles (city buses, trucks, military vehicles, emergency vehicles etc.) as well as adaptable suspensions the damping characteristic of which can be adjusted to changing conditions.

REMARK 17. The invented method differs from these known from prior art (see for example U.S. Pat. No. 5,062, 619 and GB Patent 1,550,877) in that it enables producing non-linear springs with precisely predictable (unlike the springs of GB Patent 1,550,877) and smooth (unlike the springs of U.S. Pat. No. 5,062,619) characteristic.

The above-mentioned and other objectives, features and advantages of the present inventions will become readily apparent to those skilled in the art by reference to the following detailed specification taken in conjunction with the appended drawings and patent claims.

BRIEF DESCRIPTION OF THE DRAWINGS

FIGS. 2A and 2D show the springs substantially of the type depicted in FIGS. 1A-1D with an alternative form of the regions with decreased stiffness.

FIGS. 3A-3C show another form of the smooth progressive rate spring and complete vehicle suspension unit according to the present invention obtained by applying Main Procedure. FIG. 3A is a general view of all elements of the spring, and FIG. 3B (respectively 3D) is a disassembled (respectively assembled) view of a complete suspension unit utilizing the spring.

This type of the suspension unit is intended for special purpose vehicles (e.g. tanks).

Figure 4A:
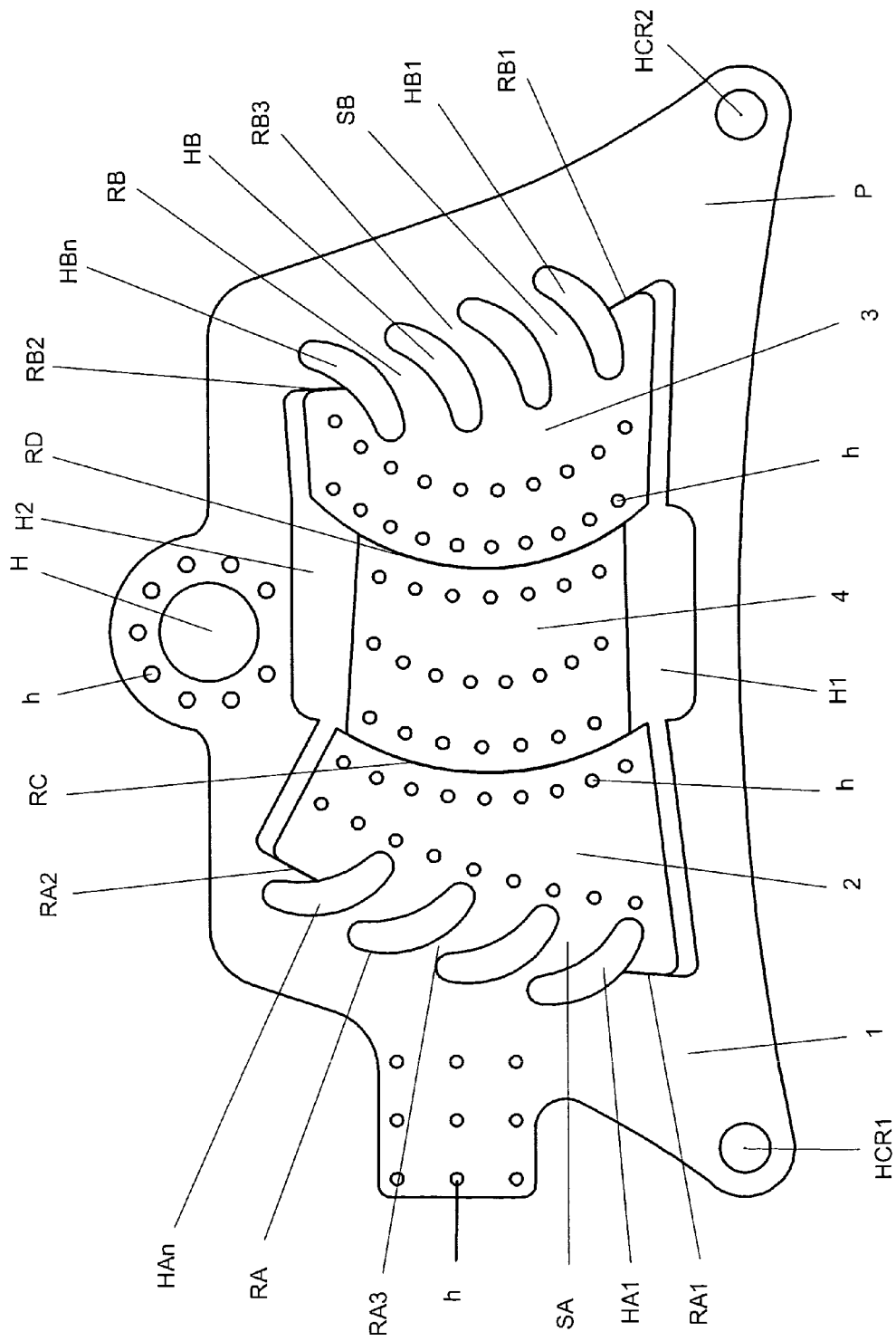
Figure 4B:
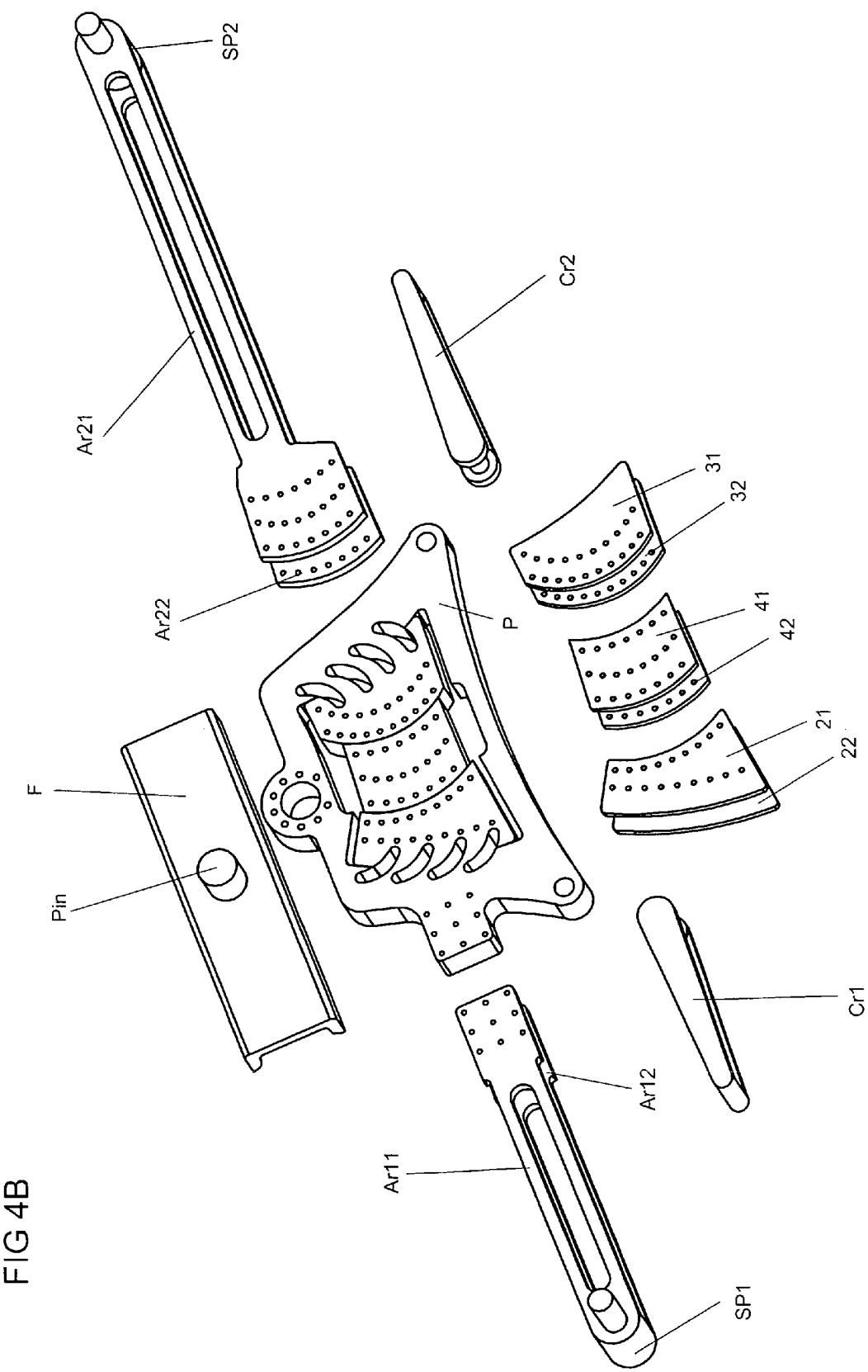

FIGS. 4A-4C show yet another form of the smooth progressive rate spring and complete vehicle tandem axle suspension unit according to the present invention obtained by applying Main Procedure. FIG. 4A is a general view of the spring, and FIG. 4B (respectively 4C) is a disassembled (respectively assembled) view of a complete suspension unit utilizing the spring.

This type of the suspension unit is intended for heavy trucks and tractors as well as trailers and semi-trailers.

Figure 5A:
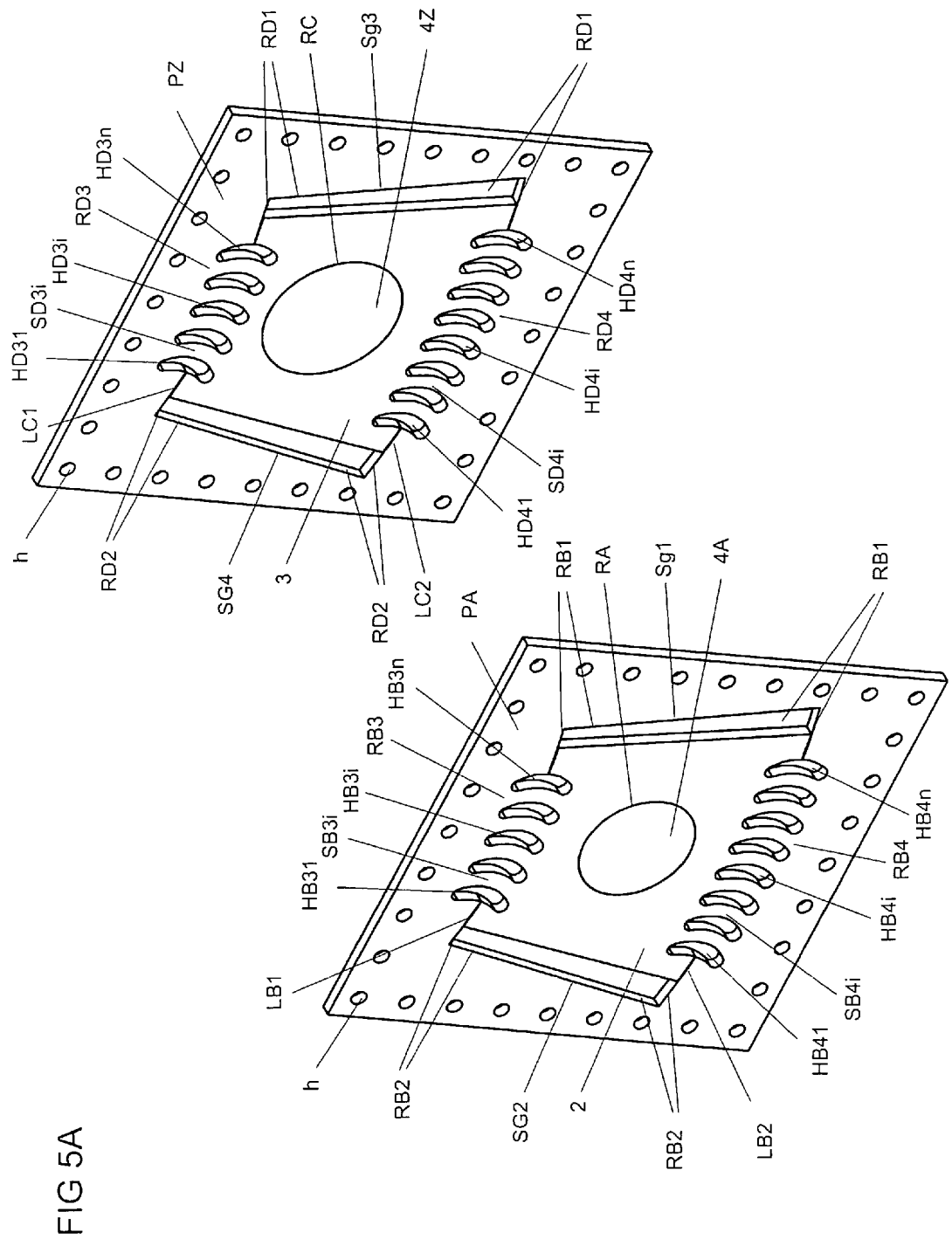
Figure 5B:
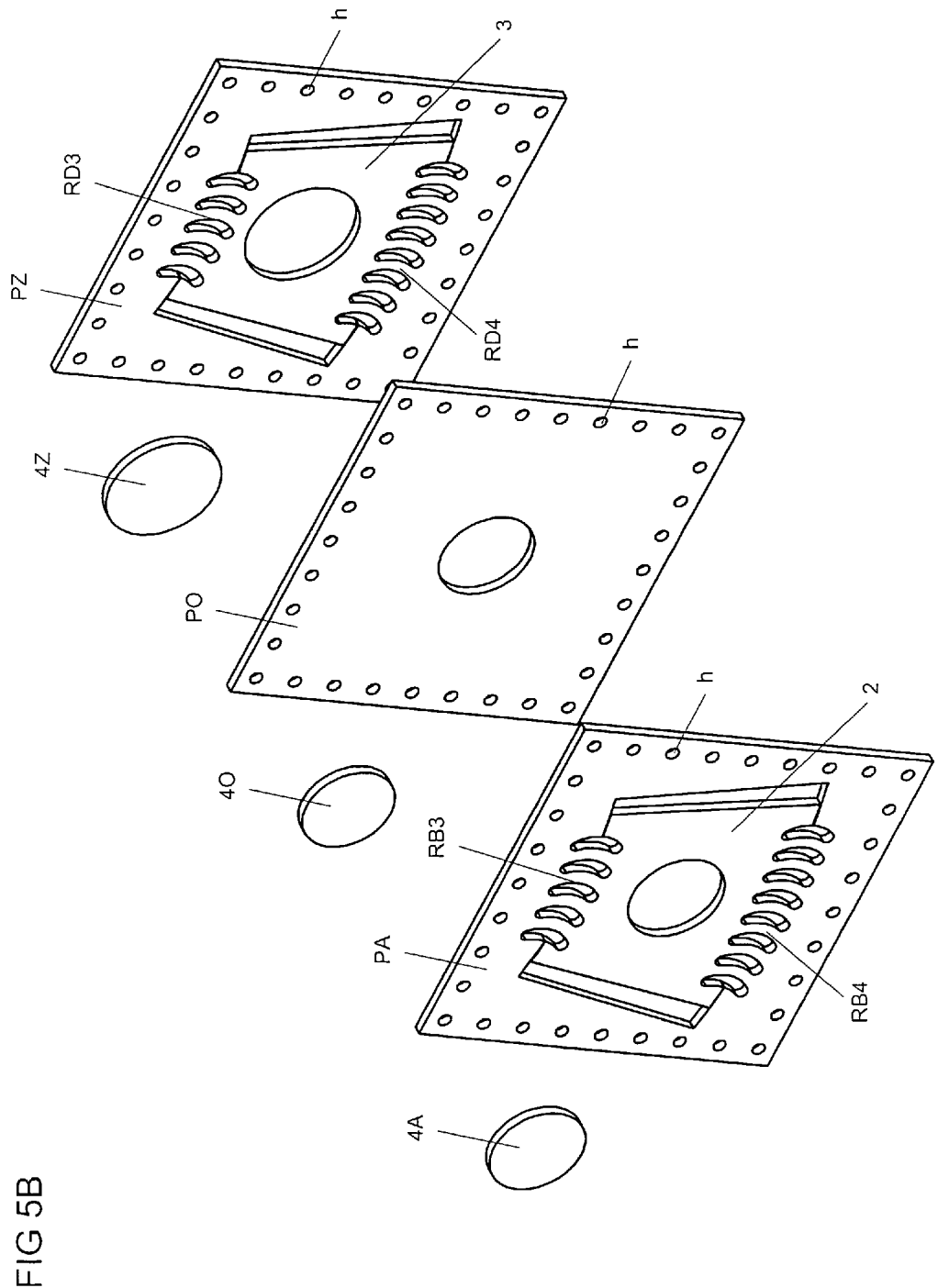

FIGS. 5A-5F show yet another form of the smooth progressive rate spring (FIGS. 5A-5B) and complete vehicle suspension units (equipped with trailing (FIGS. 5C-5D) or transverse (FIGS. 5E-5F) road wheel arm) according to the present invention obtained by applying Main Procedure. FIGS. 5A-5B are general views of the spring, FIG. 5C (respectively 5D) is a disassembled (respectively assembled) view of a complete suspension unit utilizing the spring.

Figure 5C:
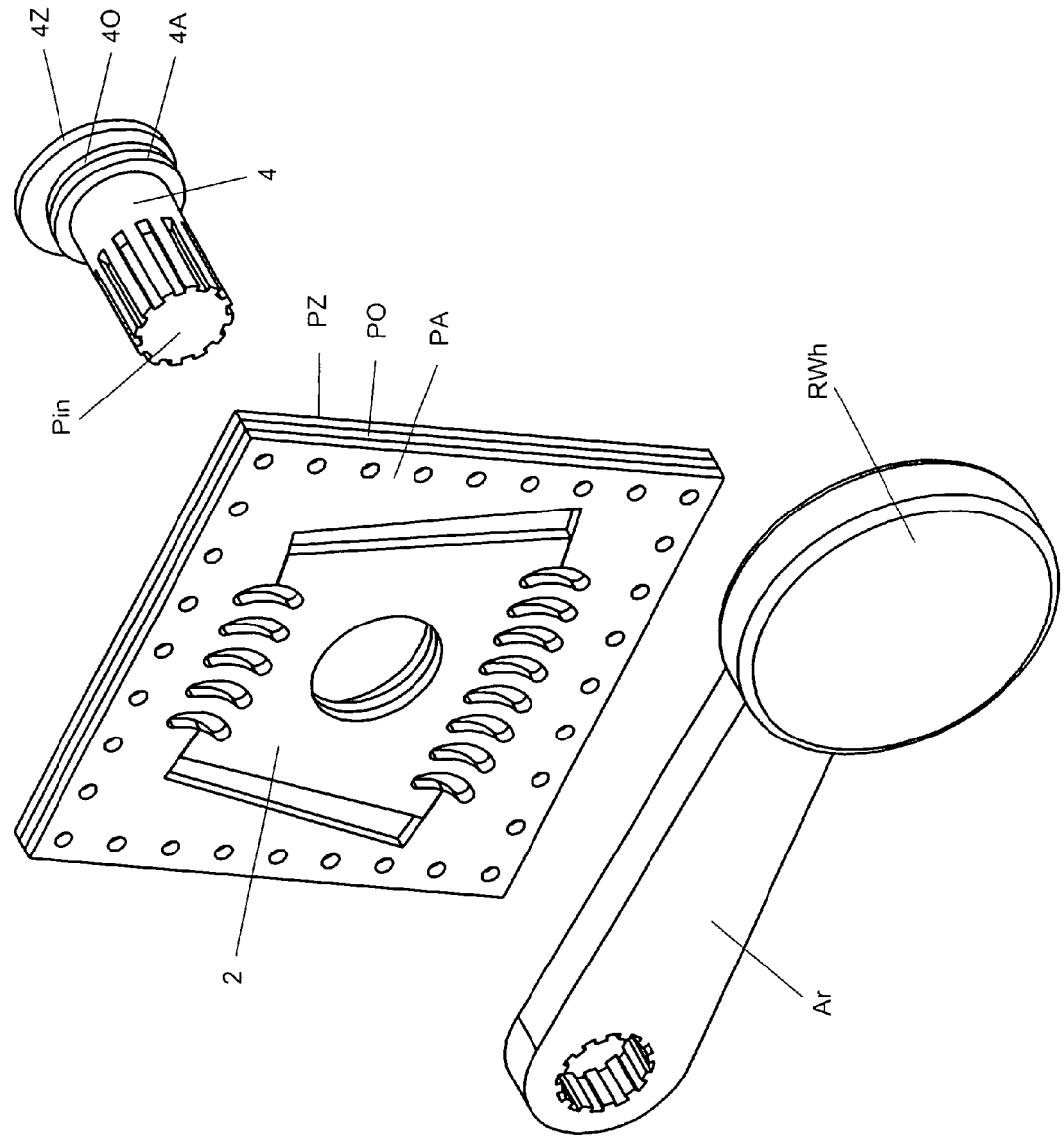
Figure 5D:
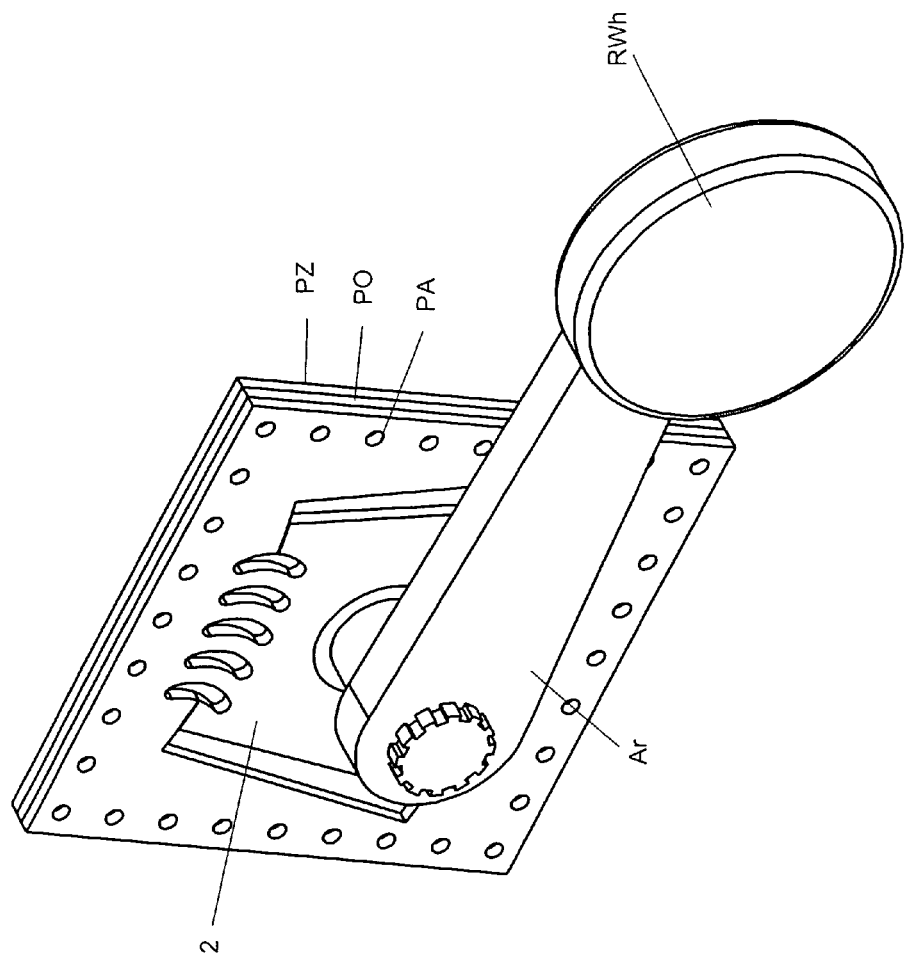
Figure 5E:
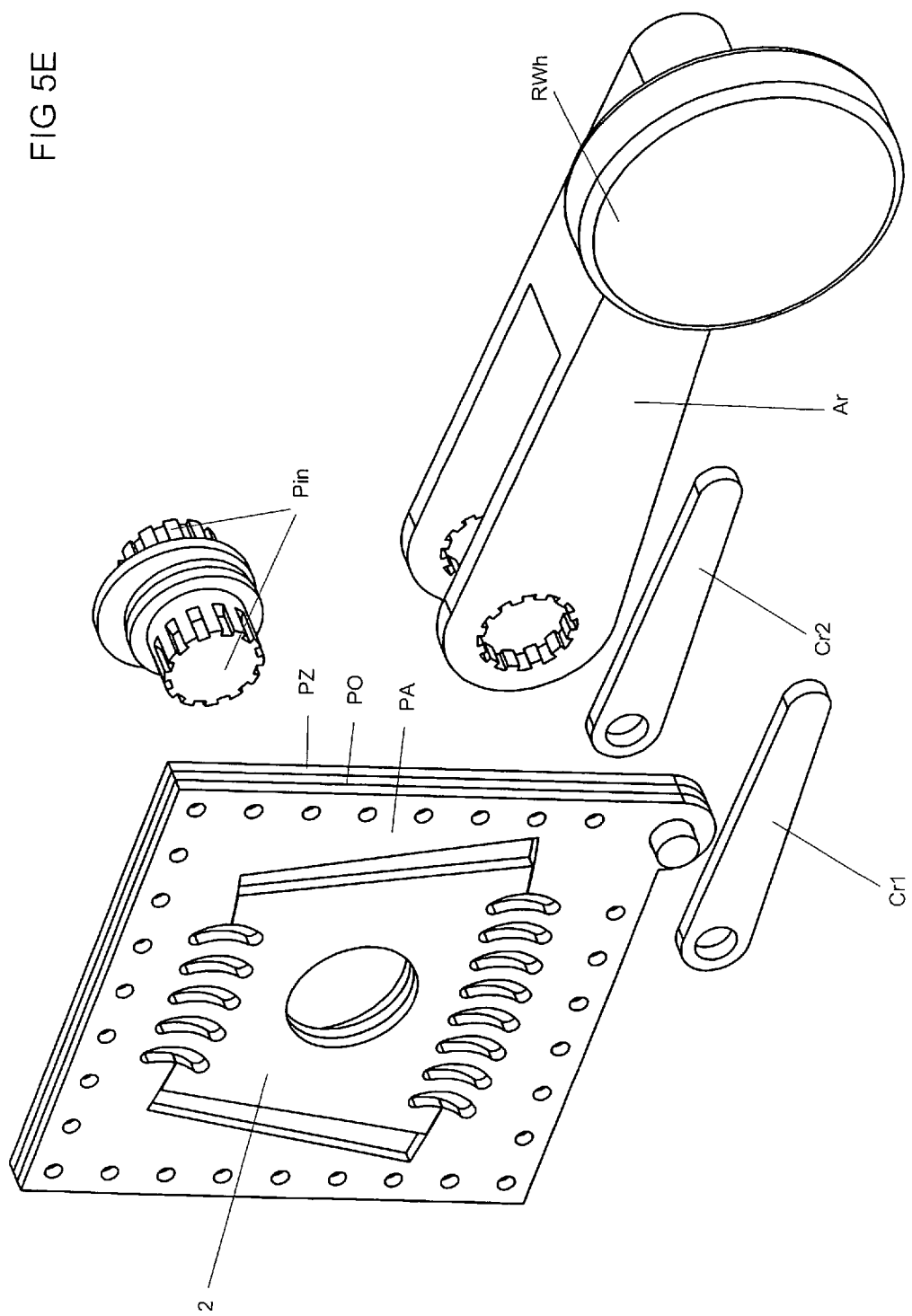
Figure 5F:
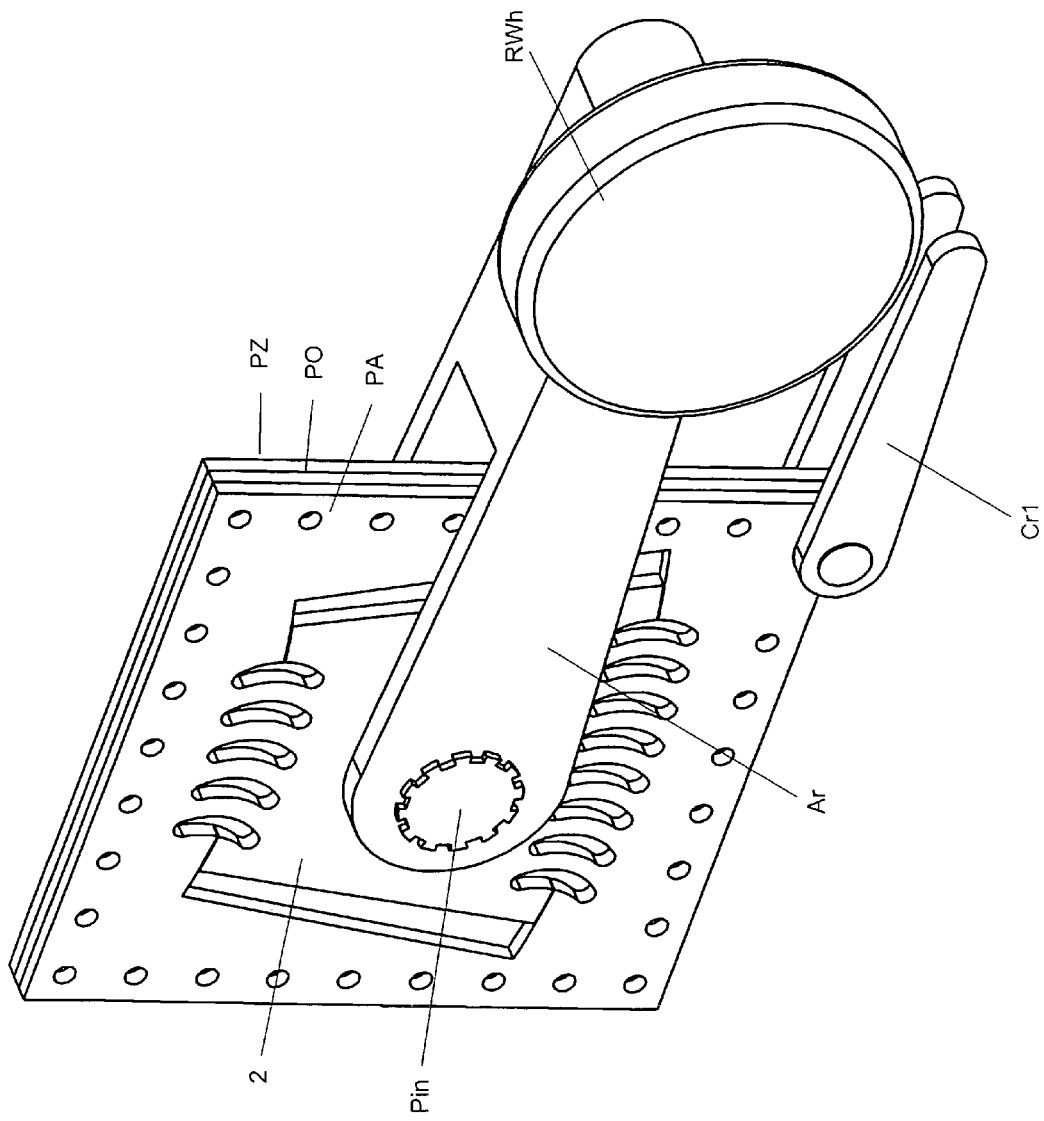

This type of the suspension unit is intended for special purpose vehicles (e.g. tanks, see FIG. 5C-5D), buses and cars (FIGS. 5E-5F).

Figure 6A:
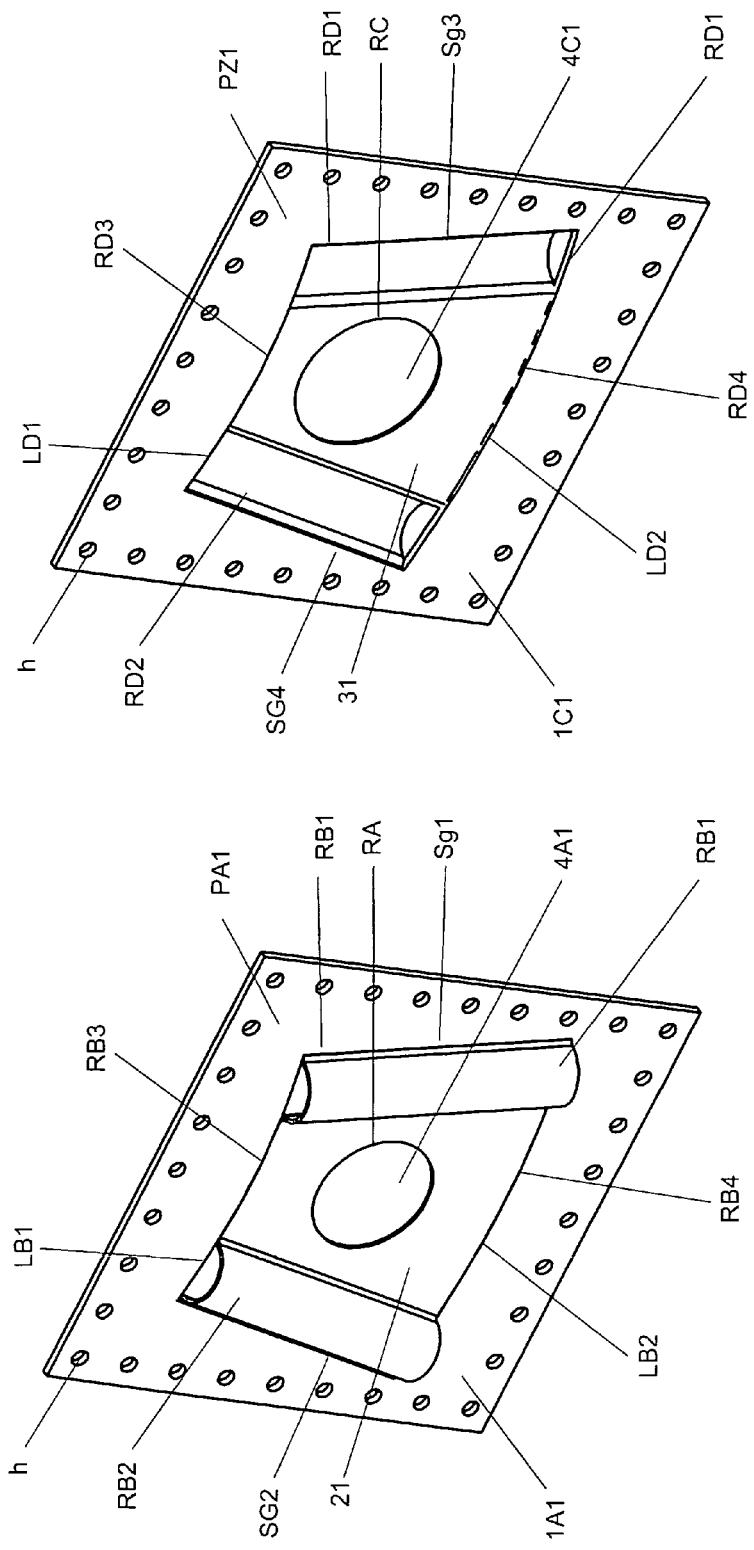
Figure 6B:
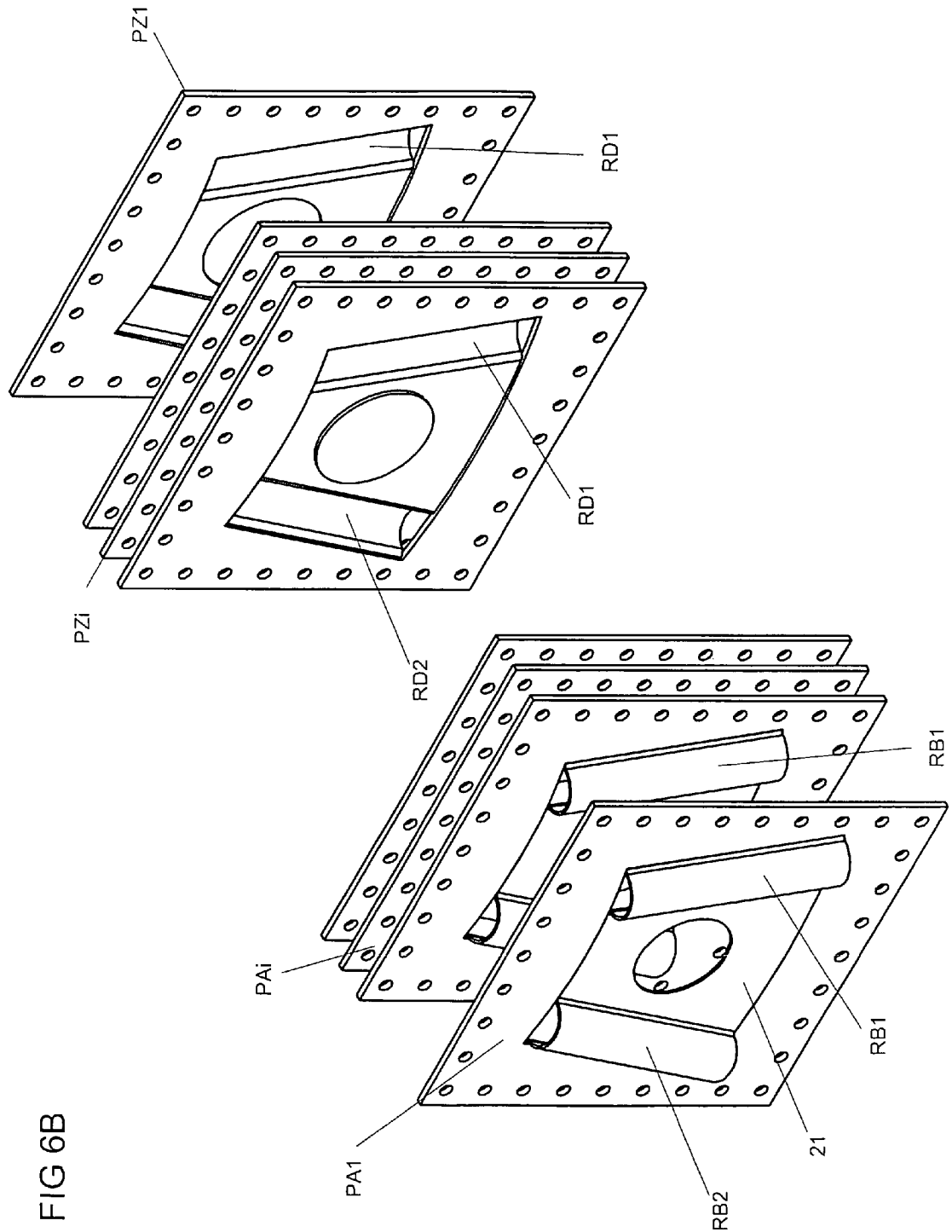
Figure 6C:
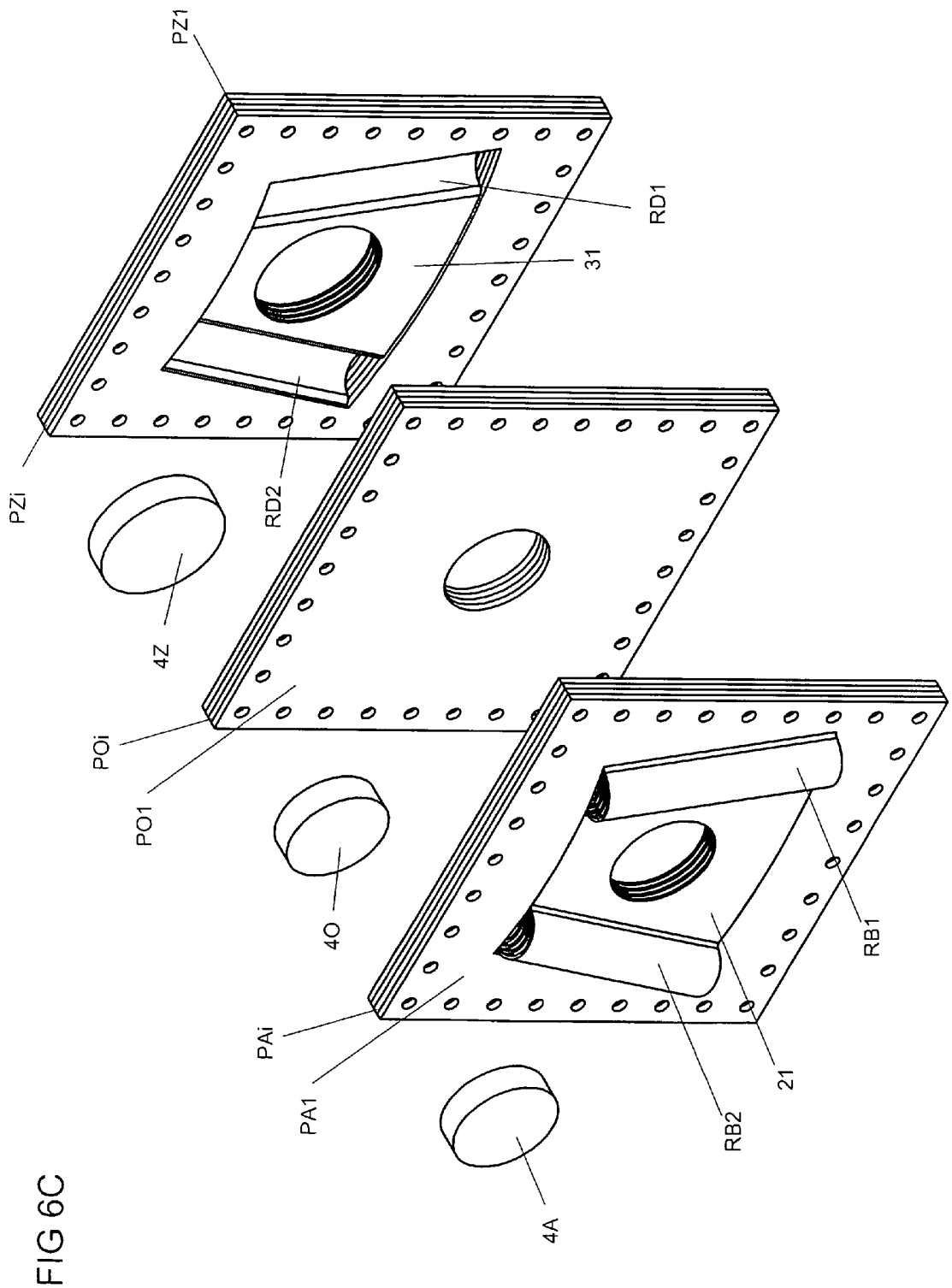
Figure 6E:
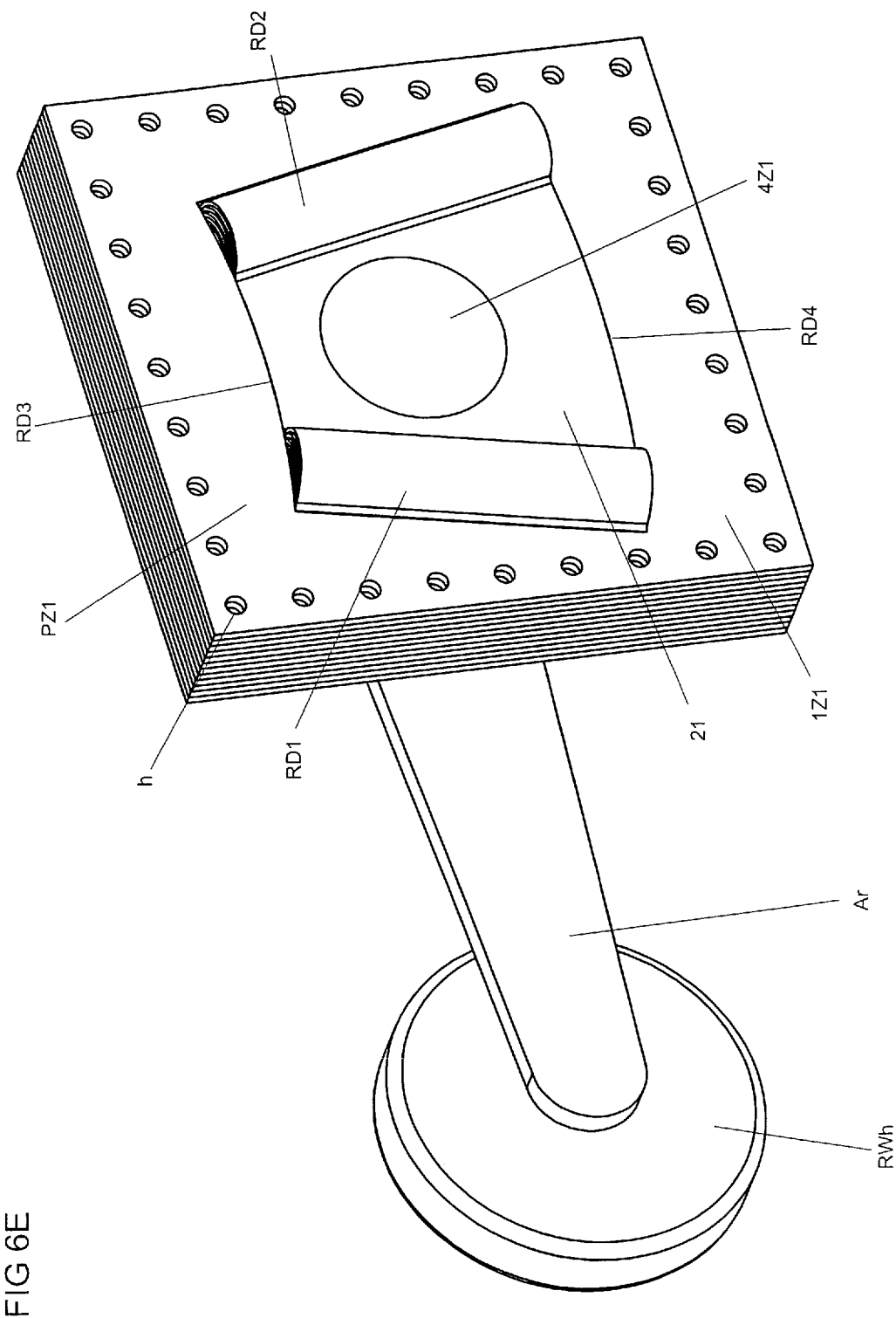
Figure 6F:
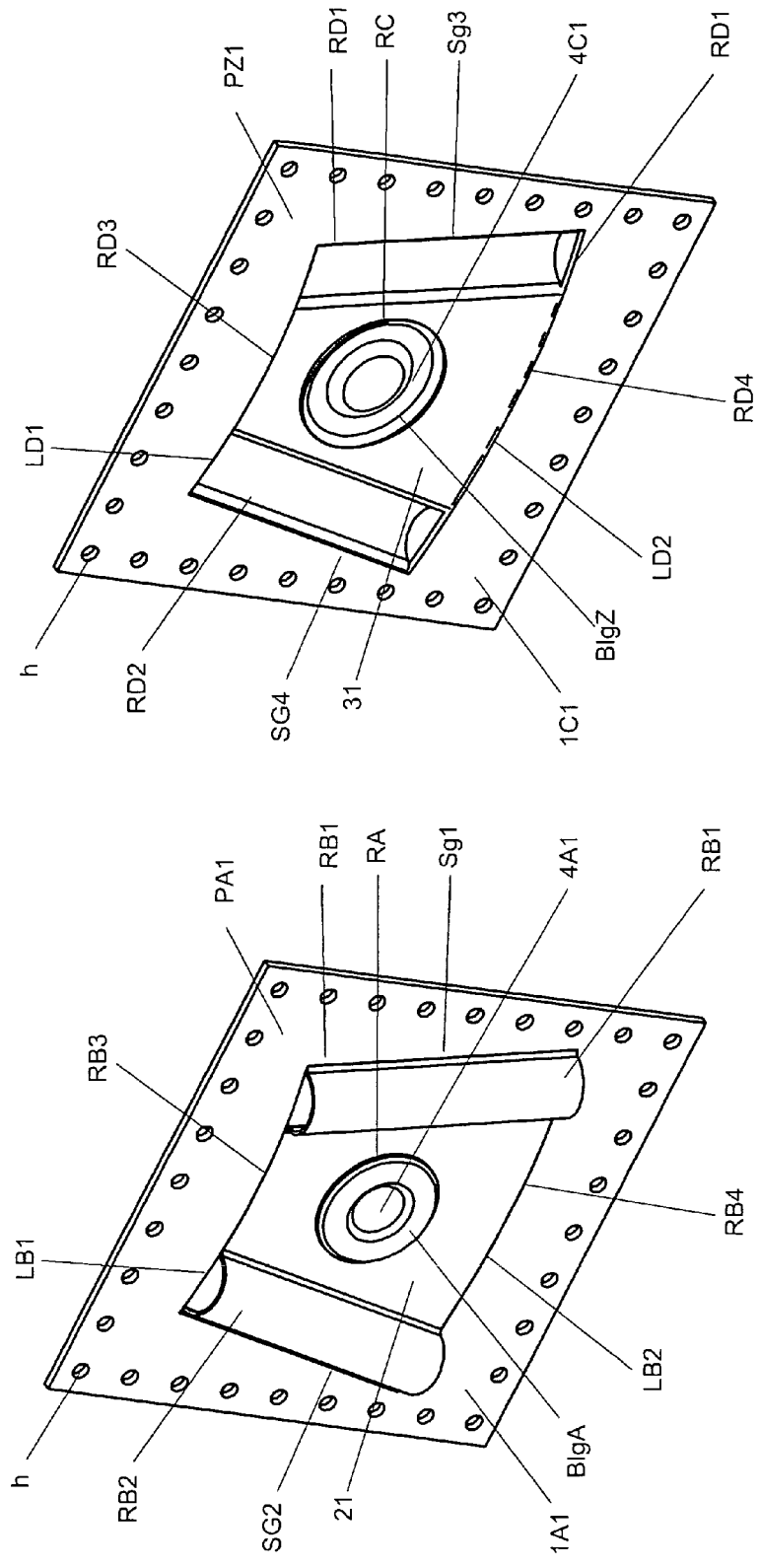
Figure 6G:
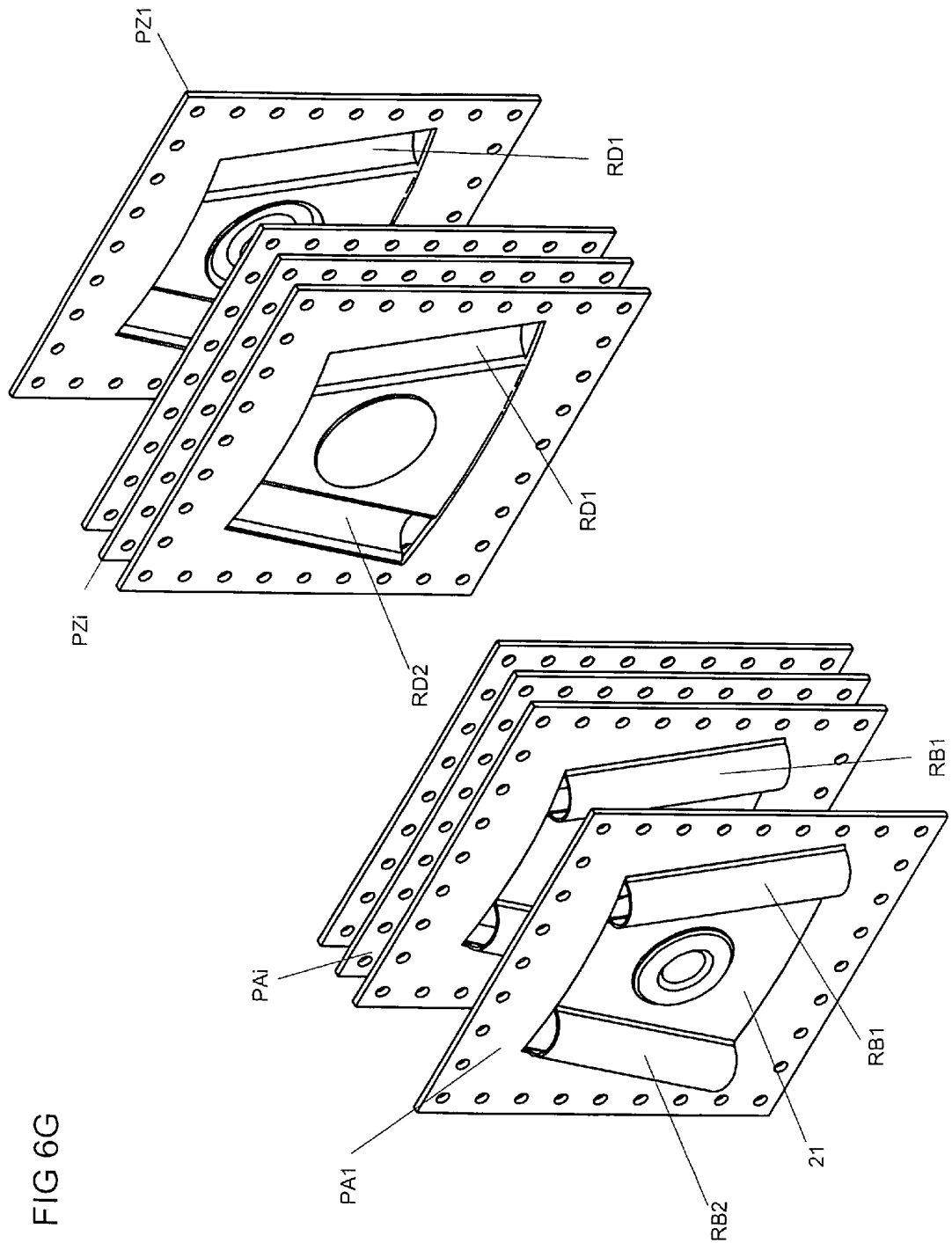
Figure 6H:
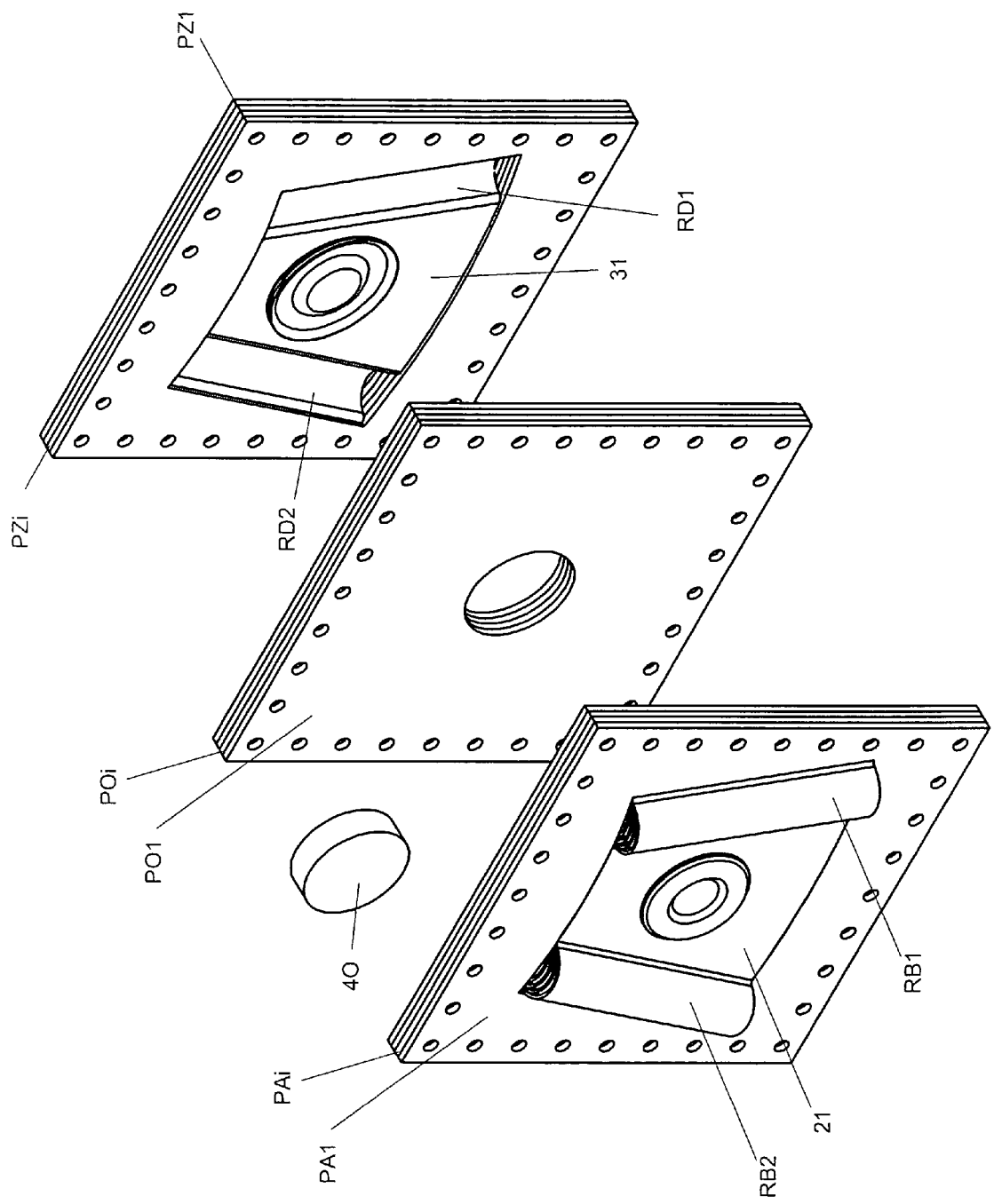

FIGS. 6A-6H show the smooth non-linear spring (intended for the same applications as these depicted in FIGS. 5A-5F) with differently formed regions of decreased stiffness. FIGS. 6A-6C are general views of the spring that show all its principal elements, FIG. 6D (respectively 6E) is a front (respectively rear) view of a complete suspension unit utilizing the spring. FIGS. 6F-6H are general views of another variant of the spring that show all its principal elements.

Figure 7A:
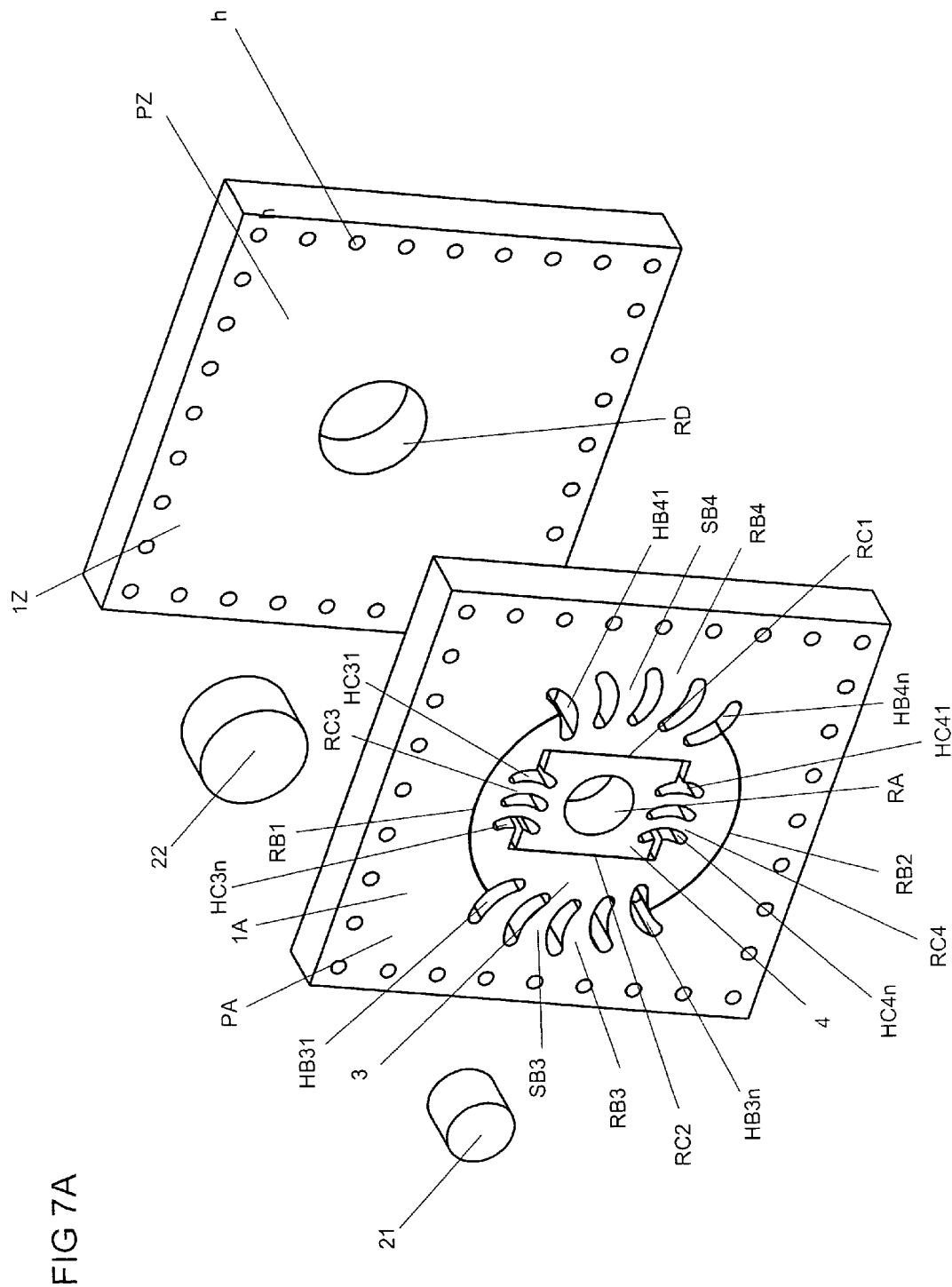
Figure 7B:
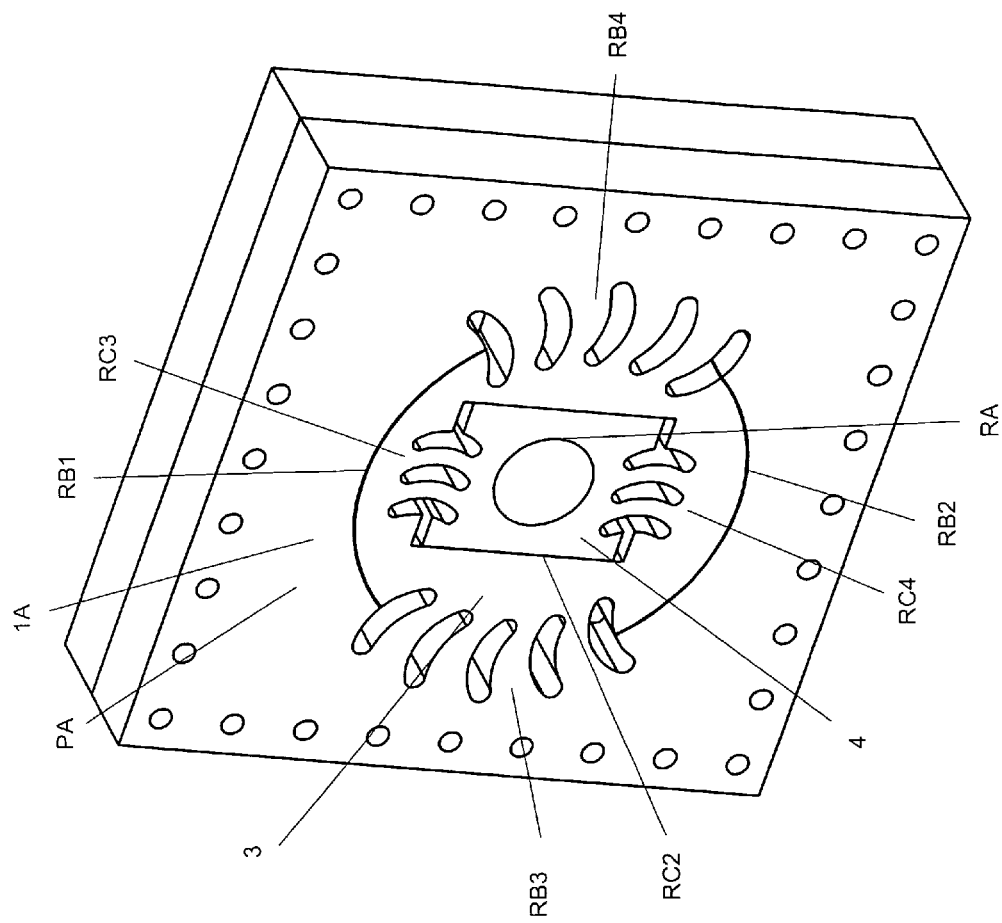
Figure 7C:
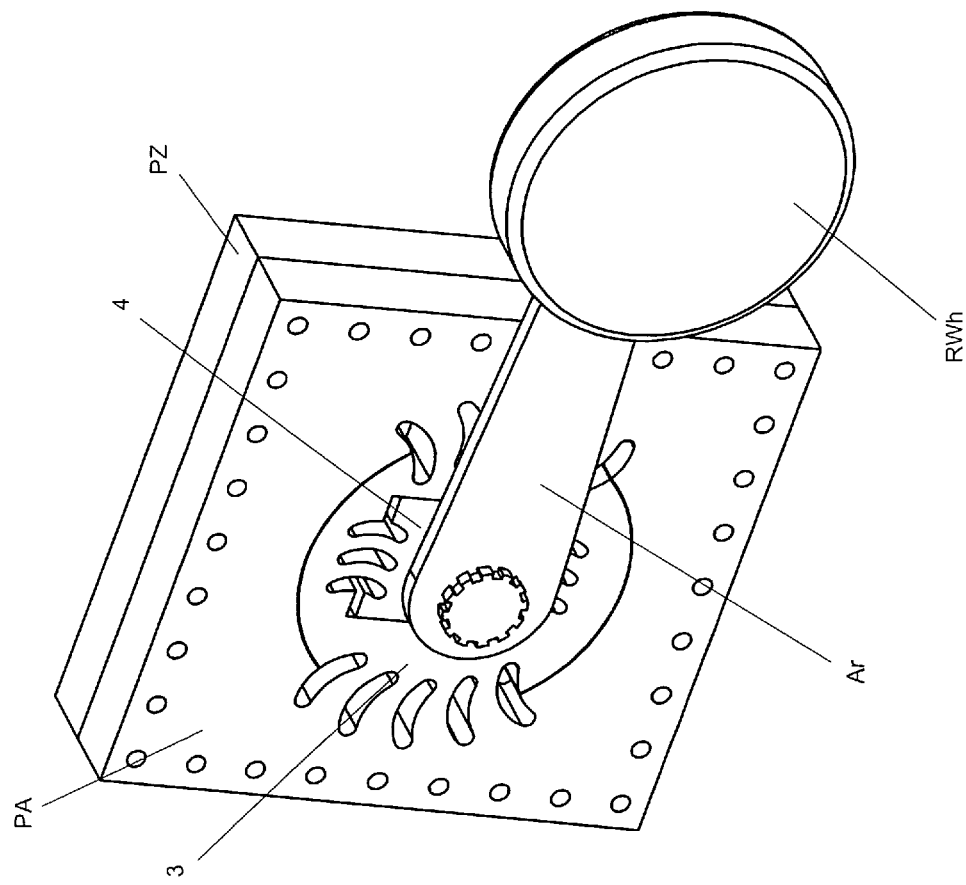

FIGS. 7A-7C show yet another form of the smooth progressive rate spring and complete vehicle suspension units according to the present invention obtained by applying Main Procedure. This spring differs from all the previously described springs by one of the points A, B, C, D mentioned in step (b) of Main Procedure being placed at infinity. These are general-purpose suspension units.

Figure 7D:
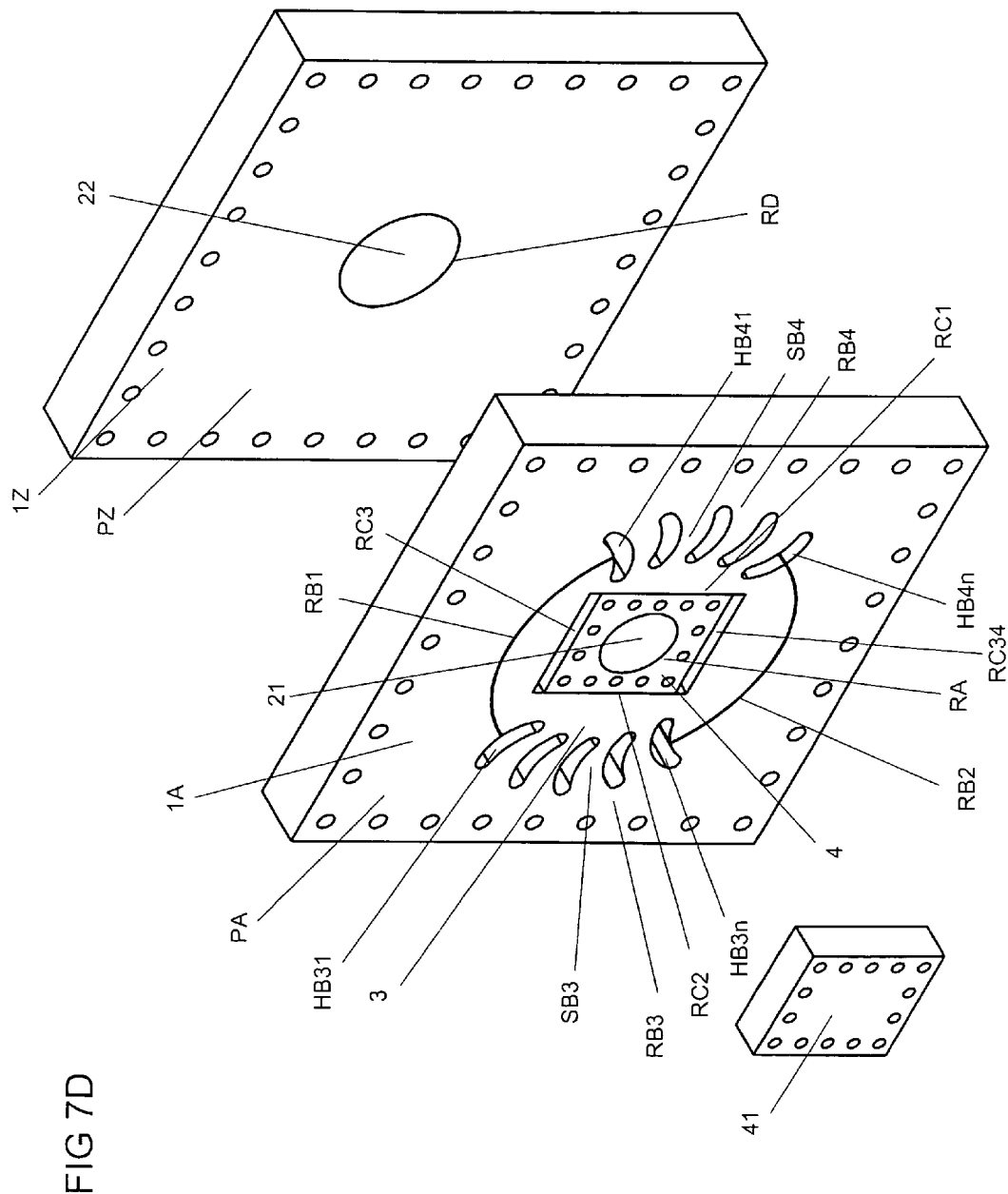
Figure 7E:
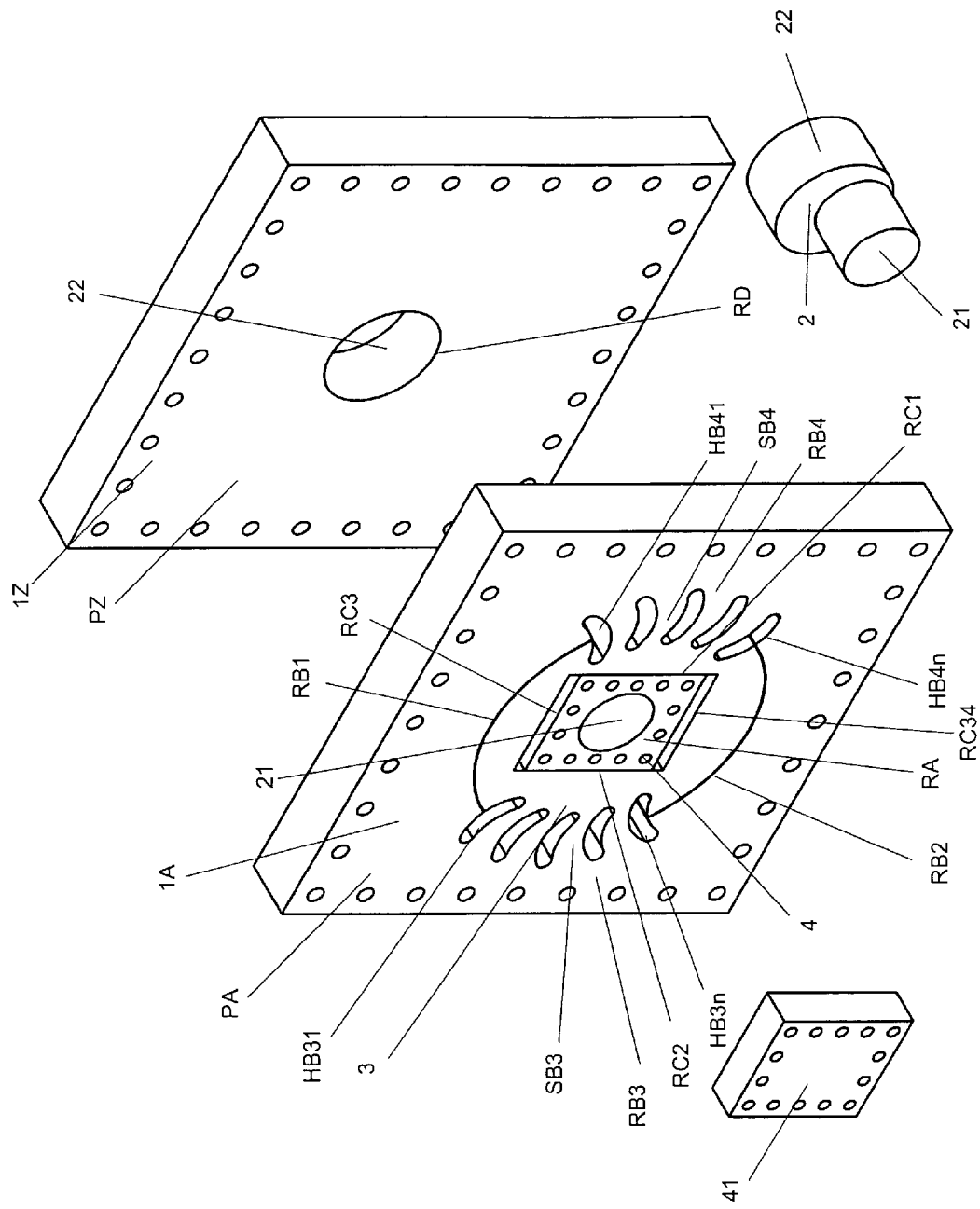

FIGS. 7D-7F provide another example of the smooth non-linear spring in accordance with the present invention obtained by applying Main Procedure, where one of the points A, B, C, D mentioned in step (b) of Main Procedure is placed at infinity. FIG. 7A (respectively 7B) is a disassembled (respectively assembled) view of the spring. FIG. 7C depicts a complete suspension unit utilizing the spring of FIGS. 7A-7B. FIGS. 7D and 7E are two disassembled views of the spring. FIG. 7C and FIG. 7F show two different ways of applying external load to the spring.

Figure 8A:
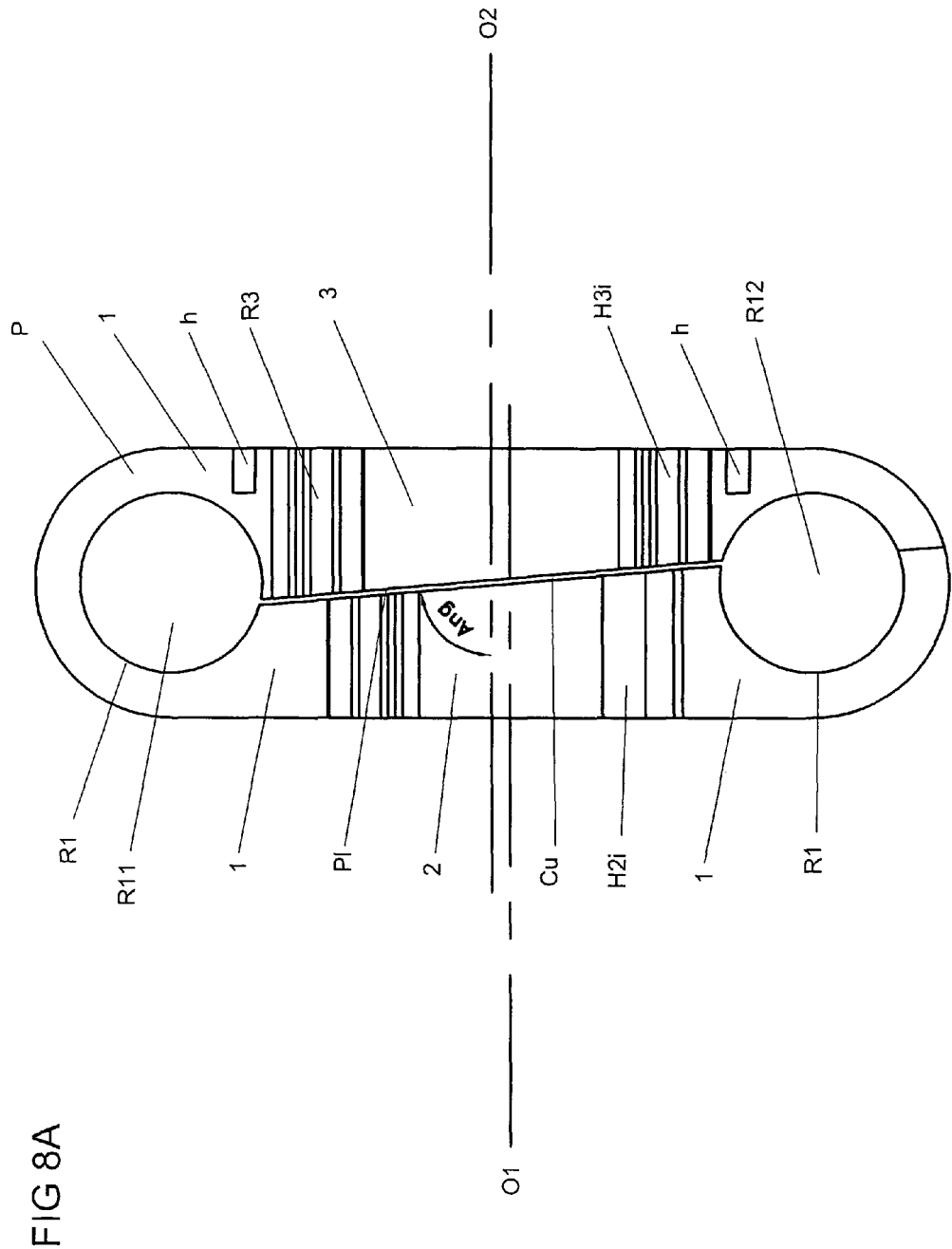
Figure 8B:
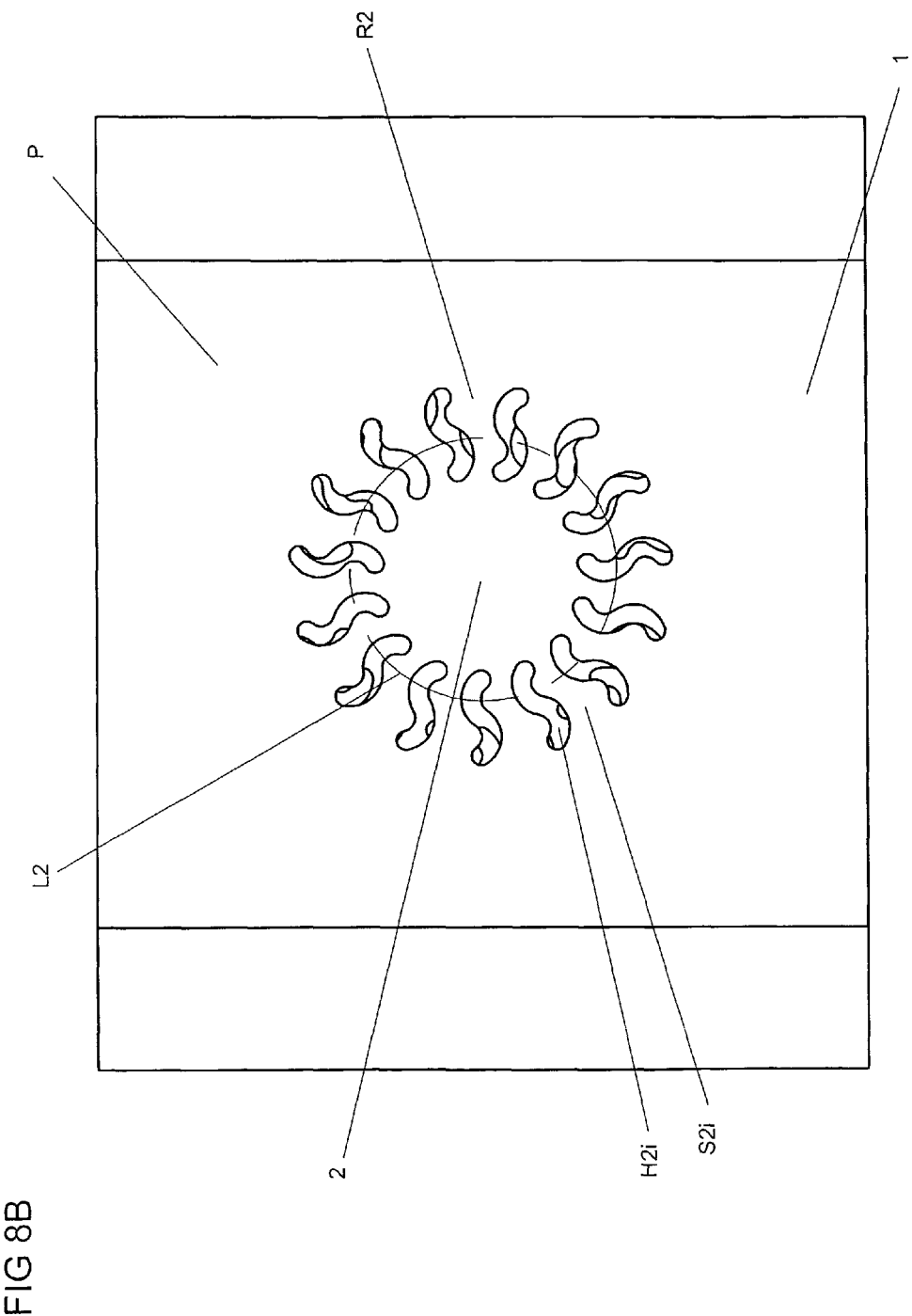
Figure 8D:
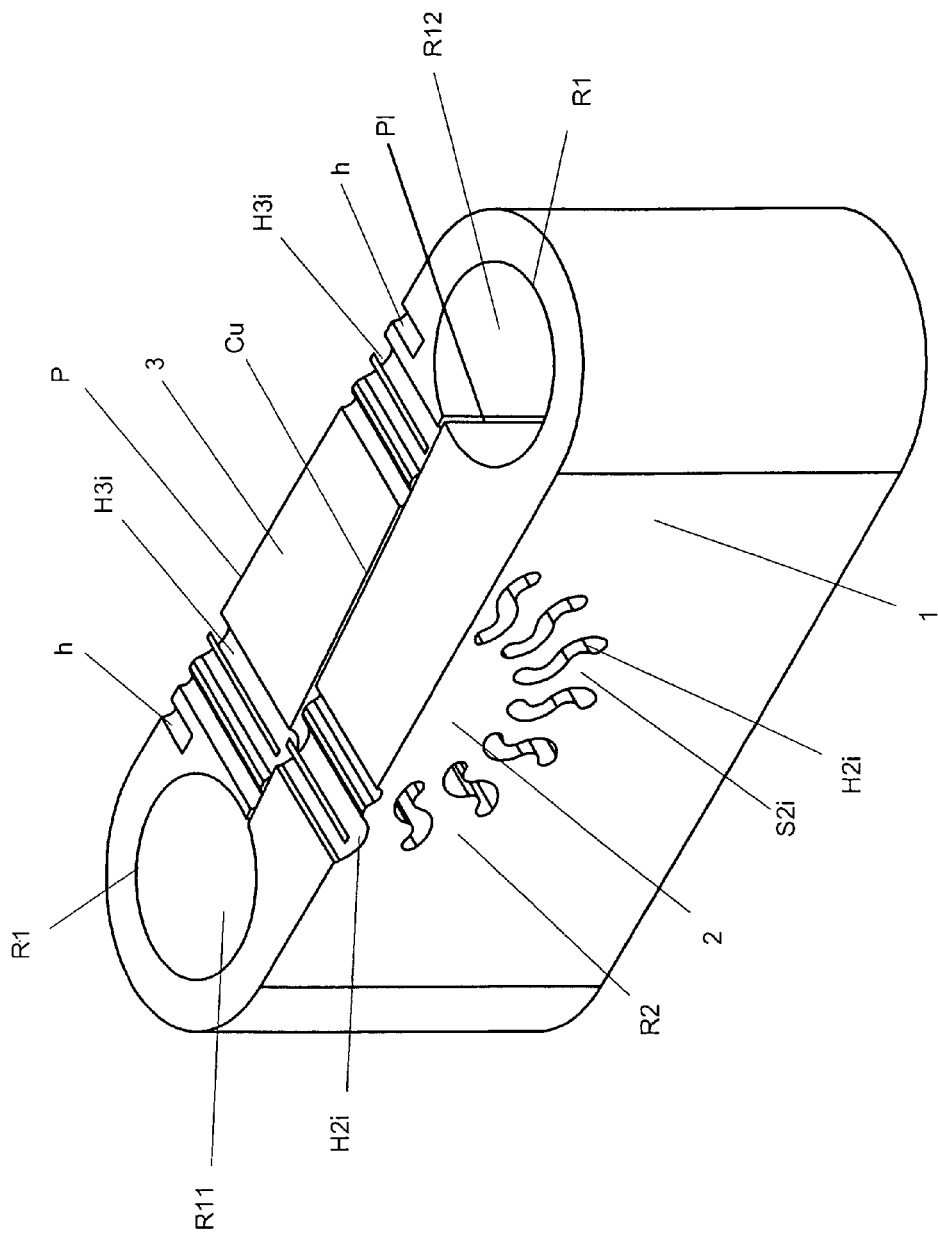
Figure 8E:
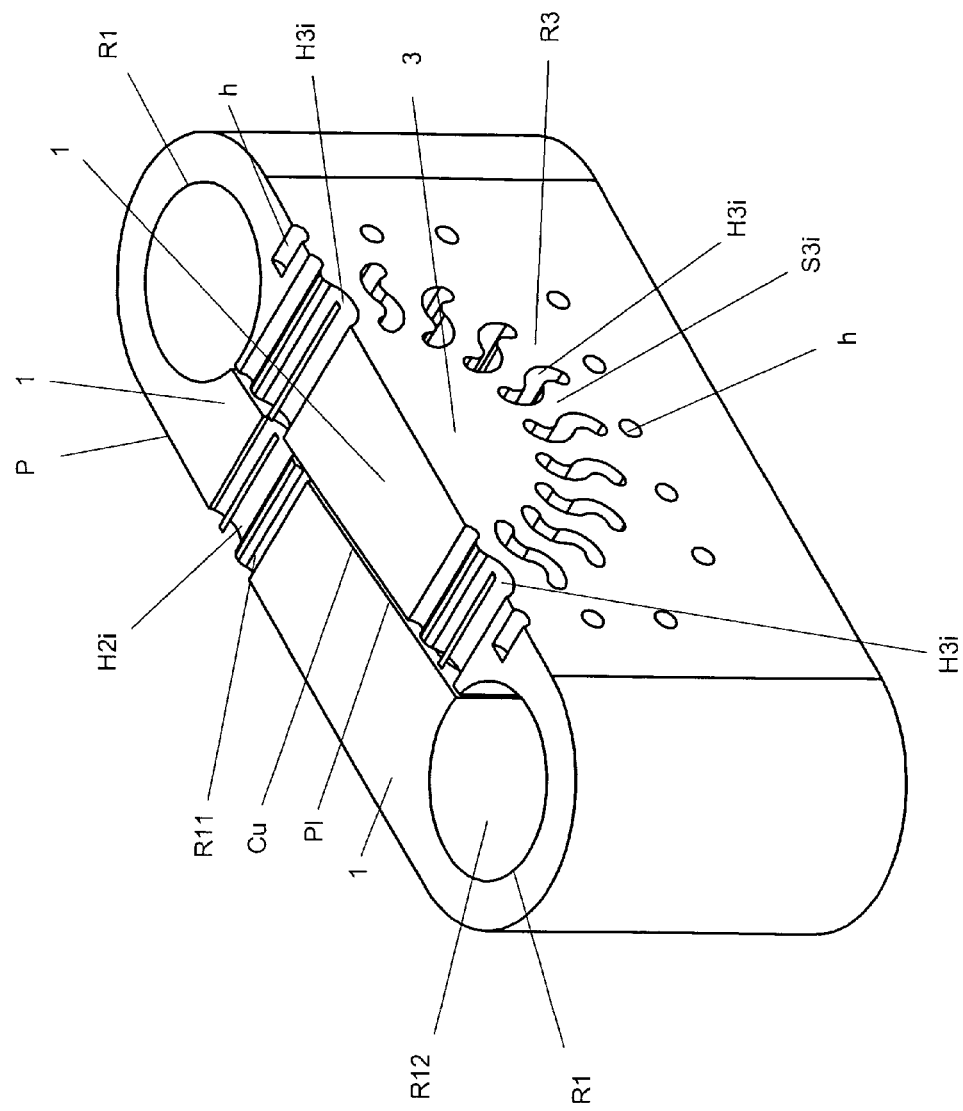
Figure 8F:
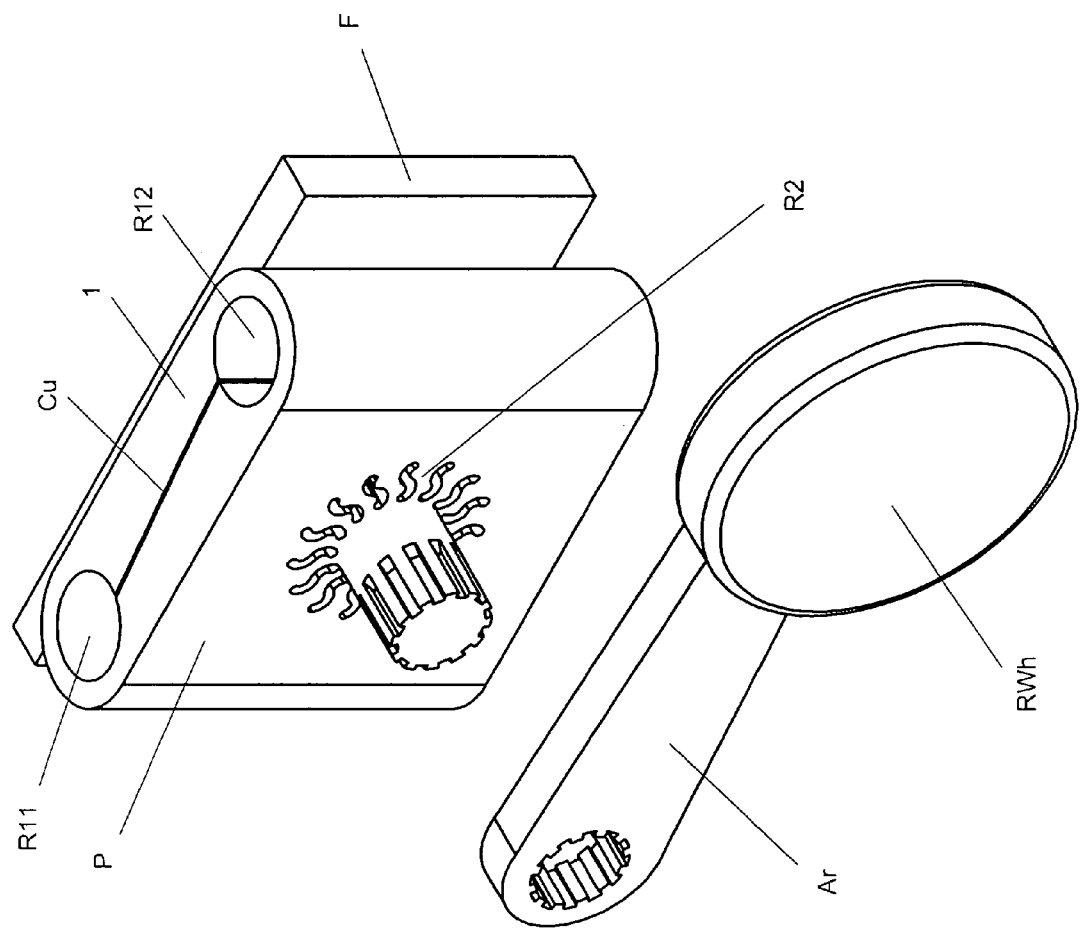
Figure 8G:
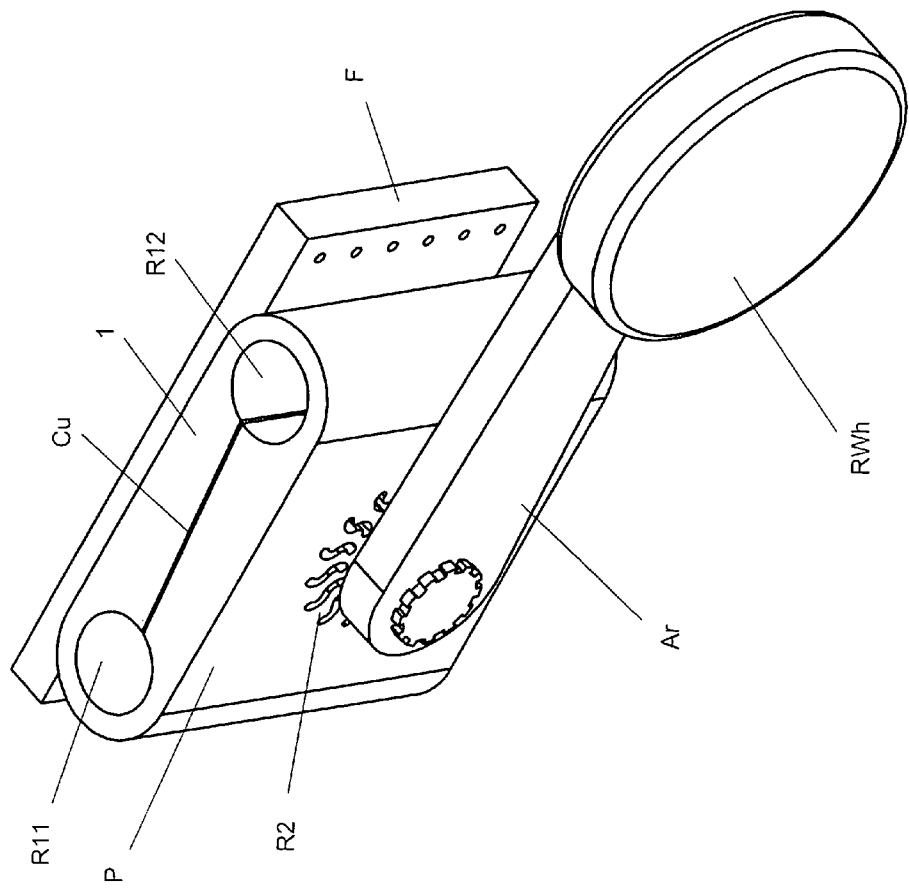
Figure 8H:
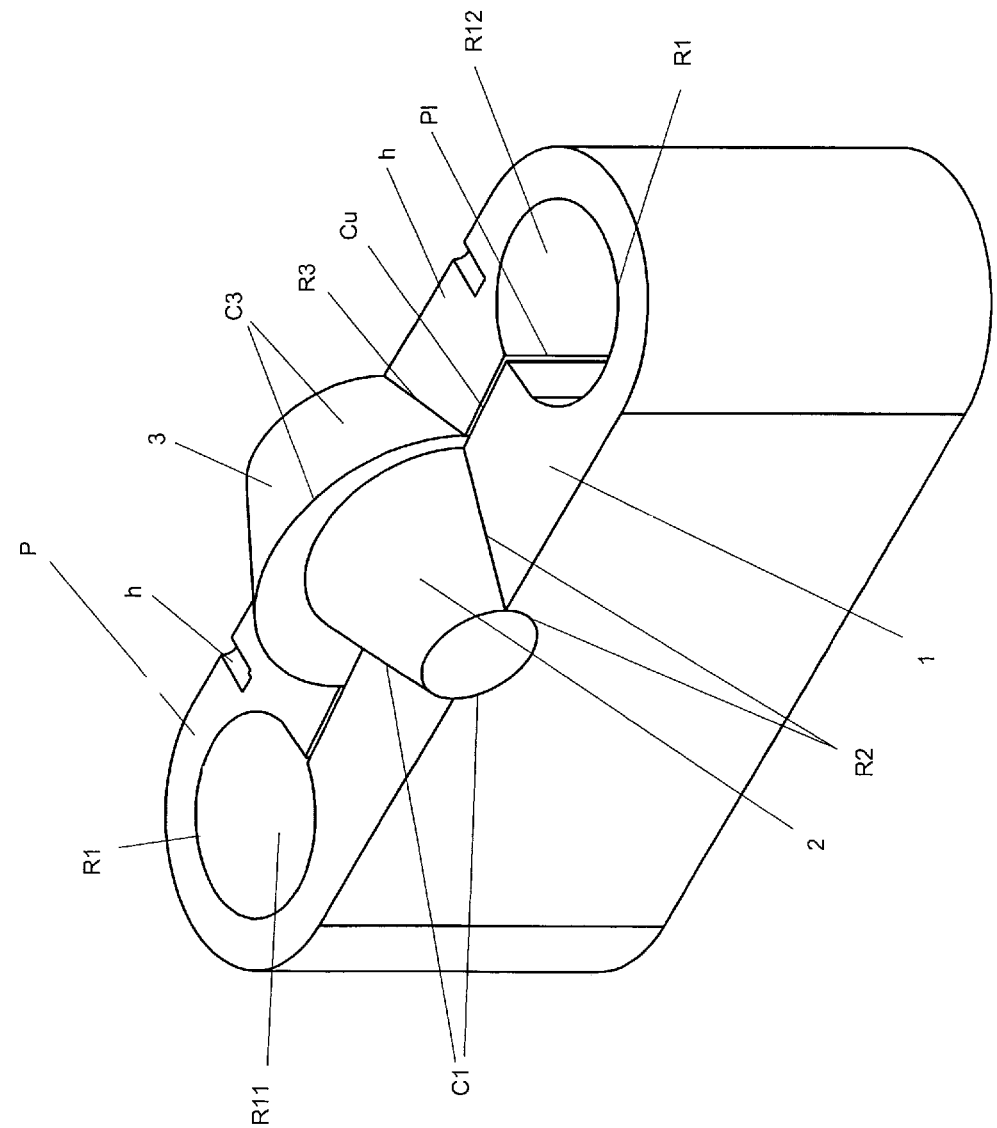

FIGS. 8A-8H provide another example of the smooth non-linear spring in accordance with the present invention, which is not obtained by applying Main Procedure. FIGS. 8F and 8G provide general view of the spring and a (disassembled and assembled respectively) suspension unit using this spring. FIG. 8A is a cross-section of the spring of FIGS. 8F and 8G along a plane perpendicular to its main plane, and FIGS. 8D and 8E provide two perspective views of the section of FIG. 8A. FIG. 8B (respectively 8C) is a view from the front (respectively from the rear) of the spring. Finally, FIG. 8H is a section of another variant of the spring.

Figure 9A:
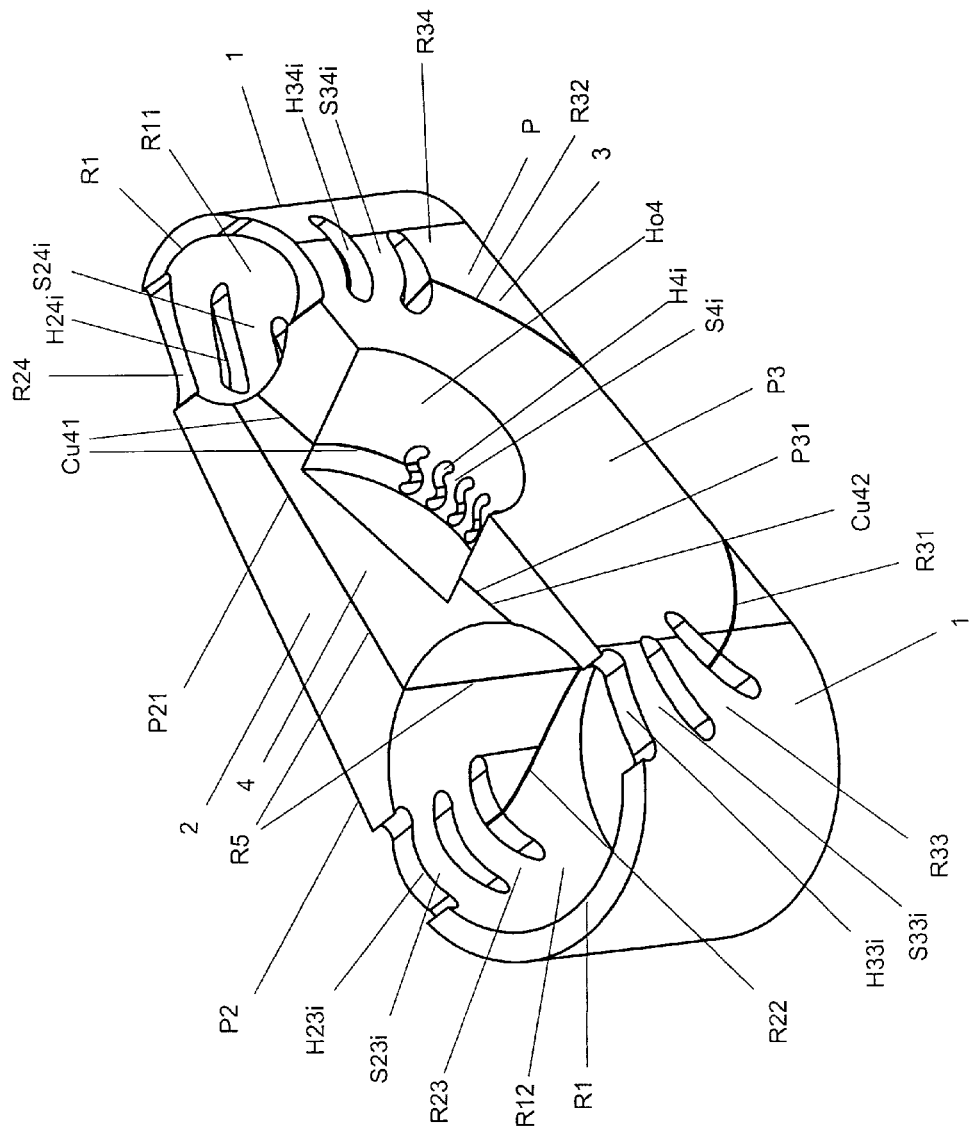
Figure 9B:
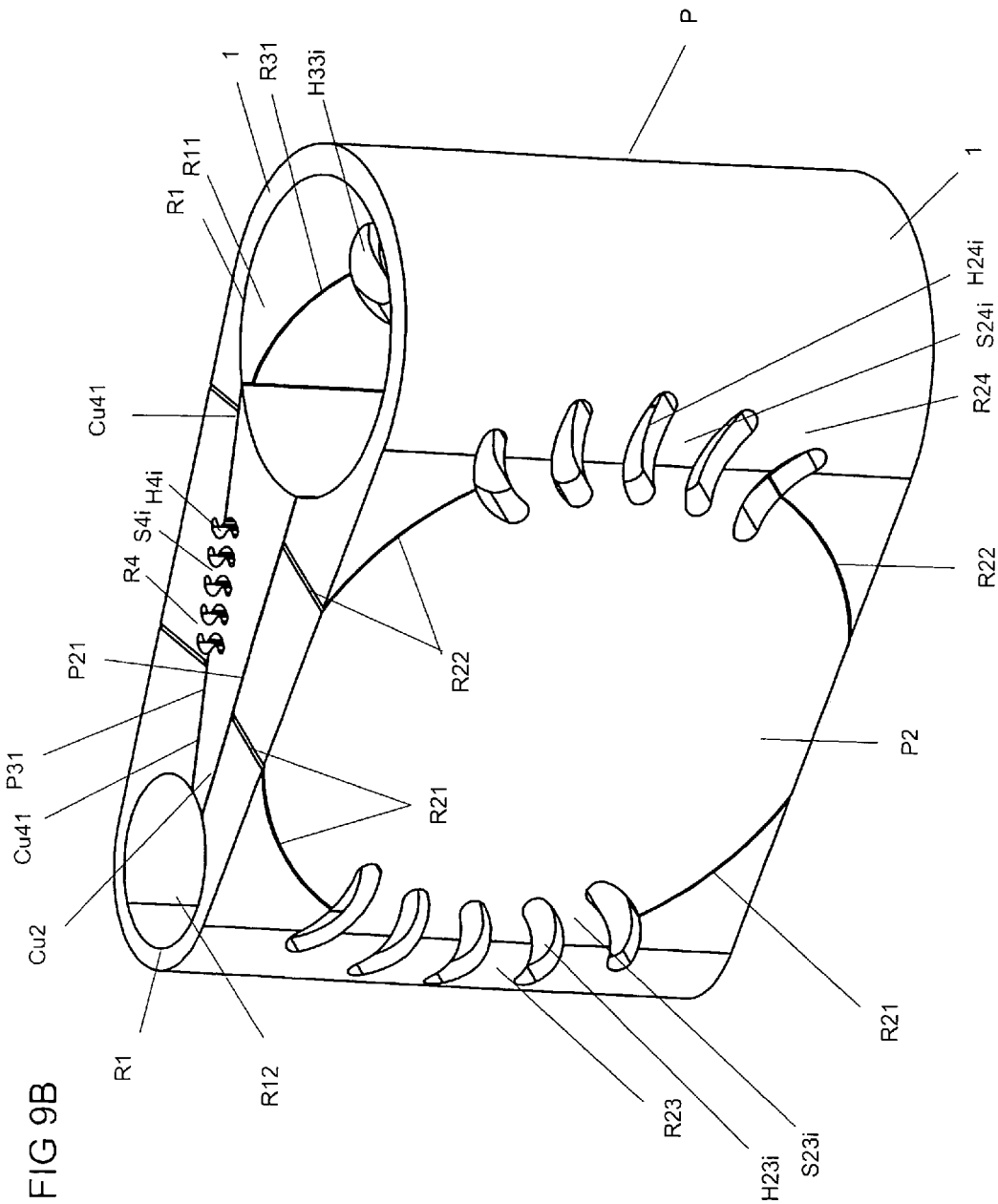
Figure 9C:
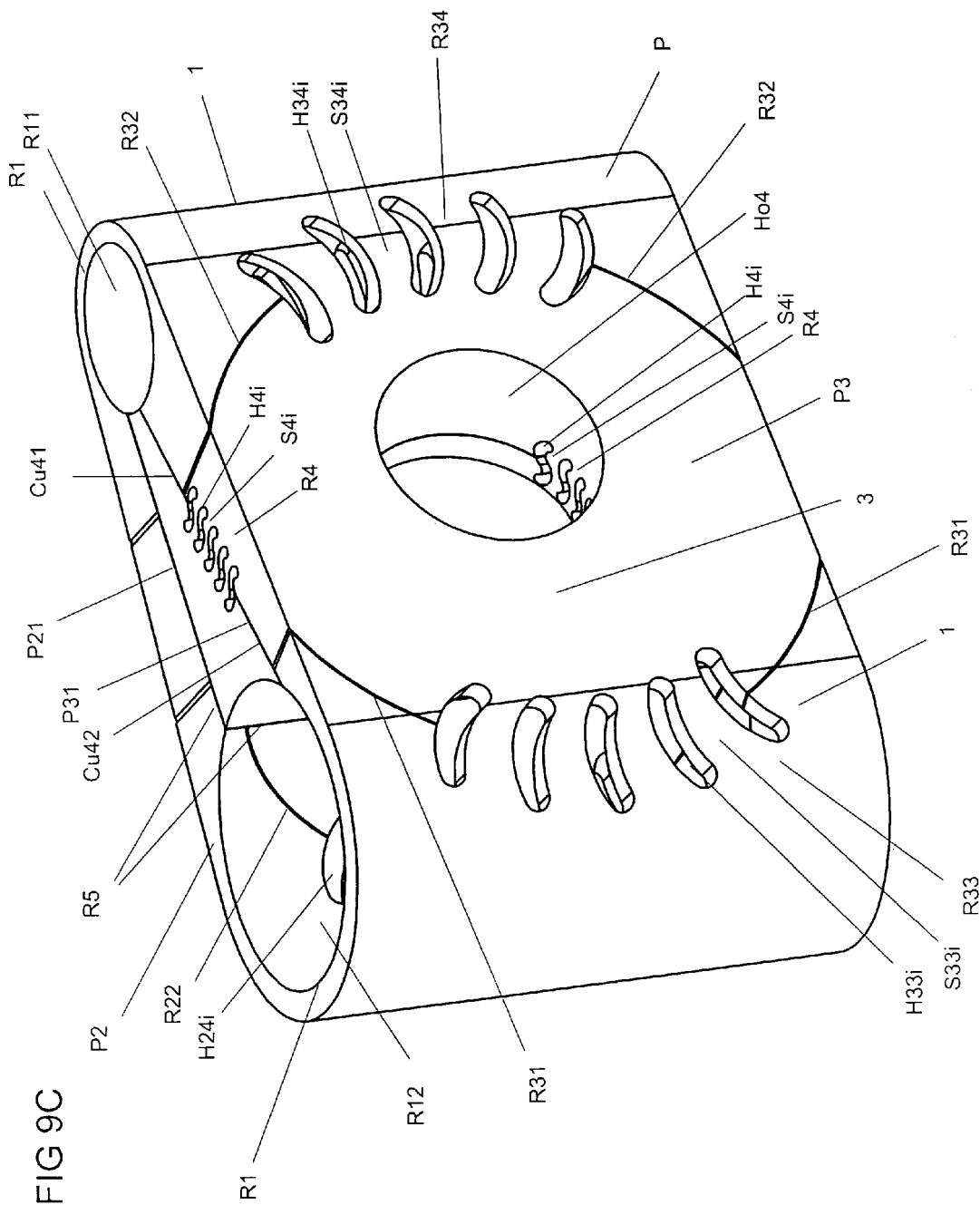
Figure 9D:
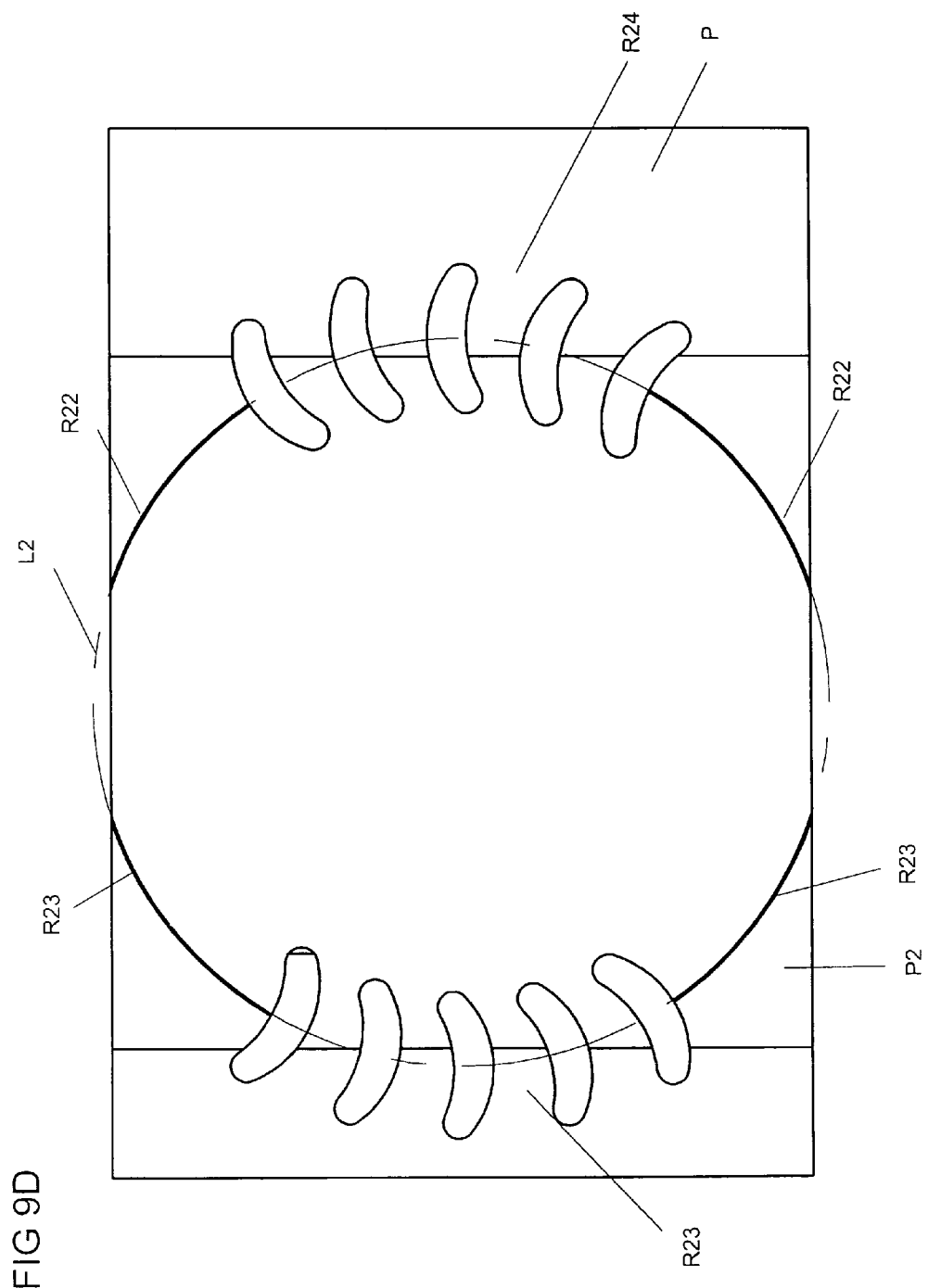
Figure 9F:
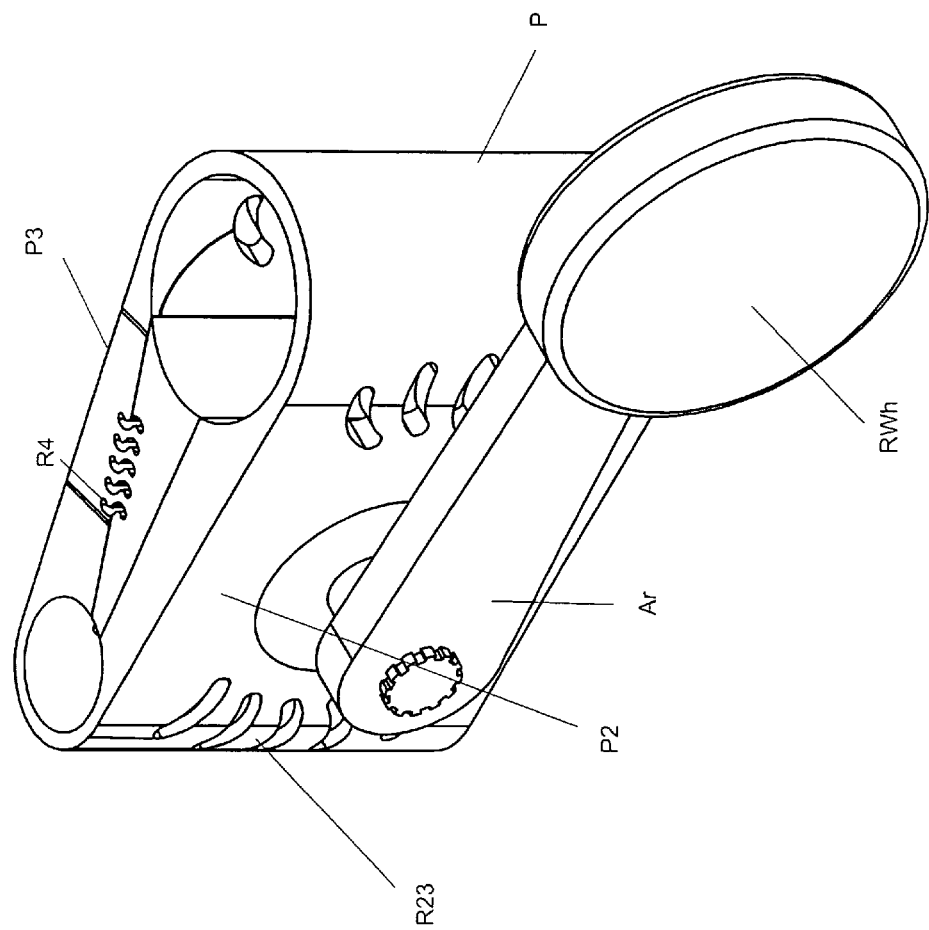
Figure 9G:
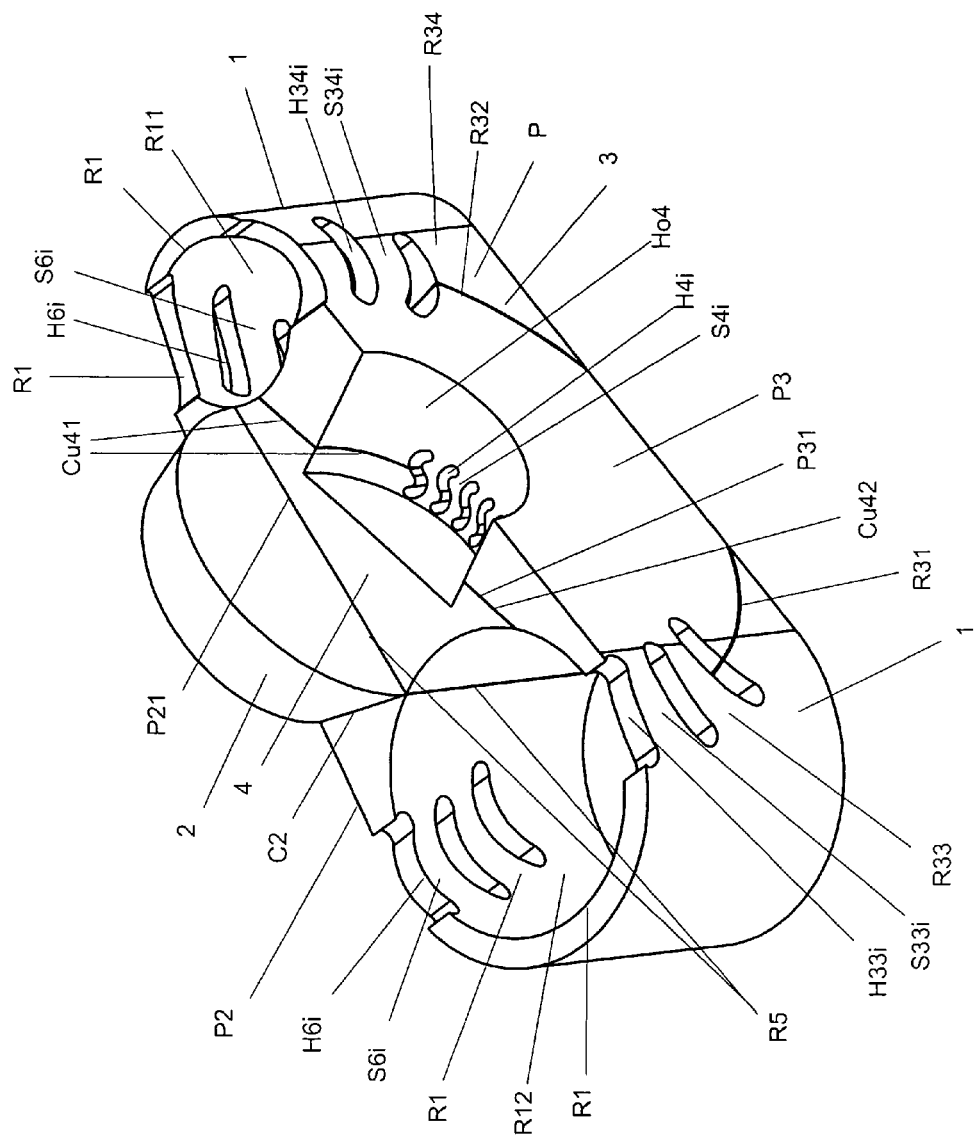
Figure 9H:
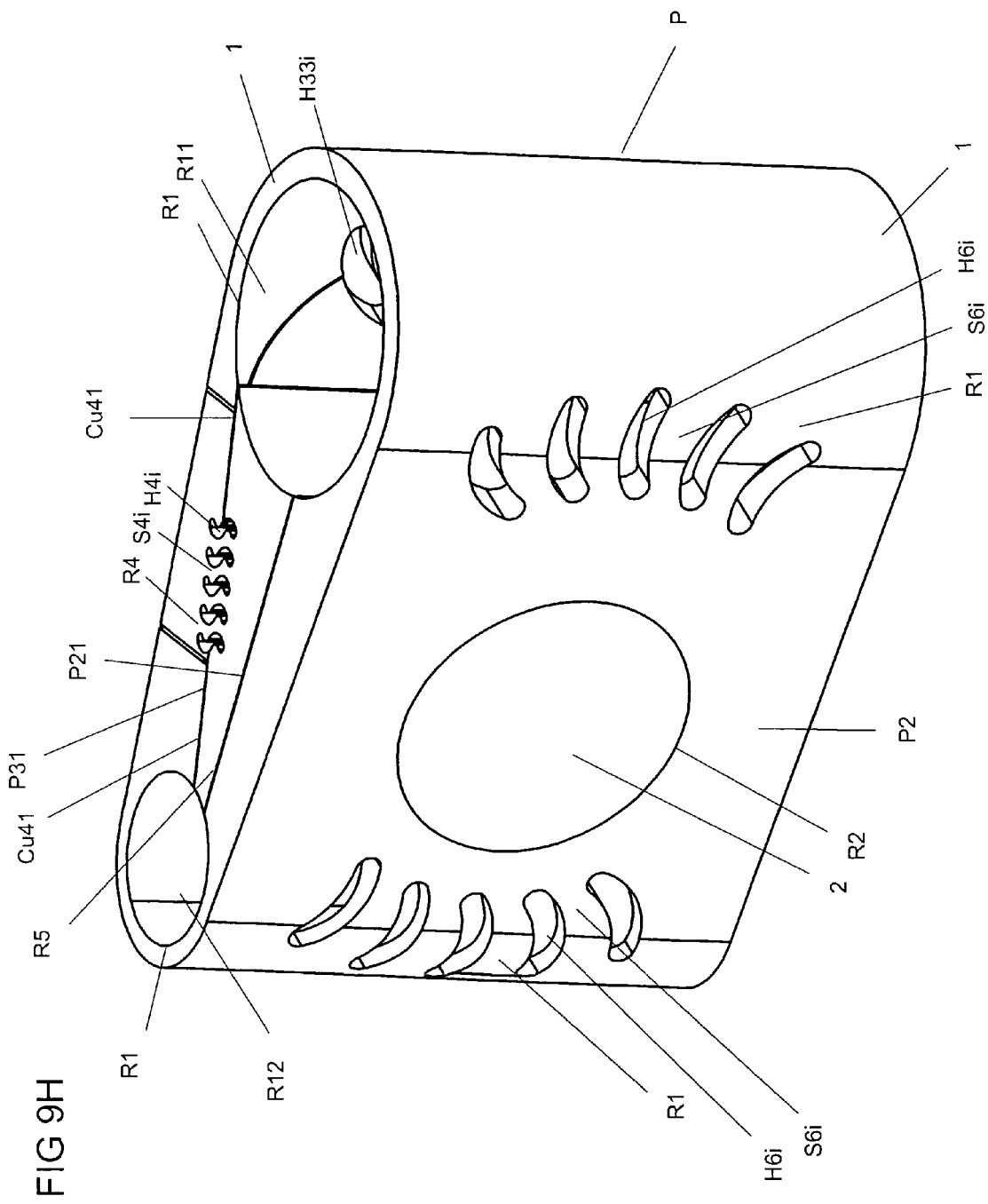

FIGS. 9A-9H depict a "spatial" (see below for a more detailed discussion) smooth progressive rate (steel) spring in accordance with the present invention, and a complete suspension unit utilizing said spring. FIG. 9F provides a general view of this spring and a complete suspension unit utilizing this spring. FIG. 9A is a cross section of the spring along a plane perpendicular to its main plane, FIG. 9B (respectively 9C) is a view from the front (respectively from the rear) of the spring, and FIG. 9D (respectively 9E) is another view from the front (respectively from the rear) of the spring, which reveals details of the geometry of its regions of decreased stiffness. FIG. 9H is a general view of another variant of the spring, and FIG. 9G is a cross-section of the spring of FIG. 9H.

Figure 10A:
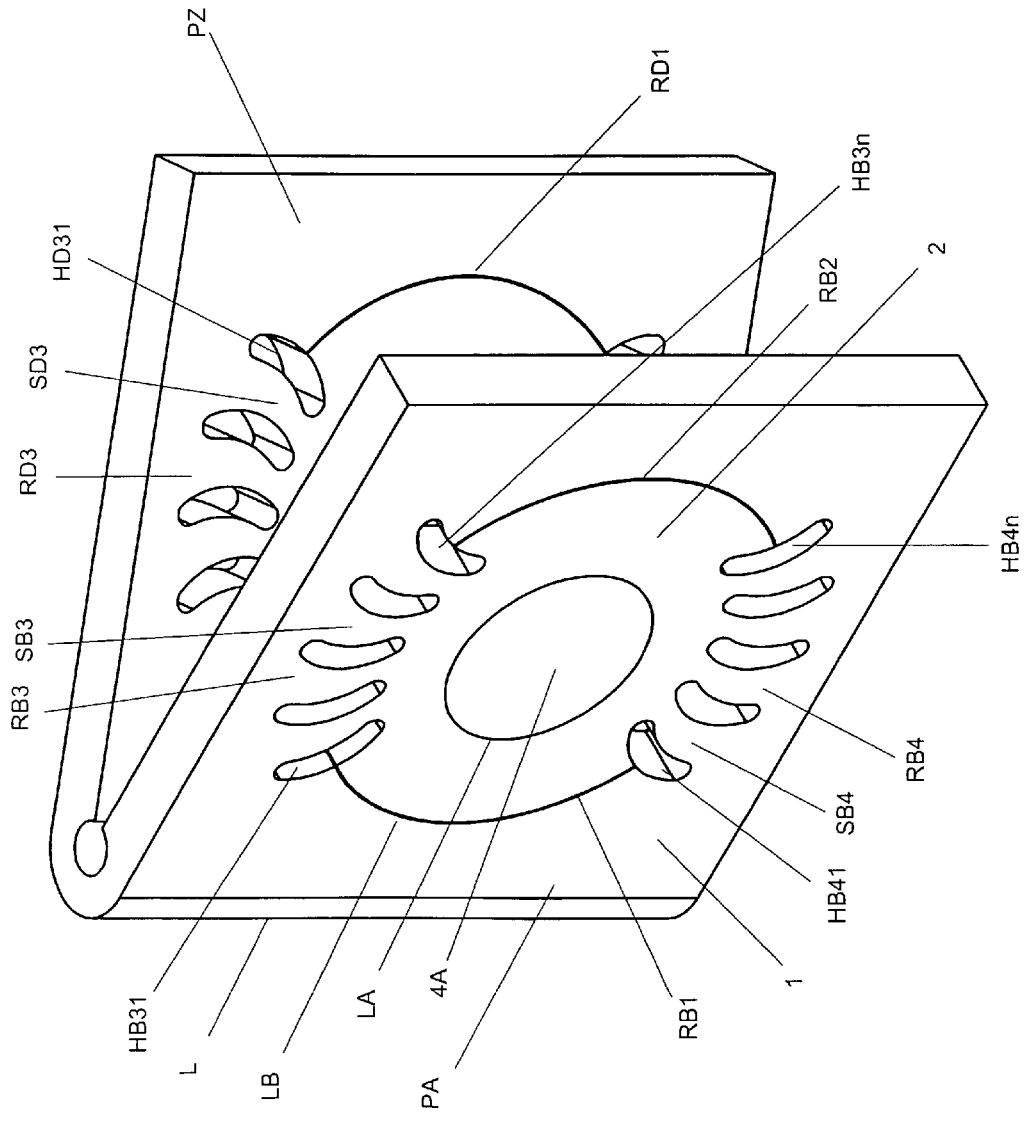
Figure 10B:
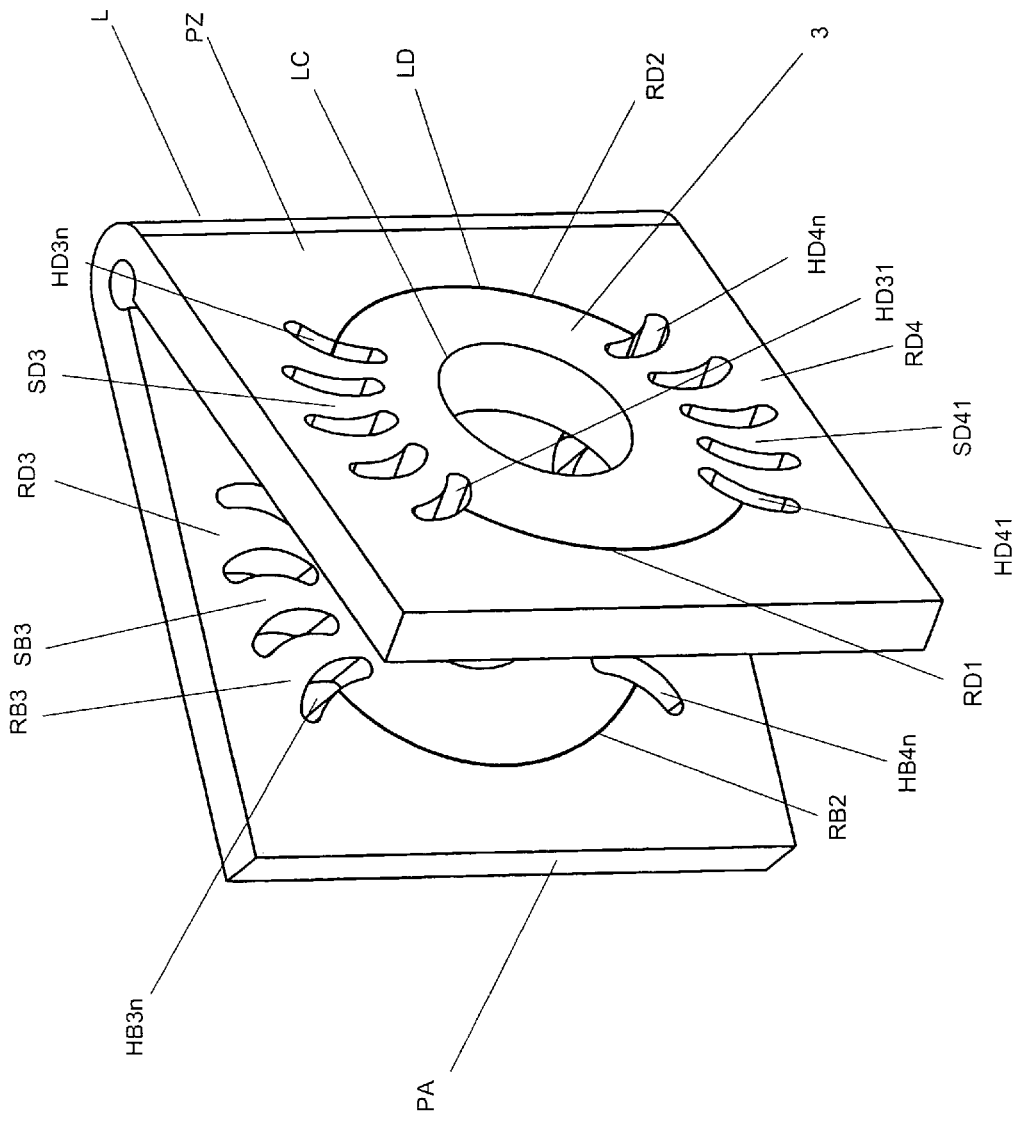
Figure 10C:
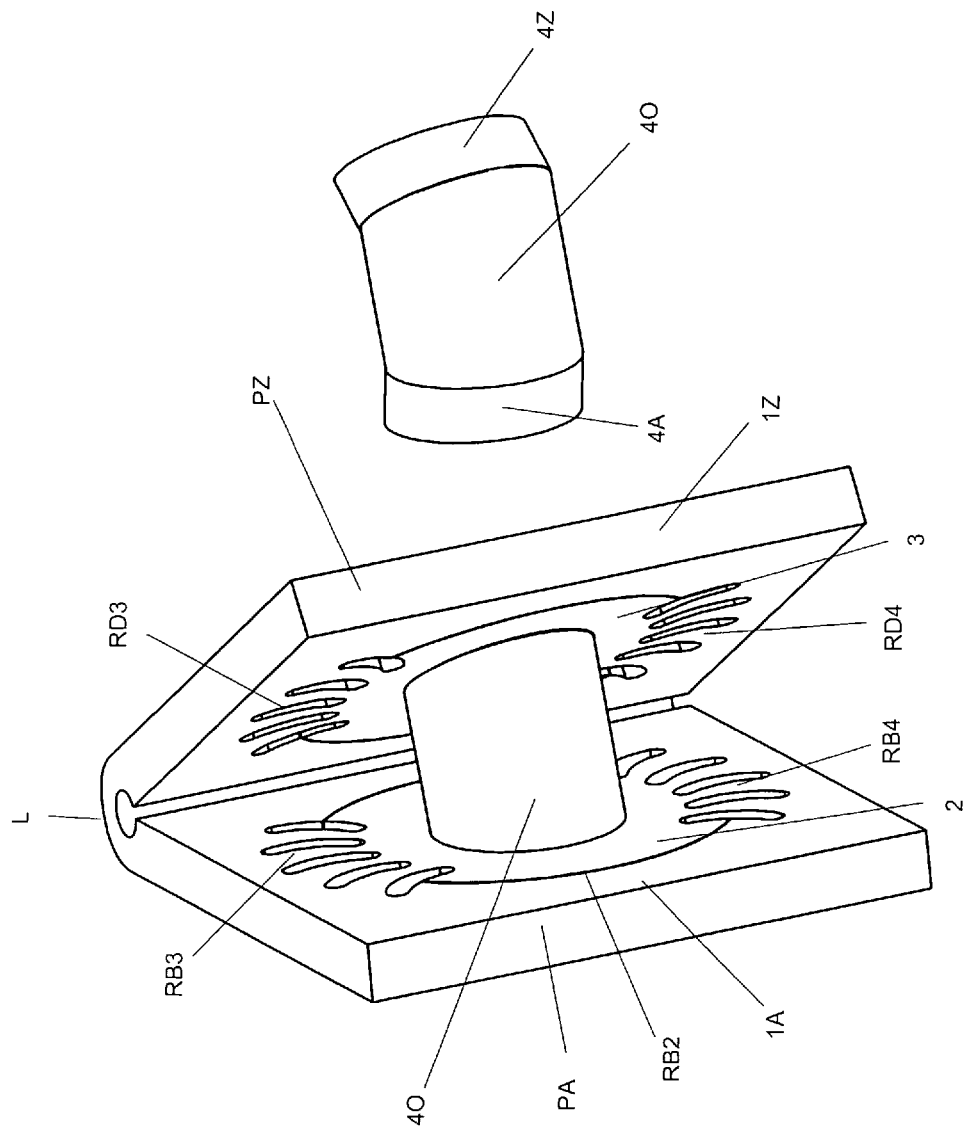
Figure 10D:
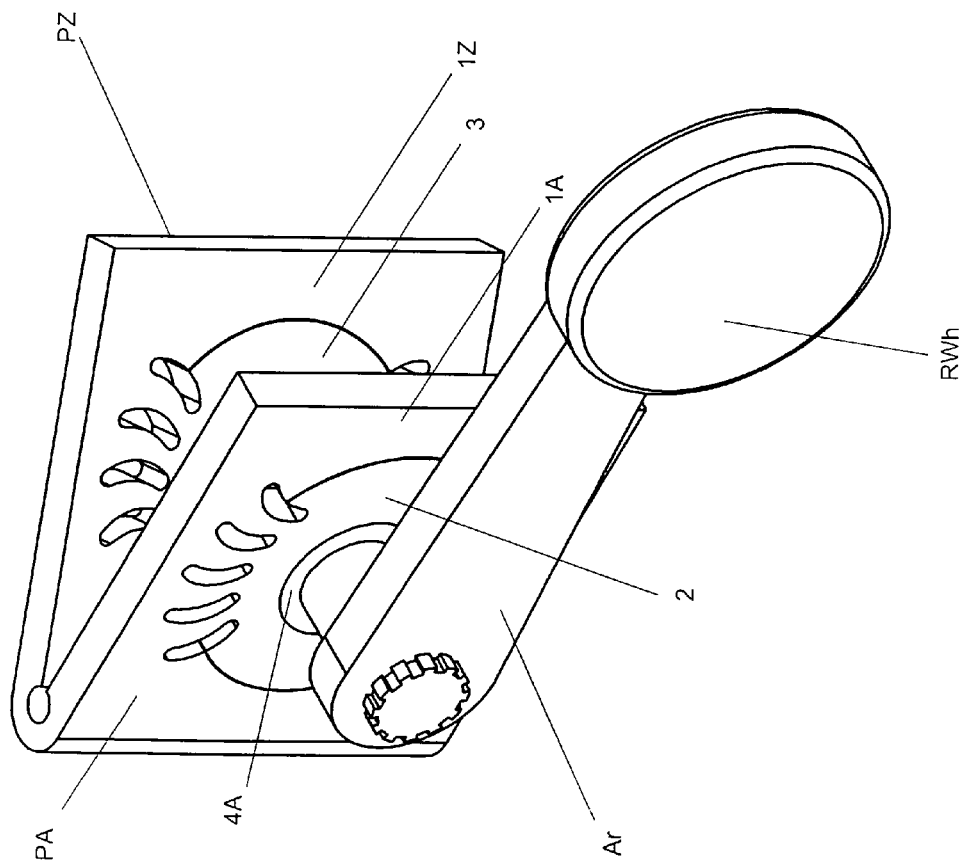

FIGS. 10A-10D depict a simplified method ("spatial" variant of Main Procedure, see a more detailed description below) of producing "spatial" smooth progressive rate (steel) spring in accordance with the present invention, the spring obtained by applying this method, and a complete suspension unit utilizing said spring. FIGS. 10A and 10B are two general views of the spring, FIG. 10C reveals its "internal" structure, and FIG. 10D is a general view of a complete suspension unit utilizing the spring.

Figure 11A:
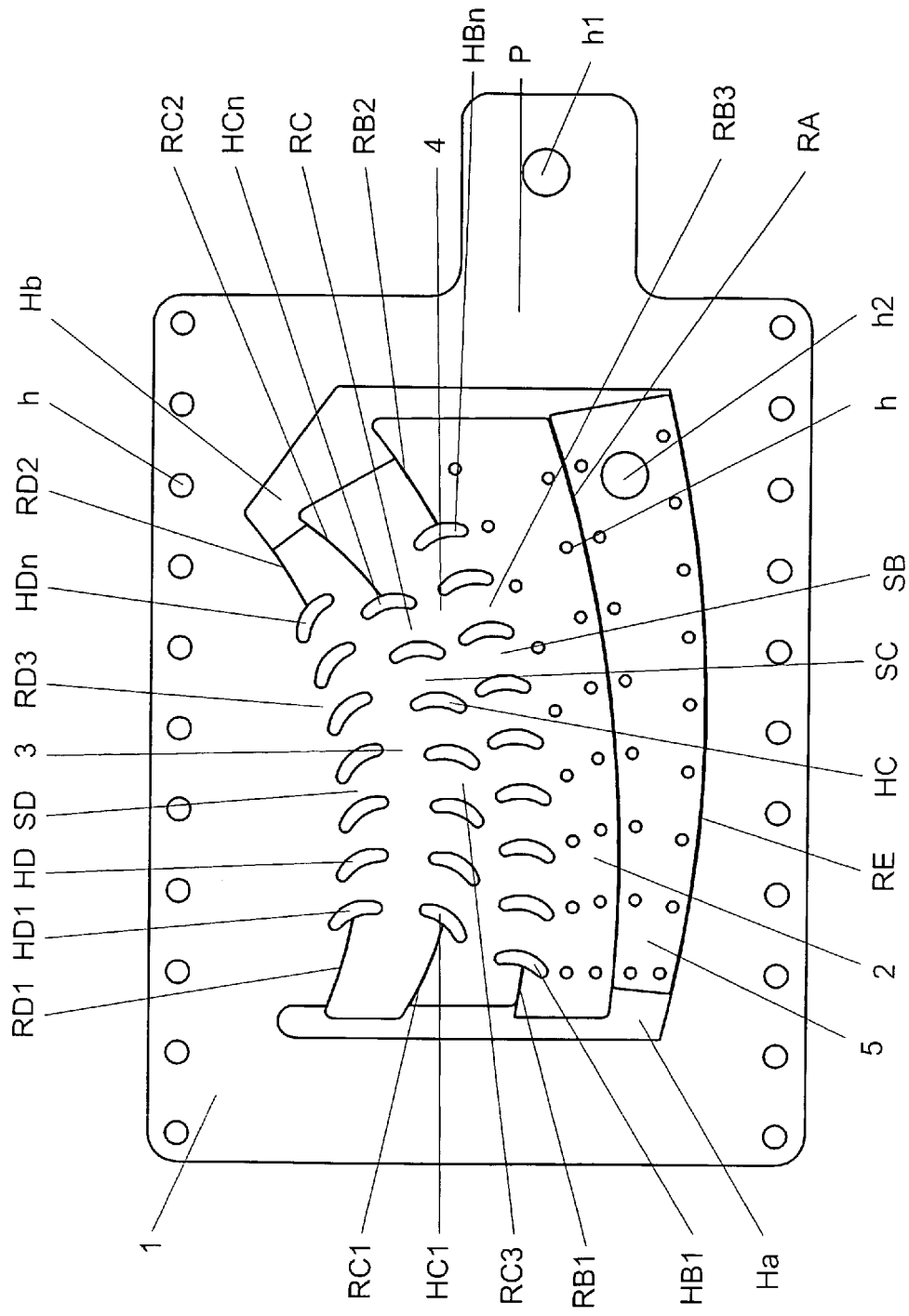

FIGS. 11A-11D show a smooth progressive rate spring with adaptable spring characteristic and complete vehicle suspension unit (with adaptable damping characteristic) according to the present invention obtained by applying Main Procedure 1. FIG. 11A is a general view of the spring, FIG. 11B illustrates the geometry of the regions of decreased stiffness of the spring, and FIG. 11C (respectively 11D) is an assembled (respectively disassembled) view of a complete suspension unit utilizing this spring.

This type of the suspension unit is intended for vehicles destined for applications in changing conditions.

Figure 11C:
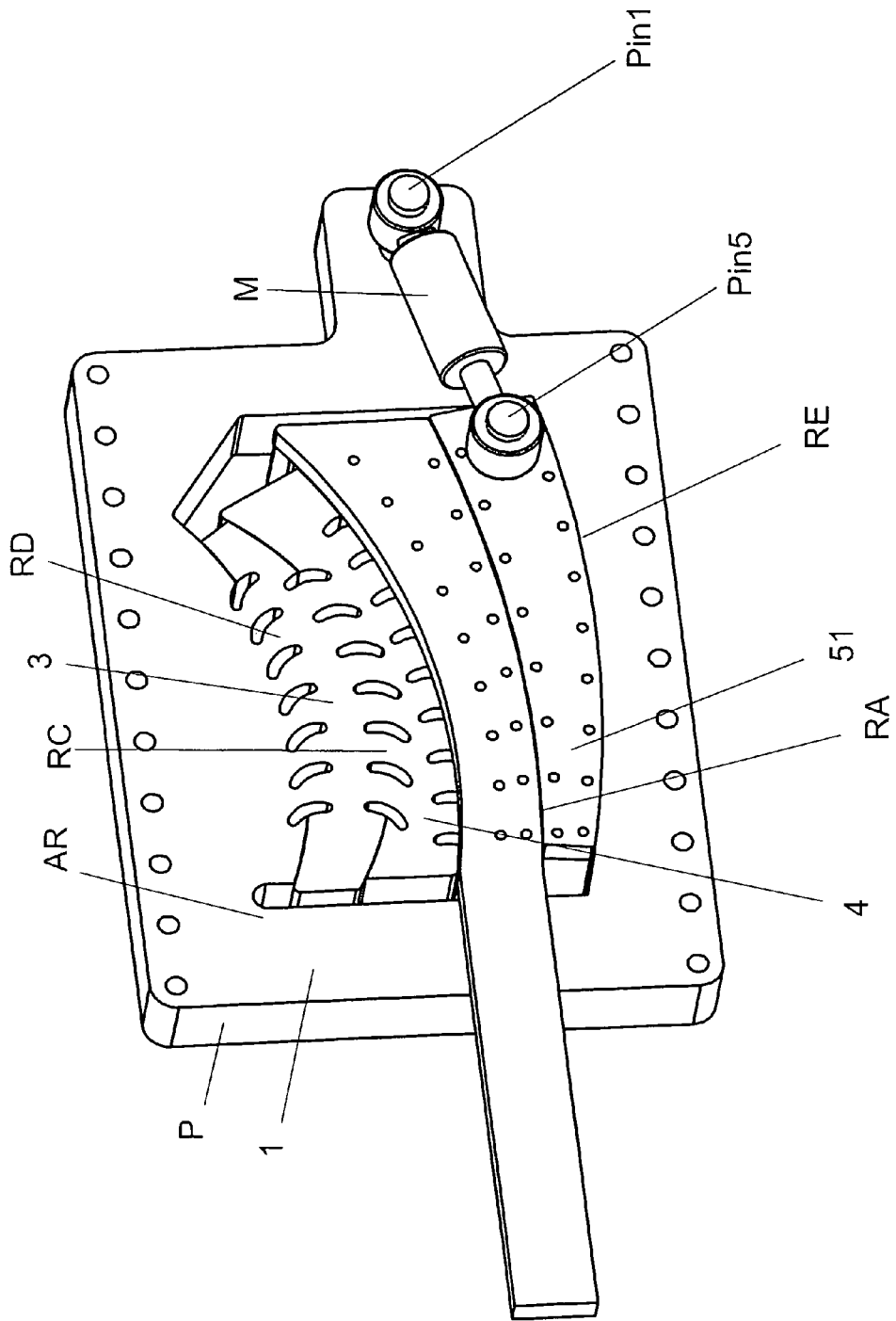
Figure 12A:
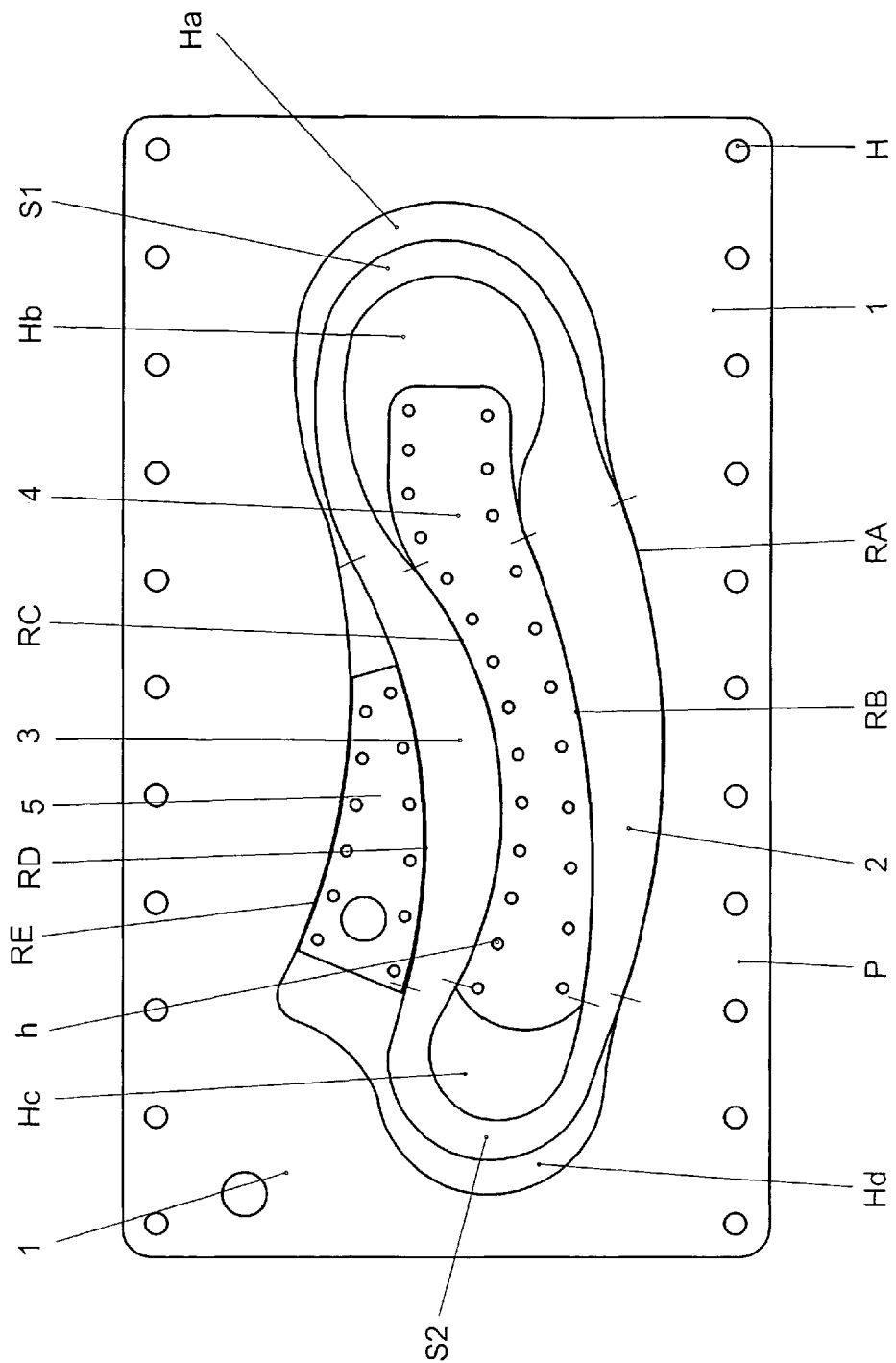
Figure 12B:
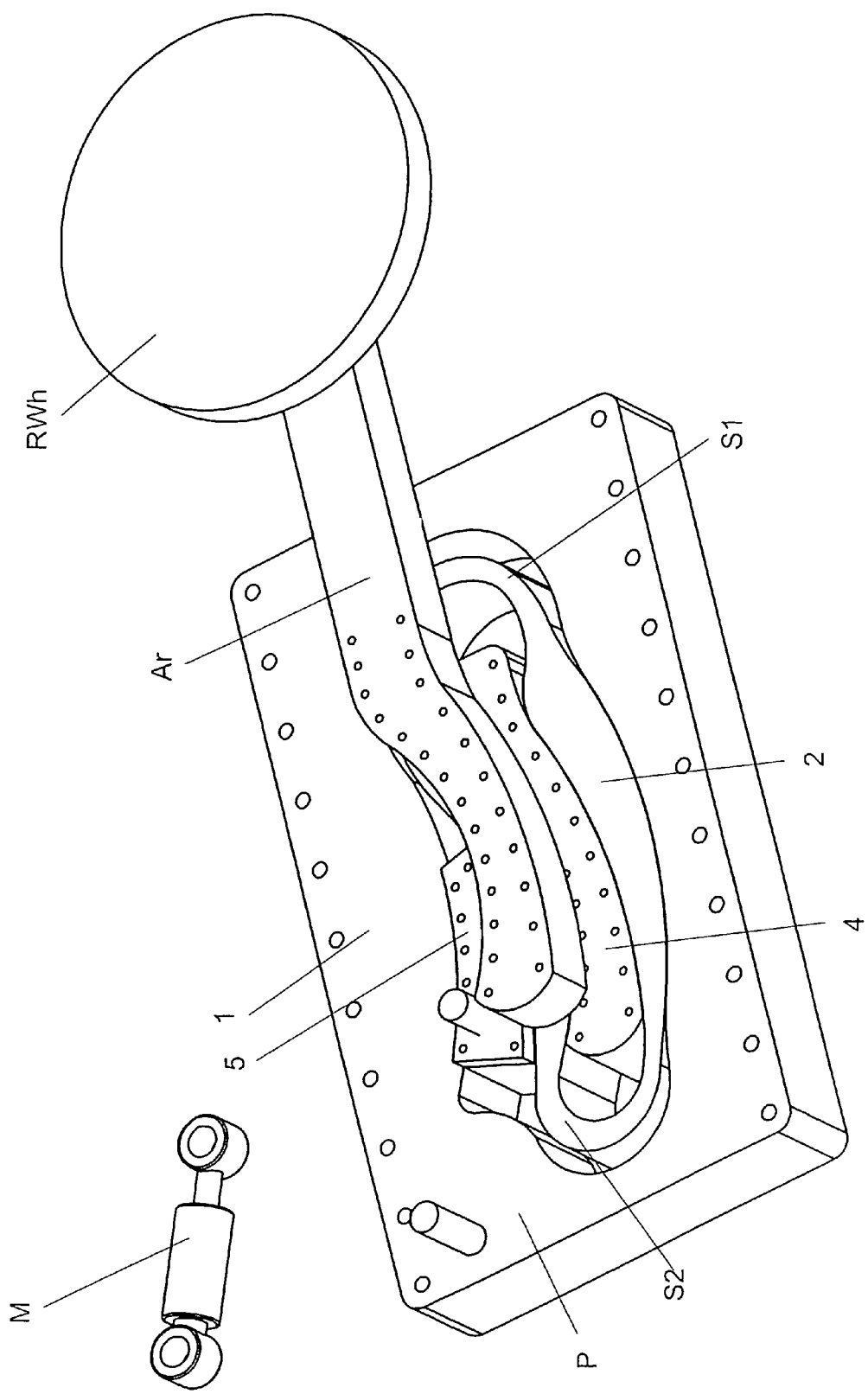
Figure 12C:
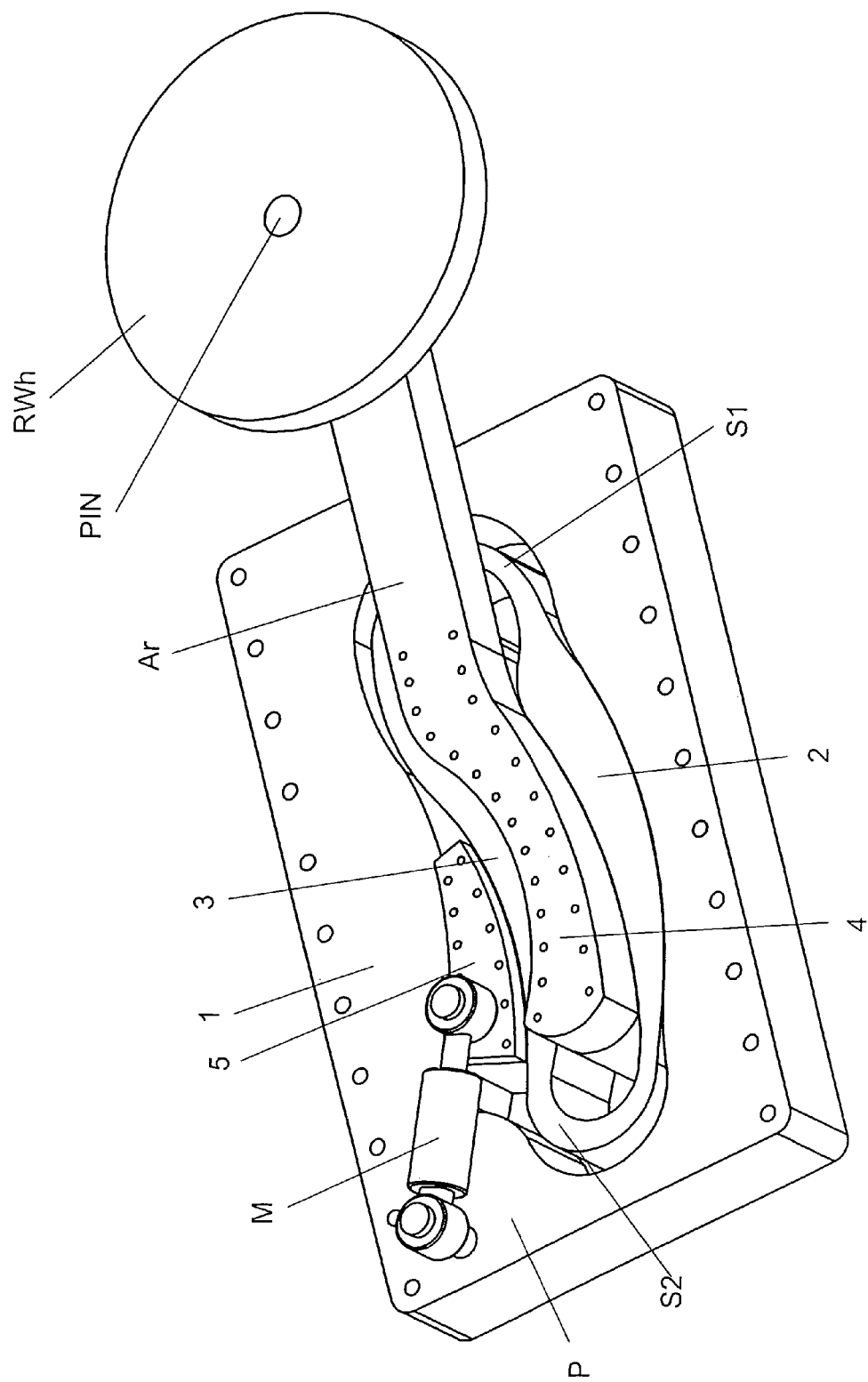

FIGS. 12A-12C show another smooth progressive rate spring with adaptable spring characteristic and complete vehicle suspension unit (with adaptable damping characteristic) according to the present invention obtained by applying Main Procedure 1. FIG. 12A is a general view of the spring, and FIG. 11C (respectively 11B) is an assembled (respectively disassembled) view of a complete suspension unit utilizing this spring.

This spring differs from the previous one mainly by the shape of regions of diversified stiffness.

Figure 13:
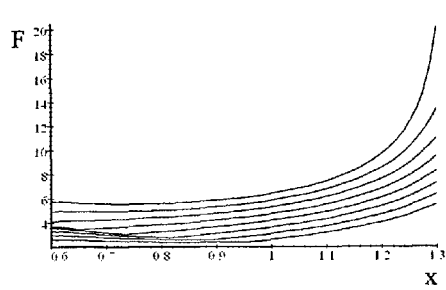
Figure 13:
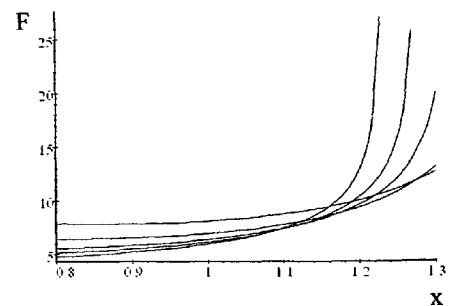
Figure 13:
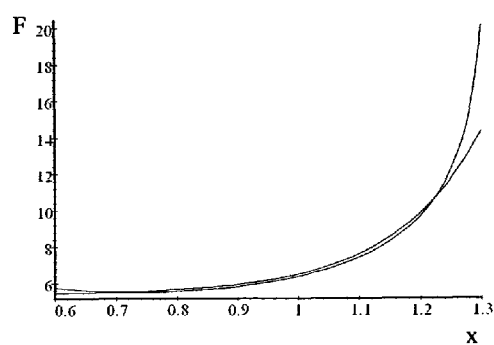
Figure 13:
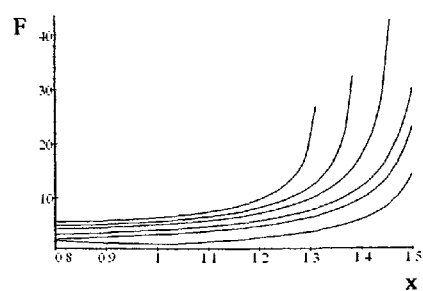
Figure 13:
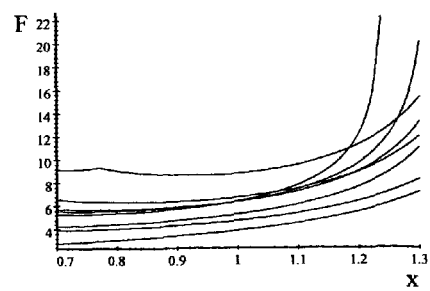

FIG. 13 shows some spring characteristics of the springs according to the invention.

This type of the suspension unit, like the previous one, is intended for vehicles destined for applications in changing conditions.

DETAILED DESCRIPTION OF THE PREFERRED EMBODIMENTS

In this section we give a detailed description of twelve preferred embodiments (Examples) of the invention. All the embodiments presented in this section are based on the general principles described in section Summary of the Invention (see Observations 1-4, Conclusion and description of Main Procedure in section Summary of the Invention).

EXAMPLE 1

Referring to FIGS. 1A-1D there is shown a smooth progressive rate spring (S) obtained by applying Main Procedure as described in section Summary of the Invention and a complete vehicle suspension unit utilizing this spring, both in accordance with the present invention.

Figure 1A:
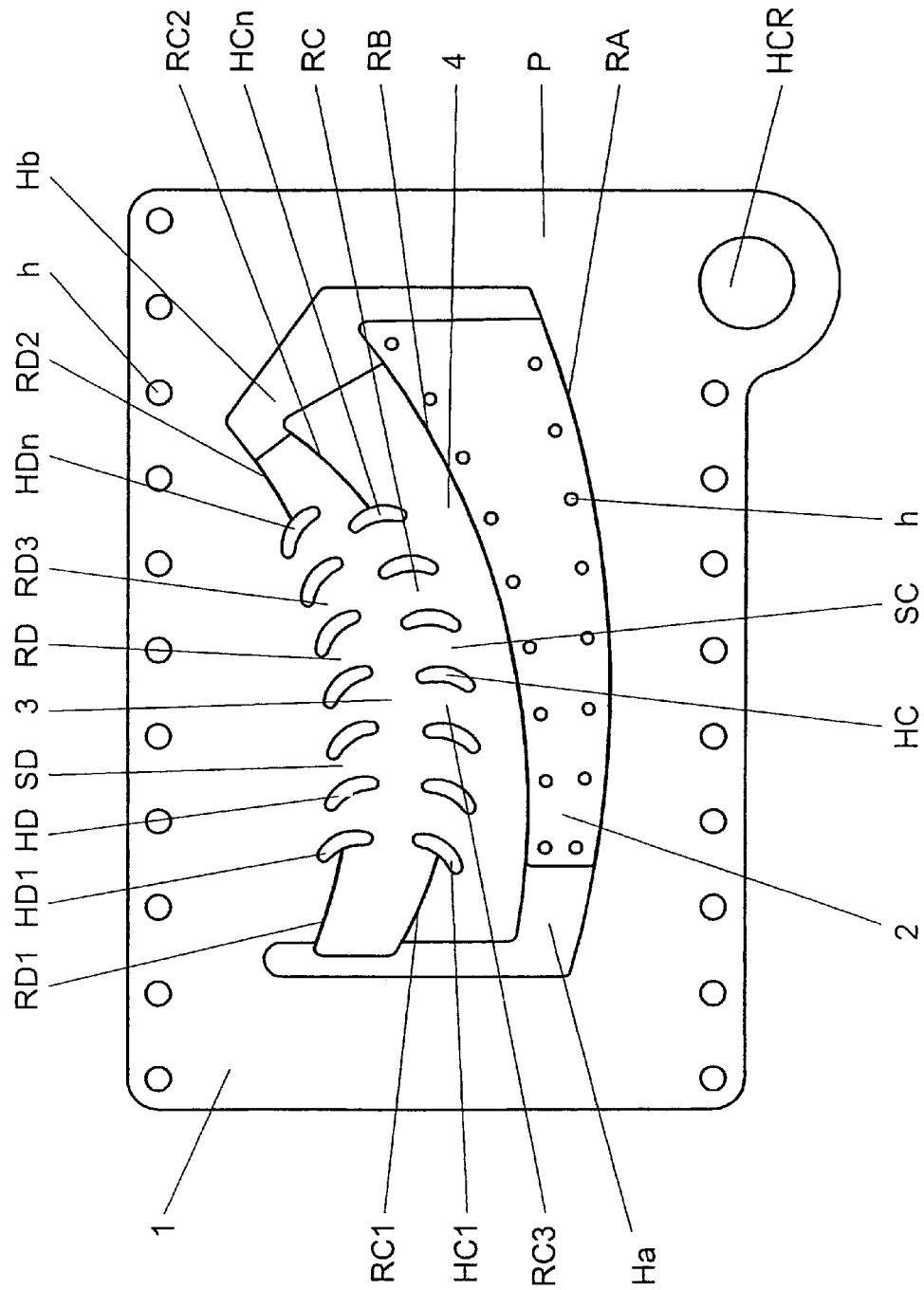
FIG. 1A shows the principal form of the smooth progressive rate (steel) spring in accordance with the present invention obtained by applying Main Procedure (steps (a)-(d)).
Figure 1B:
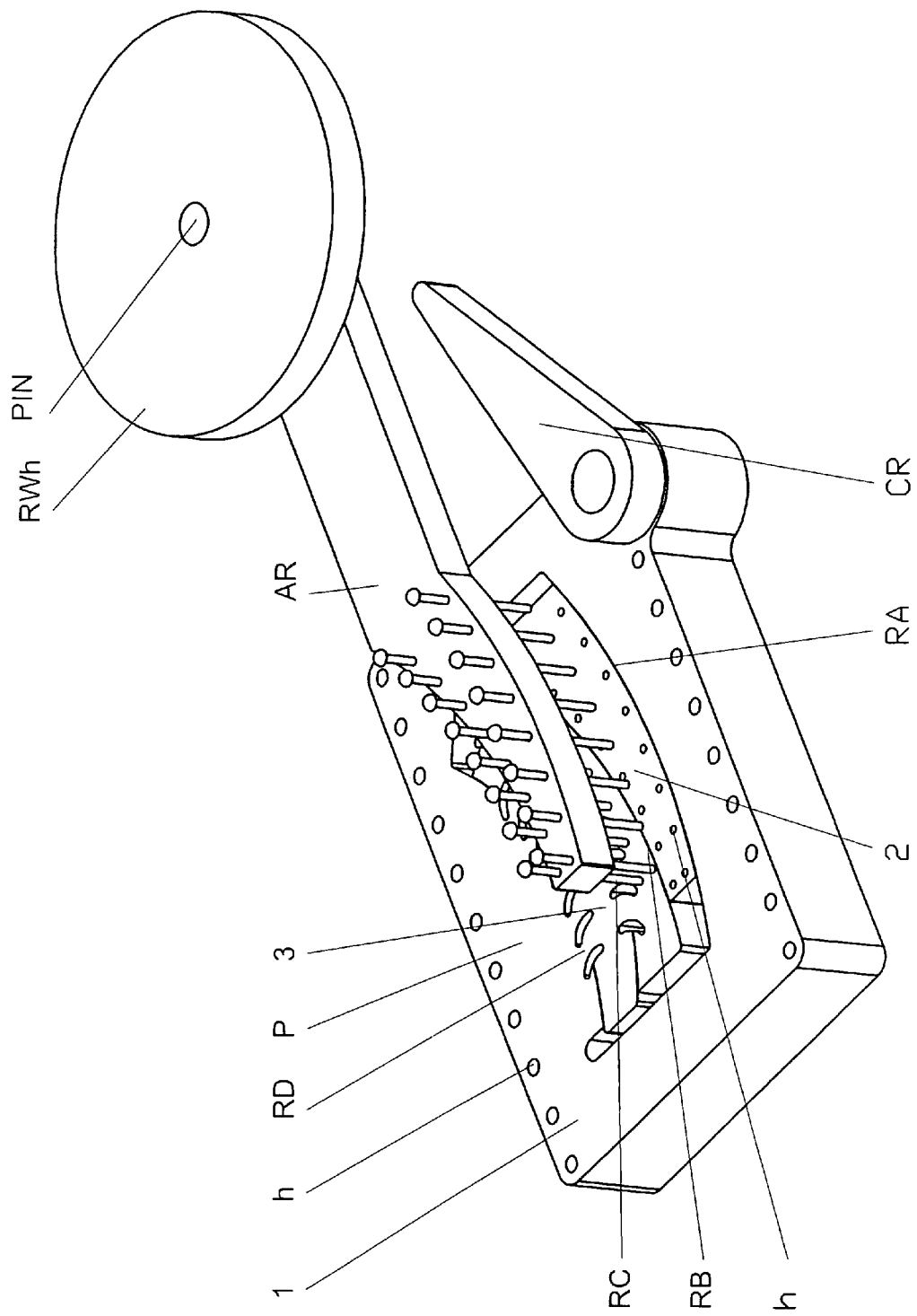
FIGS. 1B-1C show the principal form of the complete general-purpose progressive rate (steel) vehicle suspension unit in accordance with the present invention obtained by applying Main Procedure (steps (a)-(f)) and utilizing the spring of FIG. 1.
Figure 1C:
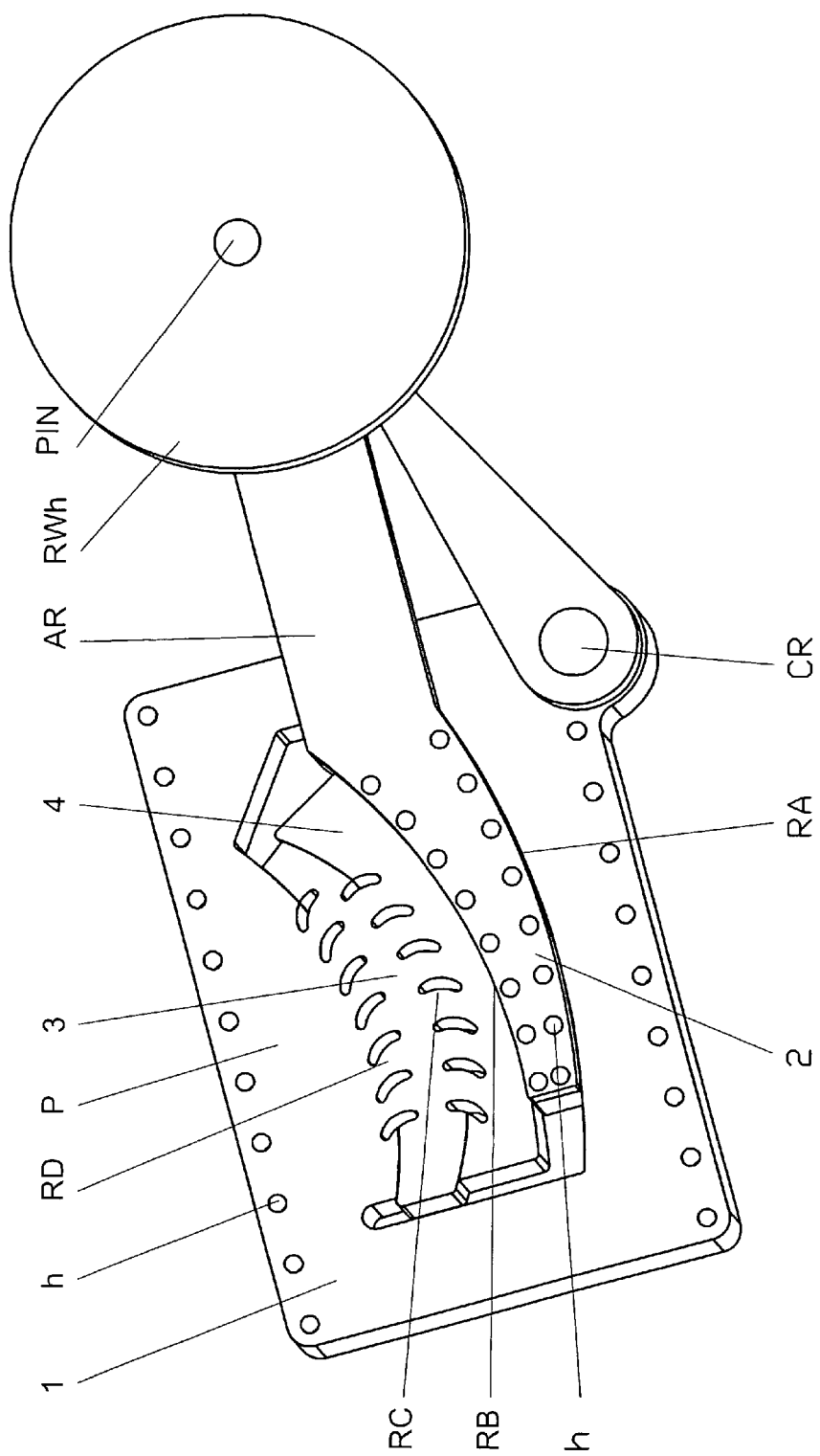
Figure 1D:
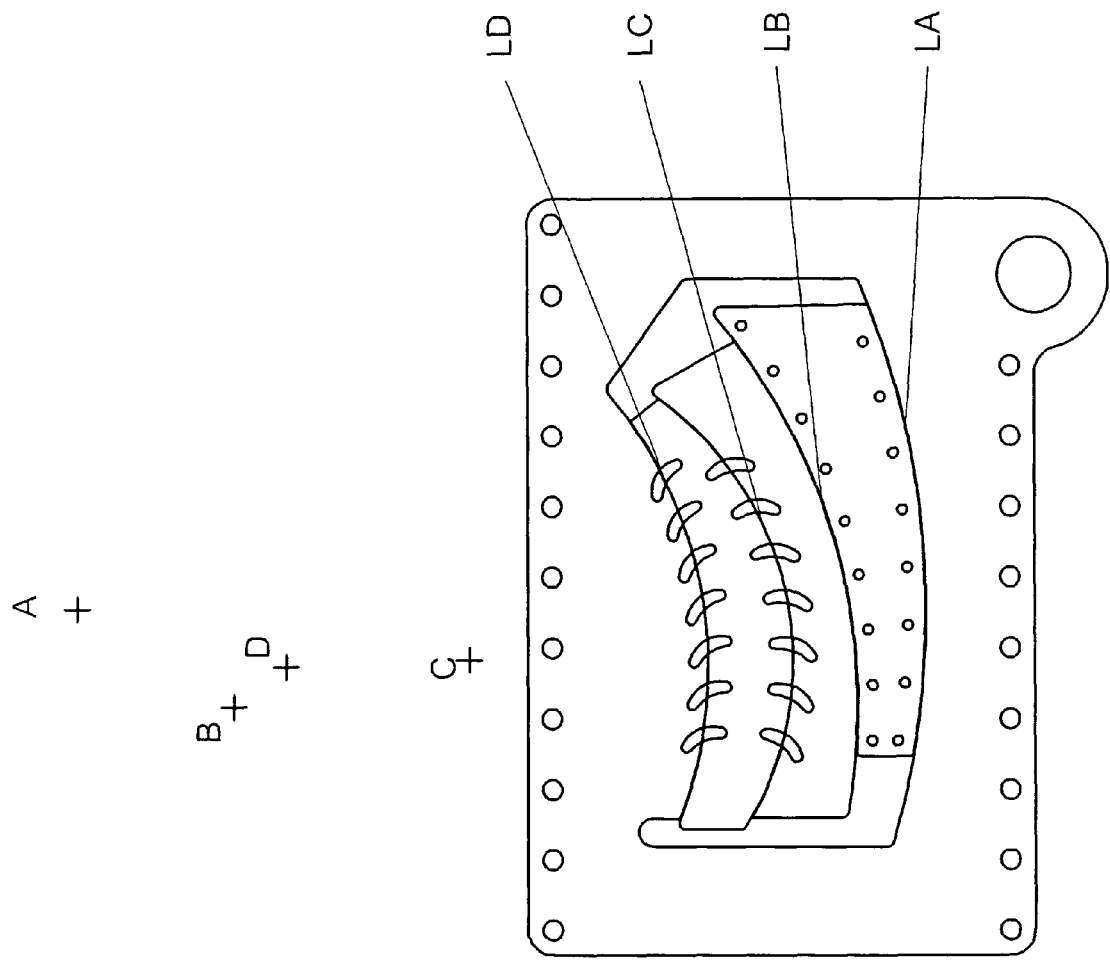
FIG. 1D explains the geometry of the regions of diversified stiffness of the spring depicted in FIG. 1A.

Now, referring to FIGS. 1A and 1D, four points (A), (B), (C) and (D) are fixed in the plane of the steel plate (P) (made of spring steel), and four circular arcs (LA), (LB), (LC) and (LD) with the center at the points (A), (B), (C) and (D) respectively are traced in the plate (P) (see FIG. 1D). Four regions (RA), (RB), (RC) and (RD) of decreased stiffness are formed in the plate (P). The regions (RA), (RB), (RC) and (RD) assume general form of the circular arc (LA), (LB), (LC) and (LD) respectively.

To be more precise, the region (RA) (of zero stiffness; in other words the elasticity coefficient of this region equals zero) is obtained by cutting the plate (P) precisely along the arc (LA).

Similarly, the region (RB) (of zero stiffness) is obtained by cutting the plate (P) precisely along the arc (LB).

The region (RC) of decreased stiffness is composed of three sub-regions, namely the sub-region (RC1) obtained by cutting the plate precisely along a portion of the arc (LC), sub-region (RC2) obtained by cutting the plate precisely along another portion of the arc (LC), and the sub-region (RC3) separating the sub-regions (RC1) and (RC2) assuming the form of a collection of separate elongated holes (HC) separated by the ribs (SC); the holes (HC) and the ribs (SC) are placed substantially along the arc (LC). The extreme holes (HC1) and (HCn) are connected with the subregions (RC1) and (RC2) respectively.

Similarly, the region (RD) of decreased stiffness is composed of three sub-regions, namely the sub-region (RD1) obtained by cutting the plate along a portion of the arc (LD), sub-region (RD2) obtained by cutting the plate along another portion of the arc (LD), and the sub-region (RD3) separating the sub-regions (RD1) and (RD2) assuming the form of a collection of separate elongated holes (HD) separated by the ribs (SD); the holes (HD) and the ribs (SD) are placed substantially along the arc (LD). The extreme holes (HD1) and (HDn) are connected with the sub-regions (RD1) and (RD2) respectively.

Another two holes (Ha) and (Hb) are cut in the plate (P) of the spring. In fact, the holes (Ha) and (Hb), the region (RA), the sub-regions (RD1) and (RD2) and extreme holes (HD1) and (HDn) are preferably obtained by one continuous cutting.

By forming the regions (RA), (RB), (RC) and (RD) of decreased stiffness, the regions (1), (2), (3) and (4) of relatively large stiffness are also formed in the plate (P). Note that the region (2) of large stiffness constitutes a separate piece of the plate (P).

In order to obtain the complete progressive rate vehicle suspension unit using this spring (see FIG. 1B (respectively 1C), which is a disassembled (respectively assembled) view of the suspension unit), a vehicle's road wheel arm (Ar) is attached (preferably by riveting) to the region (2) of large stiffness of the spring (S), and a control rod (CR) is pivotally mounted in the plate (P) of the spring (S) using a hole (HCR). Holes (h) are bored in the plate (P) of the spring to enable the suspension unit to be attached (e.g. by riveting) to vehicle's frame. The road wheel (schematically indicated in FIGS. 1B and 1C as (RWh)) is pivotally mounted on the pin (PIN) attached to the arm (Ar).

Here is a brief discussion of the work of the suspension unit and its progressive spring.

DISCUSSION OF THE WORK OF THE SPRING. As an external force loads the vehicle road wheel, the force is transferred (through the road wheel arm (Ar) and the region (2) of large stiffness) to the spring (S), thus causing the regions (RC) and (RD) of decreased (but non-zero) stiffness of the spring (S) to deform and generate a force within the spring countering the external force. (Note, that also the regions (RA) and (RB) (of zero stiffness) are subjected to a "deformation" ("strain"); to be more precise, in this instance this "deformation" ("strain") amounts to sliding of the region (2) of large stiffness relative the regions (1) and (4) of large stiffness). At the same time, the regions (1)-(4) of relatively large stiffness remain substantially non-deformed. Thanks to the particular form of the regions of large and regions of decreased stiffness of the spring (S), dependence of the strain (of the regions of decreased stiffness) of the spring (S) and forces within the spring on the vertical travel of the road wheel is highly non-linear (progressive) and smooth. Consequently, this non-linear smooth dependence is transformed, via the well-known linear strain-stress dependence, into non-linear and smooth dependence of the spring force on the vertical travel of the road wheel.

Essentially the same Discussion applies to all other Examples presented below.

The following remark is of particular importance.

REMARK. The general shape of the spring characteristic depends on the relative position of the points (A), (B), (C) and (D), and can be varied within broad limits by changing the position of these points (in particular exponential-like characteristic can be obtained). The strictly arc-shaped portions of the regions (RA), (RB), (RC) and (RD) of decreased stiffness are not necessary to assure progressiveness of the spring, but facilitate achieving the prescribed characteristic of the spring with satisfactory precision.

EXAMPLE 2

FIGS. 2A-2F shows the spring substantially of the type depicted in FIGS. 1A-1D with an alternative form of the regions (RA), (RB), (RC) and (RD) with decreased stiffness. The description above applies almost literally to this spring with only minor changes.

Thus the four points (A), (B), (C) and (D) are fixed in the plane of the steel plate (P) (made of spring steel), and four circular arcs (LA), (LB), (LC) and (LD) with the center at the points (A), (B), (C) and (D) respectively are traced in the plate (P). (These two operations are completely analogous to these of Example 1, and therefore the points (A), (B), (C) and (D) and the arcs (LA), (LB), (LC) and (LD) are not shown in the accompanying FIGS. 2A-2F). Four regions (RA), (RB), (RC) and (RD) of decreased stiffness are formed in the plate (P). The regions (RA), (RB), (RC) and (RD) assume general form of the circular arc (LA), (LB), (LC) and (LD) respectively.

To be more precise, all the regions (RA), (RB), (RC) and (RD) of decreased stiffness (in fact zero stiffness in this instance) are formed by cutting the plate (P) precisely along the circular arcs (LA), (LB), (LC) and (LD) respectively. Moreover four more holes (Ha), (Hb), (Hc) and (Hd) are cut in the plate (P) of the spring; the boundary of the holes (Ha) and (Hd) is connected with the regions (RA) and (RD) of decreased stiffness; the boundary of the holes (Hb) and (Hc) is connected with the regions (RB) and (RC) of decreased stiffness. In fact, the holes (Ha) and (Hd) and the regions (RA) and (RD) are preferably obtained by one continuous cutting. Similarly, the holes (Hb) and (Hc) and the regions (RB) and (RC) are preferably obtained by one continuous cutting.

By forming the regions (RA), (RB), (RC) and (RD) of decreased stiffness and cutting the holes (Ha), (Hb), (Hc) and (Hd), the regions (1), (2), (3) and (4) of relatively large stiffness and massive ribs (S1) and (S2) connecting the regions (2) and (3) are also formed in the plate (P); thus the regions (2) and (3) of large stiffness and the ribs (S1) and (S2) constitute a unique whole in this instance, and this whole is separated from the plate (P). Similarly, the region (4) of large stiffness is entirely separated from the plate (P).

Figure 2B:
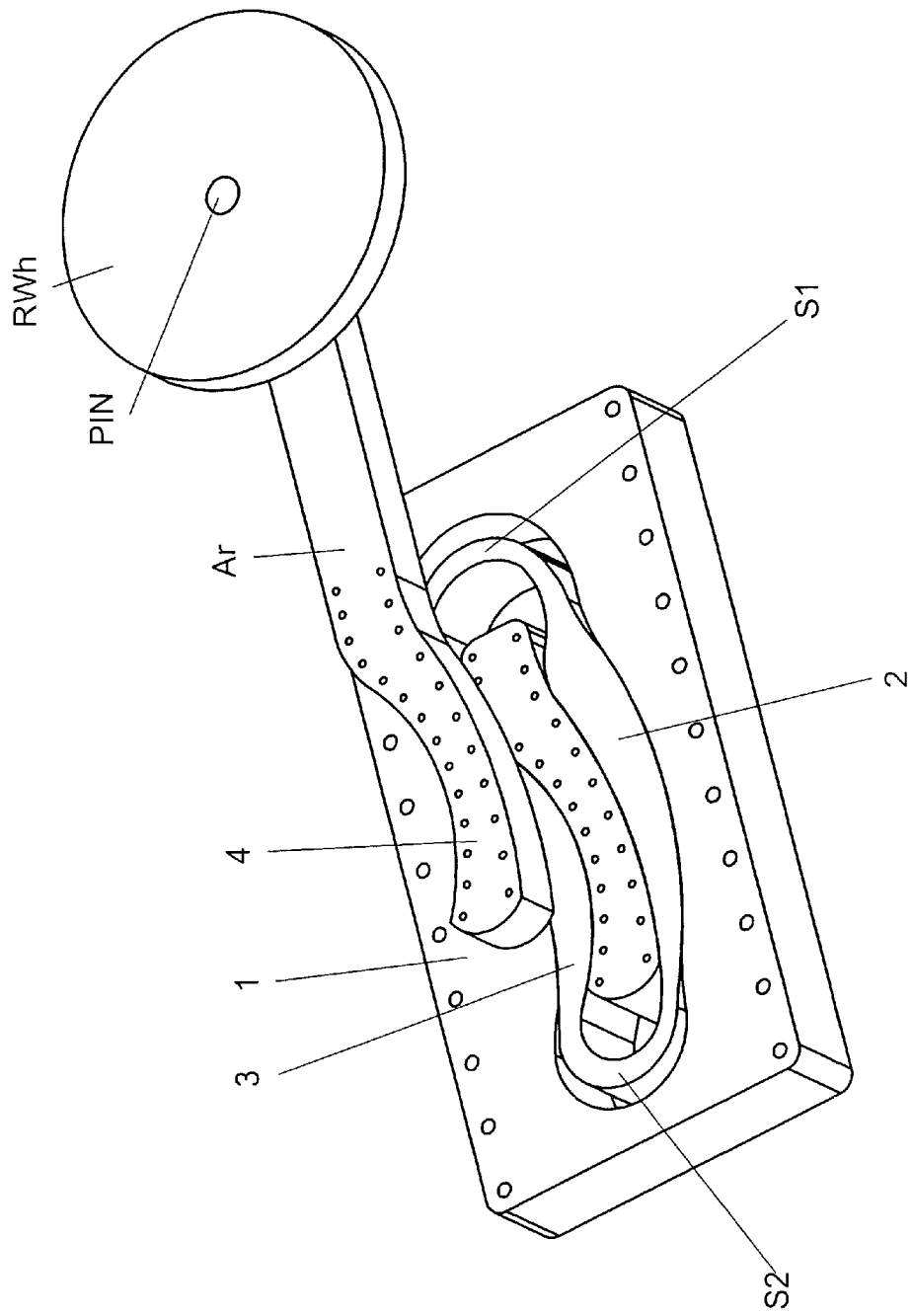
FIGS. 2B and 2C (respectively 2E and 2F) show complete vehicle suspension units utilizing the springs of FIG. 2A (respectively 2D).
Figure 2C:
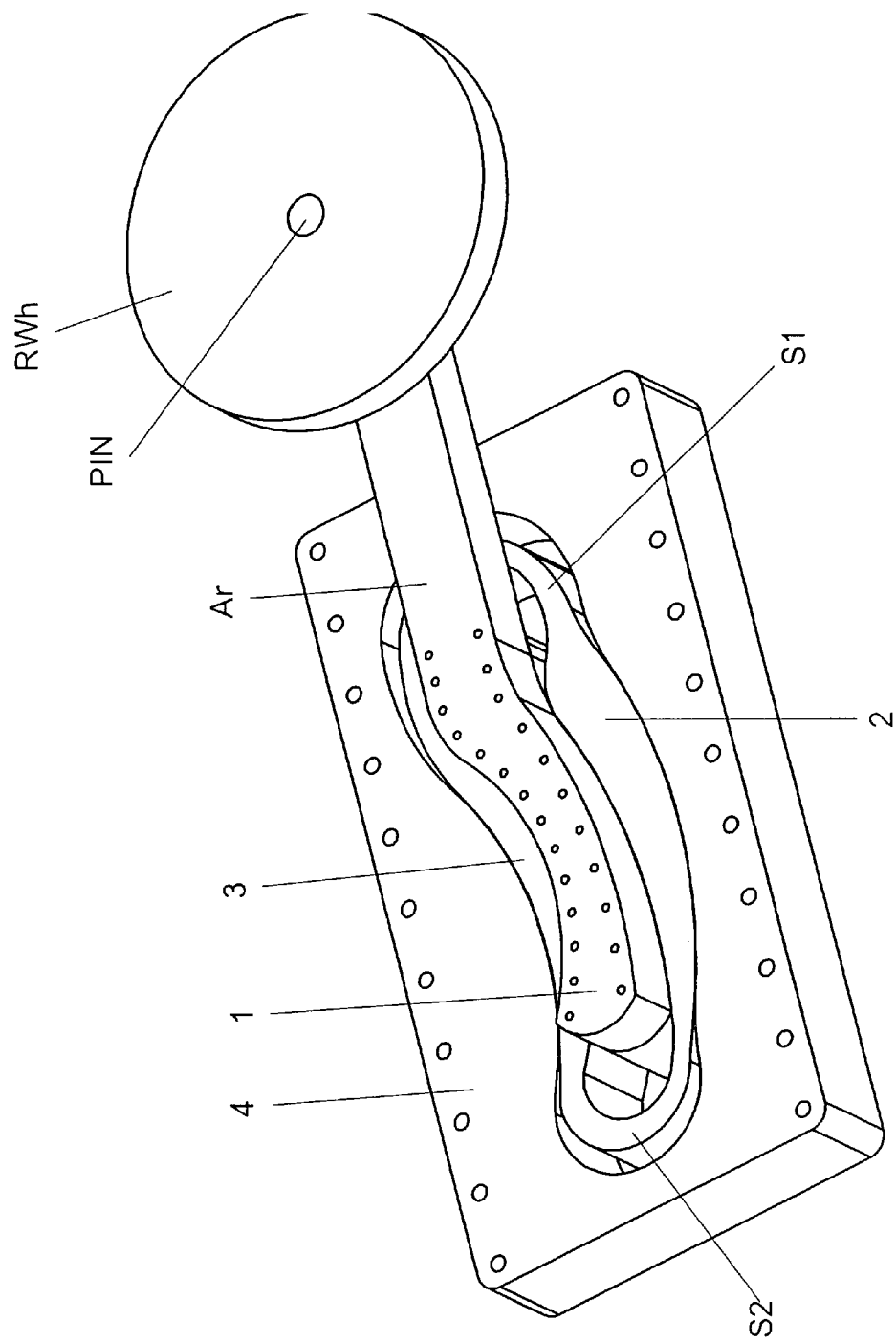

In order to obtain the complete progressive rate vehicle suspension unit using this spring (see FIG. 2B (respectively 2C), which is a disassembled (respectively assembled) view of the suspension unit), a vehicle's road wheel arm (Ar) is attached to the region (4) of large stiffness of the spring (S) so as to further increase stiffness of this region and preserve the pieces (4) and (2)-(3)-(S1)-(S2) from being separated from the plate (P).

Figure 2D:
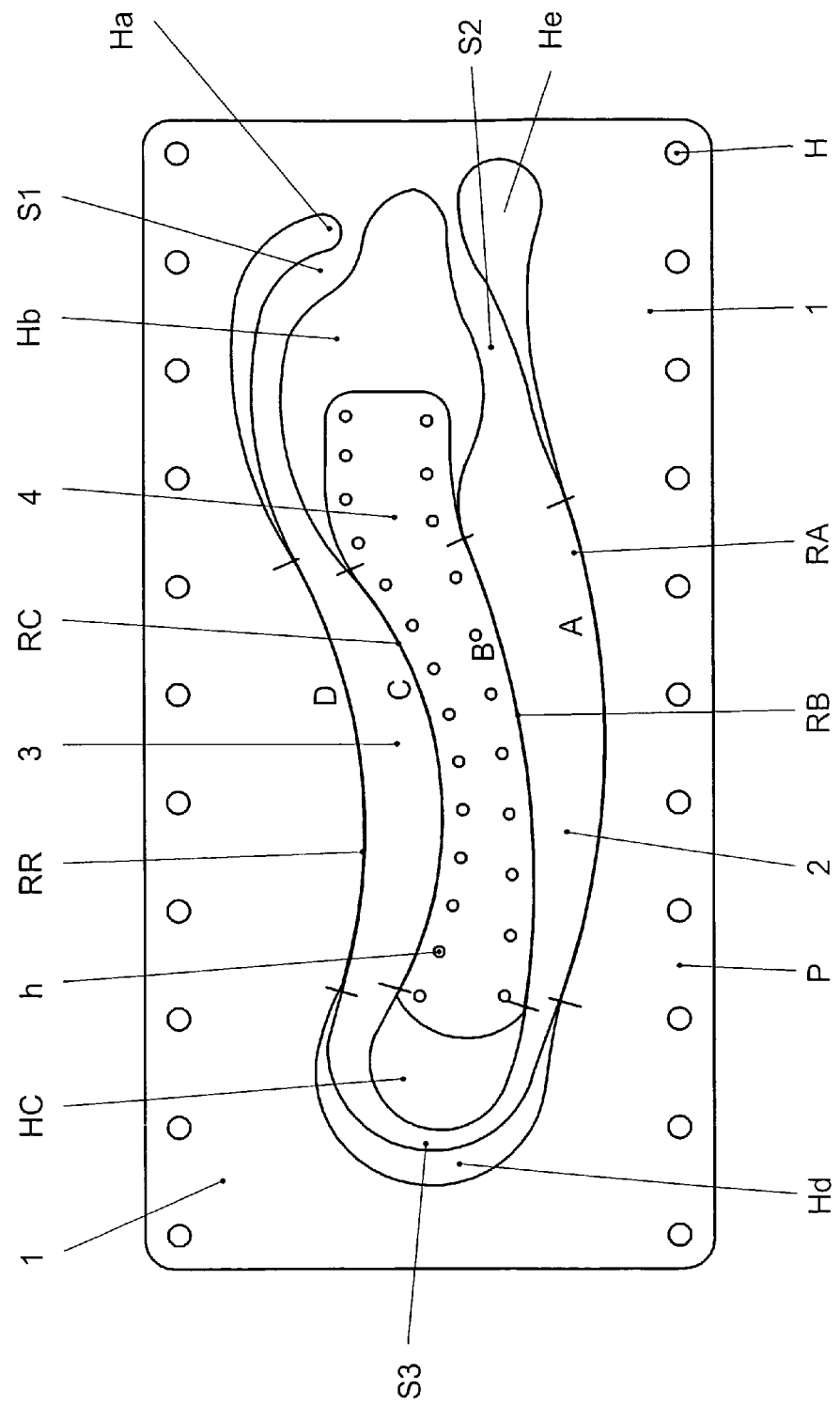

FIG. 2D depicts a spring of the same type but with differently formed regions with relatively large stiffness and ribs connecting these regions. Thus the spring is formed by applying Main Procedure and the geometry of its regions (RA), (RB), (RC) and (RD) of decreased stiffness is precisely the same as that in the case of the spring of FIGS. 2A-2C. All the regions (RA), (RB), (RC) and (RD) of decreased stiffness (in fact zero stiffness) are formed by cutting the plate (P) precisely along the circular arcs (LA), (LB), (LC) and (LD) respectively. Moreover five more holes (Ha), (Hb), (Hc), (Hd) and (He) are cut in the plate (P) of the spring. The boundary of the hole (Ha) is connected with the region (RA) of decreased stiffness; the boundary of the hole (Hc) is connected with the region (RD); the boundary of the hole (Hd) is connected with the regions (RA) and (RD) of decreased stiffness, and the boundary of the holes (Hb) and (He) is connected with the regions (RB) and (RC) of decreased stiffness. In fact, the holes (Ha), (Hc) and (Hd) and the regions (RA) and (RD) are preferably obtained by one continuous cutting. Similarly, the holes (Hb) and (He) and the regions (RB) and (RC) are preferably obtained by one continuous cutting.

Again, by forming the regions (RA), (RB), (RC) and (RD) of decreased stiffness and cutting the holes (Ha), (Hb), (Hc), (Hd) and (He), the regions (1), (2), (3) and (4) of relatively large stiffness and massive ribs (S1), (S2) and (S3) connecting the regions (1), (2) and (3) are also formed in the plate (P); thus the regions (1), (2) and (3) of large stiffness and the ribs (S1) (S2) and (S3) constitute a unique whole, and only the region (4) of large stiffness is entirely separated from the plate (P) in this instance.

Again, in order to obtain the complete progressive rate vehicle suspension unit using this spring ((see FIG. 2E (respectively 2F), which is a disassembled (respectively assembled) view of the suspension unit)), a vehicle's road wheel arm (Ar) is attached to the region (4) of large stiffness of the spring (S) so as to further increase stiffness of this region and preserve the piece (4) from being separated from the plate (P).

The road wheel (schematically indicated in FIGS. 2E and 2F as (RWh)) is pivotally mounted on the pin (PIN) attached to the arm (Ar). Holes (h) are bored in the plate (P) of the spring to enable the suspension unit to be attached (e.g. by riveting) to vehicle's (e.g. tank) body.

This type of suspension may be applied in any type of vehicles ranging from motorcycles and passenger cars to buses, heavy trucks and tractors, semi-trailers and special-purpose vehicles, but is particularly suitable for tanks and other high speed military vehicles as it is a progressive rate, compact and lightweight entirely externally mounted (and thus easy to be assembled/disassembled) suspension unit.

It is worth noting that this type of suspension unit can contribute to military vehicles safety as the spring plate (P) may serve as an additional layer of the vehicle armor.

As mentioned above, Discussion of the Work of the spring presented in Example 1 applies also to this Example (with minor and obvious alternations).

EXAMPLE 3

Figure 3A:
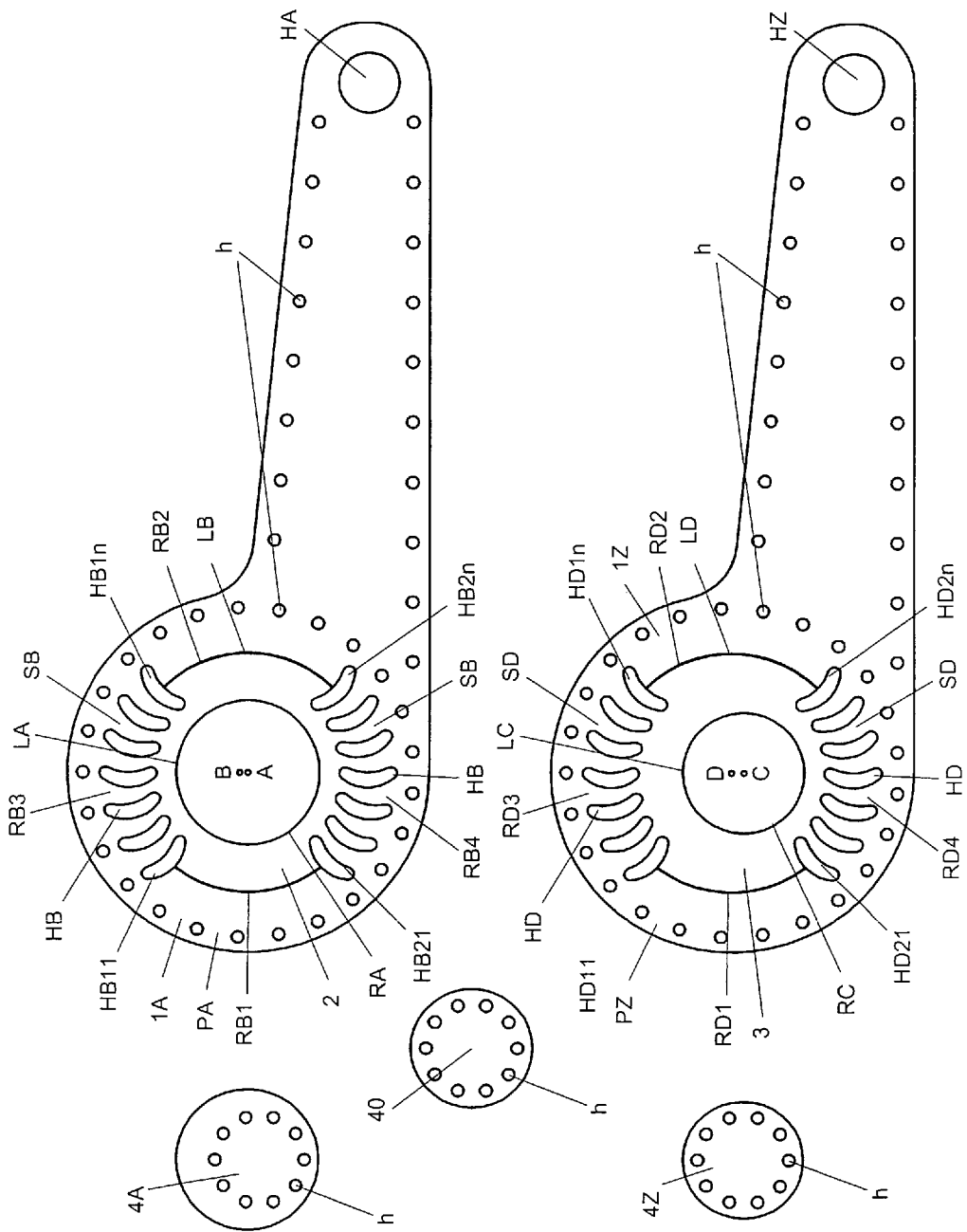
Figure 3C:
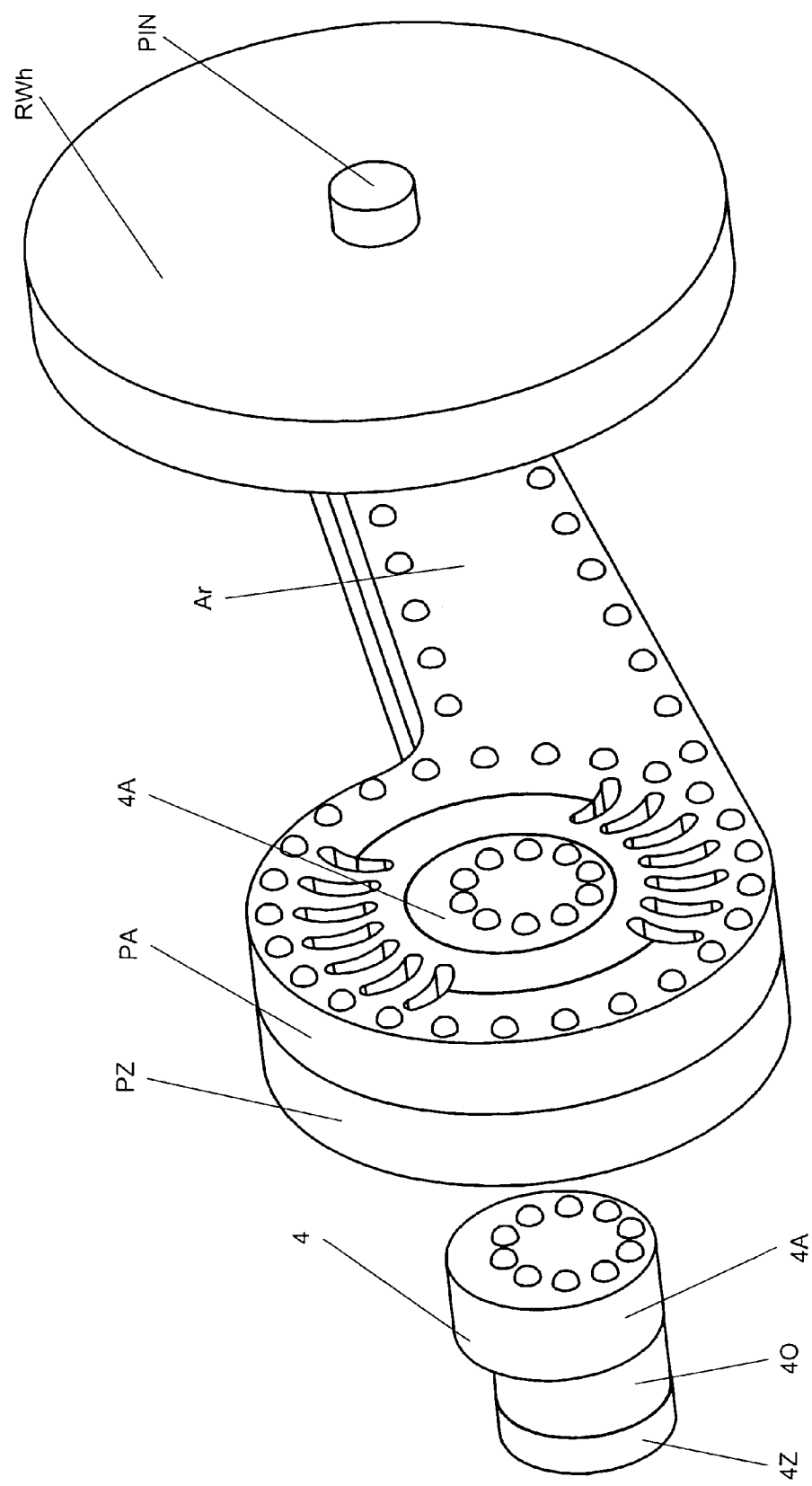

Referring to FIGS. 3A-3C there is shown another smooth progressive rate spring (S) obtained by applying Main Procedure as described above and a complete vehicle suspension unit utilizing this spring in accordance with the present invention.

Unlike the springs of Examples 1 and 2, this spring is formed using two plates (PA) and (PZ) made of spring steel. Both the plates (PA) and (PZ), of the same dimensions and structure, have substantially circular parts (in which regions of decreased stiffness are formed) and elongated parts intended to form the integral road wheel arm; this structure of the plates allows for further decreasing weight and dimensions of the complete suspension unit. This example is also intended to illustrate the method of introducing in the spring some initial internal stresses.

Two points (A) and (B) are fixed in the plane of the steel plate (PA), and two circles (LC) and (LB) with the center at the points (A) and (B) respectively are traced in the circular portion of the plate (PA). Two regions (RA) and (RB) of decreased stiffness are formed in the plate (PA). The regions (RA) and (RB) assume general form of the circles (LC) and (LB) respectively.

To be more precise, the region (RB) of decreased stiffness is composed of four sub-regions, namely the sub-region (RB1) obtained by cutting the plate (PA) along a portion (arc) of the circle (LB), sub-region (RB2) obtained by cutting the plate (PA) along another portion (arc) of the circle (LB), and the sub-regions (RB3) and (RB4) separating the sub-regions (RB1) and (RB2), both assuming the form of a collection of separate elongated holes (HB) separated by the ribs (SB); the holes (HB) and the ribs (SB) are placed substantially along the circle (LB). The pairs of the extreme holes (HB11), (HB21) and (HB1$n$), (HB2$n$) are connected with the sub-regions (RB1) and (RB2) respectively.

In this way, the plate (PA) is divided into two parts of relatively large strength (the part inside of the region (RA) and the part outside the region (RB)); the part (RB) itself has relatively small strength. Initial internal stresses in the region (RB) of the plate (PA) can be introduced by applying to the two parts of the plate (PA) of large strength suitable forces (e.g. by turning one of the parts relative the other part so as to deform the region (RB) of decreased strength beyond the elasticity limit).

The region (RA) (of zero stiffness) is obtained by cutting the plate (PA) precisely along the circle (LC).

Three regions (1A), (2) and (4A) of large stiffness are also formed in the plate (PA) (and the region (4A) is entirely separated from the plate (PA) in this instance.

The plate (PZ) of the spring is formed in a completely similar manner. Thus two points (C) and (D) are fixed in the plane of the steel plate (PZ), and two circles (LC) and (LD) with the center at the points (C) and (D) respectively are traced in the plate (PZ). Two regions (RC) and (RD) of decreased stiffness are formed in the circular portion of the plate (PZ). The regions (RC) and (RD) assume general form of the circles (LC) and (LD) respectively.

The region (RD) of decreased stiffness is composed of four sub-regions, namely the subregion (RD1) obtained by cutting the plate along a portion (arc) of the circle (LD), sub-region (RD2) obtained by cutting the plate along another portion (arc) of the circle (LD), and the sub-regions (RD3) and (RD4) separating the sub-regions (RD1) and (RD2), both assuming the form of a collection of separate elongated holes (HB) separated by the ribs (SB); the holes (HB) and the ribs (SB) are placed substantially along the arc (LD). The pairs of the extreme holes (HB11), (HB21) and (HB1$n$), (HB2$n$) are connected with the sub-regions (RD1) and (RD2) respectively.

In this way, the plate (PZ) is divided into two parts of relatively large strength (the part inside of the region (RC) and the part outside the region (RD)). Initial internal stresses in the region (RD) of the plate (PZ) can be introduced by applying to the two parts of large strength of the plate (PZ) suitable forces (e.g. by turning one of the parts relative the other part so as to deform the region (RD) beyond the elasticity limit).

The region (RC) (of zero stiffness) is obtained by cutting the plate (PZ) precisely along the circle (LC).

Three regions (1Z), (3) and (4Z) of large stiffness are also formed in the plate (PZ) (and the region (4Z) is entirely separated from the plate (PZ) in this instance).

Any two of the points (A), (B), (C) and (D) should not coincide when the plates (PA) and (PZ) are put together so as their silhouettes coincide.

The diameter of the element (4A) is larger than the diameter of the element (4Z) (see further comments below).

Holes (h) are bored in both the plates (PA) and (PZ) to accommodate rivets (Ri). The rivets (Ri) are used to rigidly connect the plates (PA) and (PZ) along their portions (1A) and (1Z) of large stiffness to form one plate (P) (regions (RB) and (RD) remain separated). Next a pin (PIN) is attached to the elongated portion of the plate (P) using holes (HA) and (HZ) to form a complete road wheel arm (Ar) (vehicle's road wheel is pivotally mounted on the pin (PIN)) (FIGS. 3B and 3C).

Similarly, holes (h) are bored in the elements (4A) and (4Z) and a spacer (40) to accommodate bolts (B1); using the bolts (B1) all the elements (4A), (4Z) and (40) are firmly joined to form a unique rigid element (4), and the whole suspension unit is attached to the vehicle (e.g. tank) body (not shown, FIGS. 3B and 3C).

By placing the element (4) in the plate (P) so as the portions (4A) and (4Z) of the element (4) are accommodated by their respective holes in the plates (PA) and (PZ) (this operation should precede at least one of the operations of joining the elements (4A), (4Z), (41) and (Ar) and joining the plates (PA), (PZ) and (PO) for geometrical reasons (recall that the diameter of the element (4Z) is larger than the diameter of the element (4A))) we get a complete suspension unit.

The reason for making the element (4A) of larger diameter than the diameter of the element (4Z) is that this readily preserves the vehicle road wheel arm from being separated from the vehicle body.

This type of suspension unit (completely externally mounted, easy to assemble/disassemble) is intended mainly for military vehicles e.g. tanks.

Again it is worth noting that this type of suspension unit can contribute to military vehicles safety as the spring plate (P) may serve as an additional layer of the vehicle armor.

EXAMPLE 4

Referring to FIGS. 4A-4C there is shown a smooth progressive rate spring (S) obtained by applying Main Procedure as described above and a complete tandem axle vehicle suspension unit utilizing this spring in accordance with the present invention.

Now, referring to FIG. 4A, the four points (A), (B), (C) and (D) (not shown) are fixed in the plane of the steel plate (P) (made of spring steel), and four circular arcs (LC), (LB), (LC) and (LD) (not shown) with the center at the points (A), (B), (C) and (D) respectively are traced in the plate (P). Four regions (RA), (RB), (RC) and (RD) of decreased stiffness are formed in the plate (P). The regions (RA), (RB), (RC) and (RD) assume general form of the circular arc (LC), (LB), (LC) and (LD) respectively.

To be more precise, the region (RA) of decreased stiffness is composed of three sub-regions, namely the sub-region (RA1) obtained by cutting the plate along a portion of the arc (LC), sub-region (RA2) obtained by cutting the plate along another portion of the arc (LC), and the sub-region (RA3) separating the sub-regions (RA1) and (RA2) and assuming the form of a collection of separate elongated holes (HA) separated by the ribs (SA); the holes (HA) and the ribs (SA) are placed substantially along the arc (LC). The extreme holes (HA1) and (HAn) are connected with the sub-regions (RA1) and (RA2) respectively.

Similarly, the region (RB) of decreased stiffness is composed of three sub-regions, namely the sub-region (RB1) obtained by cutting the plate along a portion of the arc (LB), sub-region (RB2) obtained by cutting the plate along another portion of the arc (LB), and the sub-region (RB3) separating the sub-regions (RB1) and (RB2) assuming the form of a collection of separate elongated holes (HB) separated by the ribs (SD); the holes (HB) and the ribs (SD) are placed substantially along the arc (LB). The extreme holes (HB1) and (HBn) are connected with the sub-regions (RB1) and (RB2) respectively.

The region (RC) (of zero stiffness) is obtained by cutting the plate (P) precisely along the arc (LC).

Similarly, the region (RD) (of zero stiffness) is obtained by cutting the plate (P) precisely along the arc (LD).

Another two holes (Ha) and (Hb) are cut in the plate (P) of the spring (S). In fact, the holes (Ha) and (Hb), the sub-regions (RA1) and (RA2), the sub-regions (RB1) and (RB2) and extreme holes (HA1), (HAn), (HB1) and (HBn) are preferably obtained by one continuous cutting.

By forming the regions (RA), (RB), (RC) and (RD) of decreased stiffness, the regions (1), (2), (3) and (4) of relatively large stiffness are also formed in the plate (P). Note that the region (2) of large stiffness constitutes a separate piece of the plate (P).

Additional (pairs of) suitably formed pieces (21) and (22), (31) and (32) and (41) and (42) (all assuming the general shape of their respective regions of large stiffness of the plate (P), see FIG. 4B) may be riveted to the regions (2), (3) and (4) of large stiffness respectively to further increase their stiffness and strength (holes h intended to accommodate the rivets are also readily visible in FIG. 4B; the rivets are not shown in this picture).

In order to obtain the complete progressive rate tandem axle vehicle suspension unit using this spring (see FIGS. 4C and 4D, which are a disassembled and an assembled view of the suspension unit respectively), a trailing road wheel arm (Ar2) is attached (preferably by riveting) to the region (4) of large stiffness of the spring (S), and another longitudinal arm (Ar1) is attached to the region (1) of large stiffness of the spring (S) (alternately, the arm (Ar1) can form a unique whole with the plate (P)). The arm (Ar2) is formed from two pieces (Ar21) and (Ar22) of the same structure. Both the pieces (Ar21) and (Ar22) are riveted together (using a suitable spacer (Sp2)) to form the complete rigid arm (Ar2) enclosing the plate (P) thus preventing the element (4) (and therefore the arm (Ar2)) from being separated from the suspension unit. The arm (Ar1) is formed in a completely analogous manner from two pieces (Ar11) and (Ar12) separated by the spacer (SP1).

In the plate (P) of the spring (S) the hole (H) intended for mounting pivotally the suspension unit to vehicle's frame (Fr) is bored. Two elements (E1) and (E2) (not shown) can be riveted to the plate (P) to reinforce the plate in the region of mounting.

Two more holes (HCR1) and (HCR2) intended for pivotally mounting control rods (CR1) and (CR2) are bored in the plate (P).

The tandem road wheels are schematically indicated in FIGS. 4C and 4D as (RWh1) and (RWh2).

This type of suspension unit is believed to have substantially better capacity to weight ratio that conventional tandem axle leaf spring suspension.

EXAMPLE 5

Referring to FIGS. 5A-5F there is shown another smooth progressive rate spring (S) obtained by applying Main Procedure as described above and a complete vehicle suspension unit utilizing this spring in accordance with the present invention.

Like the spring of Example 3, this spring is formed using two plates (PA) and (PZ) of the same dimensions both made of spring steel. An additional steel plate (PO) (not necessarily made of spring steel) is used to separate the two main plates (PA) and (PZ).

Two points (A) and (B) are fixed in the plane of the steel plate (PA), and a circle (LC) and two arcs (LB1) and (LB2) with the center at the points (A) and (B) respectively are traced in the plate (PA). Moreover two segments (Sg1) and (Sg2) connecting the ends of the arcs (LB1) and (LB2) are traced in the plate (PA). Next, two regions (RA) and (RB) of decreased stiffness are formed in the plate (PA).

The region (RA) (of zero stiffness) is obtained by cutting the plate (PA) precisely along the circle (LA).

The region (RB) of decreased stiffness (which assumes the general form of the figure (curve-linear trapezoid) composed of the arcs (LB1) and (LB2) and segments (Sg1) and (Sg2)) is composed of four sub-regions, namely the sub-region (RB1) obtained by cutting the plate along portions (arcs) of the arcs (LB1) and (LB2) and forming a cut-out (of substantially rectangular shape) joining both the arc-shaped cuts, the sub-region (RB2) obtained by cutting the plate along another portions of the arcs (LB1) and (LB2) and forming a cut-out (of substantially rectangular shape) joining both the arc-shaped cuts, and the sub-regions (RB3) and (RB4) (separating the sub-regions (RB1) and (RB2)) both assuming the form of a collection of separate elongated holes (HB3$i$) and (HB4$i$) separated by the ribs (SB31) and (SB4$i$) respectively; the holes (HB3$i$) and (HB4$i$) and the ribs (SB3$i$) and (SB3$i$) of the sub-regions (RB3) and (RB4) are placed substantially along the arcs (LB1) and (LB2) respectively. The pairs of the extreme holes (HB31), (HB41) and (HB3$n$), (HB4$n$) are connected with the sub-regions (RB1) and (RB2) respectively.

Three regions (1A), (2) and (4A) of large stiffness are also formed in the plate (PA) (and the region (4A) is entirely separated from the plate (PA) in this instance).

Similarly, two points (C) and (D) are fixed in the plane of the steel plate (PZ), and a circle (LC) and two arcs (LD1) and (LD2) with the center at the points (C) and (D) respectively are traced in the plate (PZ). Moreover two segments (Sg3) and (Sg4) connecting the ends of the arcs (LD1) and (LD2) are traced in the plate (PZ). Next, two regions (RC) and (RD) of decreased stiffness are formed in the plate (PZ).

The region (RC) (of zero stiffness) is obtained by cutting the plate (PZ) precisely along the circle (LC).

The region (RD) of decreased stiffness (which assumes the general form of the figure (curve-linear trapezoid) composed of the arcs (LD1) and (LD2) and segments (Sg3) and (Sg4)) is composed of four sub-regions, namely the sub-region (RD1) obtained by cutting the plate along portions (arcs) of the arcs (LD1) and (LD2) and forming a cut-out (of substantially rectangular shape) joining both the arc-shaped cuts, the sub-region (RD2) obtained by cutting the plate along another portions of the arcs (LD1) and (LD2) and forming a cut-out (of substantially rectangular shape) joining both the arc-shaped cuts, and the sub-regions (RD3) and (RD4) separating the sub-regions (RD1) and (RD2), both assuming the form of a collection of separate elongated holes (HD3$i$) and (HD4$i$) separated by the ribs (SD3$i$) and (SD4$i$) respectively; the holes (HD3$i$) and (HD4$i$) and the ribs (SD3$i$) and (SD4$i$) of the sub-regions (RD3) and (RD4) are placed substantially along the arcs (LD1) and (LD2) respectively. The pairs of the extreme holes (HD31), (HD41) and (HD3$n$), (HD4$n$) are connected with the sub-regions (RD1) and (RD2) respectively.

Three regions (1Z), (3) and (4Z) of large stiffness are also formed in the plate (PZ) (and the region (4Z) is entirely separated from the plate (PZ) in this instance).

Any two of the points (A), (B), (C) and (D) should not coincide when the plates (PA) and (PZ) are put together so as their silhouettes coincide.

The diameter of the element (4Z) is larger than the diameter of the element (4A) (see further comments below for reasons for choosing such diameters)).

From the plate (PO) a circular element (41) is cut off; the diameter of the element equals the diameter of the region (4A) (this condition is not an essential for the characteristic of the spring).

Holes (h) are bored in all the plates (PA), (PZ) and (PO) to accommodate bolts (BL). The bolts (BL) are used to rigidly connect the plates (PA), (PZ) and (PO) (along the regions (1A) and (1Z) of large stiffness of the plates (PA) and (PZ); regions (RB) and (RD) remains separated) to form one plate (P), as well as to anchor the suspension unit in vehicle's (e.g. tank's) body (FIGS. 5A-5D).

Similarly, holes (h) (not shown) are bored in the elements (4A), (4Z) and (41) and a road wheel arm (Ar) to accommodate rivets; using the rivets the elements (4A), (4Z) and (41) and the road wheel arm (Ar) are firmly joined to form a unique rigid element (4) (FIG. 5C).

By placing the element (4) in the plate (P) so as the portions (4A), (4Z) and (41) of the element (4) are accommodated by their respective holes in the plates (PA), (PZ) and (41) (this operation should precede at least one of the operations of joining the elements (4A), (4Z), (41) and (Ar) and joining the plates (PA), (PZ) and (PO) for geometrical reasons (recall that the diameter of the element (4Z) is larger than the diameter of the element (4A))) we get a complete suspension unit.

The reason for making the element (4Z) of larger diameter than the diameter of the element (4A) is that this readily preserves the element (4) (and thus the vehicle road wheel) from being separated from the vehicle body.

This type of suspension unit is intended mainly for military vehicles e.g. tanks.

Again it is worth noting that this type of suspension unit can contribute to military vehicles safety as the spring plate (P) may serve as an additional layer of the vehicle armor.

FIGS. 5E-5F show a suspension unit (intended for buses and passenger cars) utilizing the spring described above. Thus the whole description above applies to this suspension unit, and the only difference is that a transverse forked arm (Ar) replaces the trailing arm of the previous suspension unit and two control rods (CR1) and (CR2) are pivotally mounted in the plates (PA) and (PZ) respectively.

EXAMPLE 6

FIGS. 6A-6E and 6F-6H show two variants of a smooth progressive rate spring in accordance with the present invention of substantially the same geometry as the spring of Example 5, however, unlike in the case of the previously presented springs, (some of) the regions of decreased stiffness of the spring are formed by deep drawing. Another important difference is that the two plates (PA) and (PZ) of the spring are formed of plurality of thin sheets (PAi) and (PZi) (made of spring steel and joined by rivets) respectively (i=1, 2, . . . n). This structure of the plates (PA) and (PZ) is intended to facilitate forming the regions of decreased stiffness by deep drawing.

FIGS. 6A-6E depict the first version of the spring composed of a plurality of thin separate sheets.

The structure of all the sheets (PAi) of the plate (PA) is the same and the same description applies to all these sheets. Thus two points (A) and (B) are fixed in the plane of the sheet (PA1), and a circle (LA) and two arcs (LB1) and (LB2) with the center at the points (A) and (B) respectively are traced in the plate (PA). Moreover two segments (Sg1) and (Sg2) connecting the ends of the arcs (LB1) and (LB2) are traced in the sheet (PA1). Next, two regions (RA) and (RB) of decreased stiffness are formed in the sheet (PA1).

The region (RA) (of zero stiffness) is obtained by cutting the sheet (PA1) precisely along the circle (LA).

The region (RB) of decreased stiffness (which assumes the general form of the figure (curve-linear trapezoid) composed of the arcs (LB1) and (LB2) and segments (Sg1) and (Sg2)) is composed of four sub-regions, namely the sub-region (RB3) obtained by cutting the sheet (PA1) of the plate (PA) along the arc (LB1), the sub-region (RB4) obtained by cutting the sheet (PA1) along the arc (LB2), and the sub-regions (RB1) and (RB2) separating the sub regions (RB1) and (RB2), both assuming the form of a bulge (or fold) and formed by deep drawing (preceded by heating of suitable regions of the sheet (PA1)) placed substantially along the segments (Sg1) and (Sg2) respectively.

As mentioned above, the structure of all other sheets (PAi) of the plate (PA) of the spring is completely analogous.

Three regions (1Ai), (2i) and (4Ai) of large stiffness are also formed in the sheets (PAi) (and the regions (4Ai) are separated from their respective sheets (Pai) in this instance).

The structure of all the sheets (PZi) of the plate (PZ) is the same and the same description applies to all these sheets. Thus two points (C) and (D) are fixed in the plane of the sheet (PZ1), and a circle (LC) and two arcs (LD1) and (LD2) with the center at the points (C) and (D) respectively are traced in the plate (PZ). Moreover two segments (Sg3) and (Sg4) connecting the ends of the arcs (LD1) and (LD2) are traced in the sheet (PZ1). Next, two regions (RC) and (RD) of decreased stiffness are formed in the sheet (PZ1).

The region (RC) (of zero stiffness) is obtained by cutting the sheet (PZ1) precisely along the circle (LC).

The region (RD) of decreased stiffness (which assumes the general form of the figure (curve-linear trapezoid) composed of the arcs (LD1) and (LD2) and segments (Sg3) and (Sg4)) is composed of four sub-regions, namely the sub-region (RD3) obtained by cutting the plate (PZ) along the arc (LD1), the sub-region (RD4) obtained by cutting the plate along the arc (LD2), and the sub-regions (RD1) and (RD2) separating the sub-regions (RD1) and (RD2), both assuming the form of a bulge (or fold) and formed by deep drawing (preceded by heating of suitable regions of the sheet (PZ1)) placed substantially along the segments (Sg3) and (Sg4) respectively.

The structure of all other sheets (PZi) of the plate (PZ) of the spring is completely analogous.

Three regions (1Zi), (3ii) and (4Z) of large stiffness are also formed in the sheets (PZi) (and the regions (4Zi) are separated from their respective sheets (Pzi) in this instance).

Any two of the points (A), (B), (C) and (D) should not coincide when the plates (PA) and (PZ) are put together so as their silhouettes coincide.

Holes (h) are bored in all the sheets of the plates (PA) and (PZ) to accommodate rivets (Ri). The rivets (Ri) (not shown) are used to rigidly connect all the sheets of the plates (PA) and (PZ) along their regions of large stiffness (1Ai) and (1Zi) to form one plate (P) (the regions (Rai) and (RCi), (RBi) and (RDi) remain separated).

Similarly, holes (h) (not shown) are bored in the regions (4Ai) and (4Zi) of all the sheets (Pai) and (Pzi) to accommodate rivets; using the rivets the regions (4Ai) and (4Zi) and the element (4O) are all firmly joined to form a unique rigid region (4) (FIG. 6C).

A road wheel arm (Ar) is attached to the region (4) of large stiffness to form a complete vehicle suspension unit (FIGS. 6D-6E).

FIGS. 6F-6H show a variant of the spring where also the regions (RA) and (RC) are formed by deep drawing. The maximum allowable flex of this spring is smaller than that of the previous one.

Again the structure of all the sheets (PAi) of the plate (PA) is the same and the same description applies to all these sheets. Thus two points (A) and (B) are fixed in the plane of the sheet (PA1), and a circle (LA) and two arcs (LB1) and (LB2) with the center at the points (A) and (B) respectively are traced in the plate (PA). Moreover two segments (Sg1) and (Sg2) connecting the ends of the arcs (LB1) and (LB2) are traced in the sheet (PA1). Next, two regions (RA) and (RB) of decreased stiffness are formed in the sheet (PA1).

The region (RA) (of non-zero stiffness) is obtained by forming (by deep drawing preceded by heating of a suitable region of the sheet (PA1)) a bulge (or fold) (BlgA) in the sheet (PA1) precisely along the circle (LA).

The region (RB) of decreased stiffness (which assumes the general form of the figure (curve-linear trapezoid) composed of the arcs (LB1) and (LB2) and segments (Sg1) and (Sg2)) is composed of four sub-regions, namely the sub-region (RB3) obtained by cutting the sheet (PA1) of the plate (PA) along the arc (LB1), the sub-region (RB4) obtained by cutting the sheet (PA1) along the arc (LB2), and the sub-regions (RB1) and (RB2) separating the sub-regions (RB1) and (RB2), both assuming the form of a bulge (or fold) and formed by deep drawing (preceded by heating of suitable regions of the sheet (PA1)) placed substantially along the segments (Sg1) and (Sg2) respectively.

As mentioned above, the structure of all other sheets (PAi) of the plate (PA) of the spring is completely analogous.

Three regions (1Ai), (2i) and (4Ai) of large stiffness are also formed in the sheets (PAi) (and all the regions form a unique whole in this instance).

The structure of all the sheets (PZi) of the plate (PZ) is the same and the same description applies to all these sheets. Thus two points (C) and (D) are fixed in the plane of the sheet (PZ1), and a circle (LC) and two arcs (LD1) and (LD2) with the center at the points (C) and (D) respectively are traced in the plate (PZ). Moreover two segments (Sg3) and (Sg4) connecting the ends of the arcs (LD1) and (LD2) are traced in the sheet (PZ1). Next, two regions (RC) and (RD) of decreased stiffness are formed in the sheet (PZ1).

The region (RC) (of non-zero stiffness) is obtained by forming (by deep drawing preceded by heating of a suitable region of the sheet (PC1)) a bulge (or fold) (BlgC) in the sheet (PZ1) precisely along the circle (LC).

The region (RD) of decreased stiffness (which assumes the general form of the figure (curve-linear trapezoid) composed of the arcs (LD1) and (LD2) and segments (Sg3) and (Sg4)) is composed of four sub-regions, namely the sub-region (RD3) obtained by cutting the plate (PZ) along the arc (LD1), the sub-region (RD4) obtained by cutting the plate along the arc (LD2), and the sub-regions (RD1) and (RD2) separating the sub-regions (RD1) and (RD2), both assuming the form of a bulge (or fold) and formed by deep drawing (preceded by heating of suitable regions of the sheet (PZ1)) placed substantially along the segments (Sg3) and (Sg4) respectively.

The structure of all other sheets (PZi) of the plate (PZ) of the spring is completely analogous.

Three regions (1Zi), (3i) and (4Zi) of large stiffness are also formed in the sheets (PZi) (all the regions form a unique whole in this instance).

Any two of the points (A), (B), (C) and (D) should not coincide when the plates (PA) and (PZ) are put together so as their silhouettes coincide.

Holes (h) are bored in all the sheets of the plates (PA) and (PZ) to accommodate rivets (Ri). The rivets (Ri) (not shown) are used to rigidly connect all the sheets of the plates (PA) and (PZ) along their regions of large stiffness (1Ai) and (1Zi) to form one plate (P) (the regions (Rai) and (RCi), (RBi) and (RDi) remain separated).

Similarly, holes (h) (not shown) are bored in the regions (4Ai) and (4Zi) of all the sheets (Pai) and (Pzi) to accommodate rivets; using the rivets the regions (4Ai) and (4Zi) and the element (4O) are all firmly joined to form a unique rigid region (4) (FIG. 6H).

Like in the previous instances, a road wheel arm (and possibly control rods) can be attached to the region (4) of large stiffness to form a complete vehicle suspension unit.

EXAMPLE 7

Referring to FIGS. 7A-7F, there is shown another smooth progressive rate spring and suspension unit in accordance with the present invention. It differs from the springs/suspension units of all the previous examples in that it is obtained by Main Procedure, in which one of the points (A), (B), (C) and (D) is placed at infinity. The spring is formed from two plates (PA) and (PZ) made of spring steel.

Two points (A) and (B) are fixed in the plane of the steel plate (PA), and two circles (LA) and (LB) with the center at the points (A) and (B) respectively are traced in the plate (PA). The point (C) is placed at infinity (non-visible). Two straight segments (arcs of circles of infinite radius and the center placed at the point (C)) (LC1) and (LC2) (not shown) are traced in the plate (PA); additionally two more straight segments (LC3) and (LC4) (not shown) joining the ends of the segments (LC1) and (LC2) are traced in the plate (PA). Three regions (RA), (RB) and (RC) of decreased stiffness are formed in the plate (PA). The regions (RA) and (RB) assume general form of the circles (LA) and (LB) respectively, and the region (RC) assumes the general form of the rectangle formed by the segments (LC1), (LC2), (LC3) and (LC4).

To be more precise, the region (RA) (of zero stiffness) is obtained by cutting the plate (PA) precisely along the circle (LA).

The region (RB) of decreased stiffness is composed of four sub-regions, namely the sub-region (RB1) obtained by cutting the plate (PA) along a portion (arc) of the circle (LB), sub-region (RB2) obtained by cutting the (PA) plate along another portion (arc) of the circle (LB), and the sub-regions (RB3) and (RB4) separating the sub-regions (RB1) and (RB2), both assuming the form of a collection of separate elongated holes (HB3i) and (HB4i) separated by the ribs (SB3i) and (SB4i) respectively; the holes (HB3i) and (HB4i) and the ribs (SB3i) and (SB4i) are placed substantially along (a portion of) the circle (LB). The pairs of the extreme holes (HB31), (HB41) and (HB3n), (HB4n) are connected with the sub-regions (RB1) and (RB2) respectively.

The region (RC) of decreased stiffness is composed of four sub-regions, namely the sub-region (RC1) obtained by cutting the plate (PA) along the segment (LC1), sub-region (RC2) obtained by cutting the plate (PA) along the segment (LC2), and the sub-regions (RC3) and (RC4) separating the sub-regions (RC1) and (RC2), both assuming the form of a collection of separate elongated holes (HC3i) and (HC4i) separated by the ribs (SB3i) and (SB4i) respectively; the holes (HC3i) and (HC4i) and the ribs (SB3i) and (SB4i) are placed substantially along the segments (LC3) and (LC4) respectively. The pairs of the extreme holes (HC31), (HC41) and (HC3n), (HC4n) are connected with the sub-regions (RC1) and (RC2) respectively.

Four regions (1A), (21), (3) and (4) of large stiffness are also formed in the plate (PA) (and the region (2A) is entirely separated from the plate (PA) in this instance).

A point (D) is fixed in the plate (PZ) and a circle (LD) with the center at the point (D) is traced in said plate. The region (RD) of decreased stiffness is formed in the plate (PZ) by cutting it precisely along the circle (LD).

Two regions (1Z) and (22) of large stiffness are also formed in the plate (PZ) (and the region (22) is entirely separated from the plate (PZ) in this instance).

Any two of the points (A), (B), (C) and (D) should not coincide when the plates (PA) and (PZ) are put together so as their silhouettes coincide (in particular none of the points (A), (B) and (D) should not be placed at infinity).

The diameter of the region of large stiffness (22) is larger than the diameter of the region of large stiffness (21) (see further comments below).

Holes (h) are bored in both the plates (PA) and (PZ) to accommodate bolts (BL). The bolts (BL) are used to rigidly connect the plates (PA) and (PZ) to form one plate (P), as well as to anchor the suspension unit in vehicle's body (FIG. 7C).

Similarly, holes (h) (not shown) are bored in the elements (21) and (22) and a road wheel arm (Ar) to accommodate rivets; using the rivets both the elements (21) and (22) and the road wheel arm (Ar) are firmly joined to form a unique rigid element (2) (FIGS. 7A-7B).

By placing the element (2) in the plate (P) so as the portions (21) and (22) of the element (2) are accommodated by their respective holes in the plates (PA) and (PZ) (this operation should precede at least one of the operations of joining the elements (21), (22) and (Ar) and joining the plates (PA) and (PZ) for geometrical reasons (recall that the diameter of the element (22) is larger than the diameter of the element (21))) we get a complete suspension unit.

The reason for making the element (22) of larger diameter than the diameter of the element (21) is that this readily preserves the element (2) (and thus the vehicle road wheel) from being separated from the vehicle body.

Substantially the same structure has the spring depicted in FIGS. 7D-7F, and the description above almost literally applies to it. The only major difference is that this spring is intended for being loaded by external force applied to the region (4) of large stiffness (thus allowing the element exerting on the spring the external force to move along a straight line; see FIG. 7F, where (F) is the external force loading the spring). Thus an additional element (41), intended for applying the external load to, be riveted to the region of large stiffness (4). Another difference is that the regions (RC3) and (RC4) of decreased stiffness are both made in the form of cutout placed along the arcs (LC3) and (LC4) respectively rather than in the form of collection of holes and ribs.

EXAMPLE 8

Referring to FIGS. 8A-8H, there is shown another smooth progressive rate spring and suspension unit using this spring in accordance with the present invention. It differs from the springs/suspension units of all the previous examples in that it is not obtained by Main Procedure as described above, however it is based on the principal Observations as described above, and the process of producing the spring comprises the fundamental step (step (d) of Main Procedure) of forming in an elastic body regions of decreased stiffness.

The spring (and complete suspension unit) in question is formed from a massive plate (P) made of spring steel. In the plate (P) three regions (R1), (R2) and (R3) of decreased stiffness are formed. In FIG. 8A (O1) indicates the symmetry axis of the plate (P); the axis (O1) is perpendicular to the plane of the plate (P). Two circles (L2) and (L3) are traced on the two opposite sides of the plate (P) (FIGS. 8B-8C). The center of the circle (L2) lies in the axis (O1), while the center of the circle (L3) is placed on another axis (O2) perpendicular to the plane of the plate (P) displaced relative the axis (O1) by a magnitude (d).

The region (R1) (FIGS. 8A, 8D-8H) is composed of two (circular) holes (R11) and (R12) and a plain cutting (Cu) joining the holes (R11) and (R12). The axis of symmetry of each of these holes is substantially perpendicular to the axis (O1). The cutting (Cu) is formed along a plane (P1) inclined relative the axis (O1) at an ("small") angle (Ang) (FIG. 8A).

The region (R2) (FIGS. 8A, 8D-8H) is formed of a collection of suitable S-shaped holes (H2i) separated by ribs (S2i); the holes (H2i) and (ribs (S2i) are placed substantially along the circle (L2) and extend as far as the plane (P1).

The region (R3) (FIGS. 8A, 8D-8H) is formed of a collection of suitable S-shaped holes (H3i) separated by ribs (S3i); the holes (H3i) and ribs (S3i) are placed substantially along the circle (L3) and extend as far as the plane (P1).

In this way, also three regions (1), (2) and (3) of large stiffness are formed in the plate (P) of the spring.

In principle, this type of spring features large capacity and stiffness and small allowable deflections. The spring characteristic cannot be optimized (e.g. exponential-like characteristic cannot be obtained) due to particular (simplified in comparison with other springs presented in this patent specification) pattern of regions of decreased stiffness.

The maximum allowable deflection of the spring can be substantially increased (and stiffness and capacity of the spring decreased) by making the region (R2) (respectively (R3)) in the form of continuous cuttings along the (truncated) cone based on the circle (L2) (respectively (L3)) and having the axis (O1) (respectively (O2)) as its axis of symmetry. In this way we get the regions (2) and (3) of great stiffness, which form two separate elements. Conical shape of the regions (2) and (3) preserves the elements (2) and (3) from being separated from the spring plate (P) (FIG. 8H).

In order to obtain a complete suspension unit, a road wheel arm (Ar) is bolted to the region (2) of large stiffness; also a flange (F) intended for mounting the suspension unit to vehicle's frame is bolted to the plate (P) of the spring (FIG. 8G).

This type of suspension unit is intended mainly for application in heavy road vehicles, the road wheels of which are subjected only to relatively small deflections.

EXAMPLE 9

Referring to FIGS. 9A-9H, there is shown yet another smooth progressive rate (steel) spring and suspension unit using this spring in accordance with the present invention, which significantly differs from the springs/suspension units of all the Examples 1-8. Namely, the springs of all the Examples 1-8 are "flat" springs in the sense that all the regions of decreased stiffness are placed in the same plane (Examples 1, 2, 4, 7) or in parallel planes (Examples 3, 5, 6, 8). The spring (according to the invention) of the present example is a "spatial" spring in the sense that some of its regions of decreased stiffness lie in non-parallel planes; thus this spring has a more complicated pattern of regions of decreased stiffness. Externally this spring is similar to that of Example 8. Introducing this more complicated pattern of regions of decreased stiffness in the spring of the present Example is intended to overcome disadvantages of the spring of Example 8. Thus the characteristic of the spring of the present Example can be varied within broad limits, and can be optimized and made substantially exponential, and the spring can combine large capacity with large deflections.

The spring is made of a thick wedge-shaped suitably rounded plate (P) (made of spring steel) having two plain surfaces (P2) and (P3) inclined at an (non-zero) angle (Ang) (not shown) (FIGS. 9A-9C and 9F-9H). Two circles (L2) and (L3) are traced in the planes (P2) and (P3) respectively (FIGS. 9D and 9E respectively).

There are five regions (R1)-(R5) of decreased stiffness formed in the plate (P) of the spring (FIGS. 9A-9C and 9F-9H).

The region (R1) of decreased stiffness is formed by boring two (circular) holes (R11) and (R12) in the plate (P); axes of symmetry of both the holes are substantially parallel to the planes (P2) and (P3).

The region (R5) of decreased (zero) stiffness is formed by making a cutting of the plate (P) precisely along a plane (P21) inclined at a non-zero angle (Ang2) (not shown) relative the plane (P2). The region (R5) (i.e. the cutting) extends from the hole (R11) to the hole (R12).

The region (R2) (FIGS. 9B and 9D) of decreased stiffness assumes the general form of circle (L2) and is formed of four sub-regions (R21), (R22), (R23) and (R24). The sub regions (R21) and (R22) are both formed by cutting the plate (P) (on the side of the plane (P2)) precisely along two separate arcs of the circle (L2). The sub-regions (R23) and (R24) both assume general form of circular segment, and are formed by cutting (on the side of the plane (P2) of the steel plate (P)) two collections of holes (H23) and (H24) along two separate segments of the circle (L2). The holes (H23) (respectively (H24)) are separated by ribs (S23) (respectively (S24)). The cuttings (R21) and (R22) and holes (H23) and (H24) all extend from the plane (P2) to the plane (P21).

The region (R4) of decreased stiffness is formed in a slightly more complicated manner. First, a circular hole (Ho4) is bored in the plate (P) on the side of the plane (P3); the axis of symmetry of the hole (Ho4) is perpendicular to the plane (P3) of the steel plate (P). Next, two separate plain cuttings (Cu41) and (Cu42) are made (e.g. by wire cutting) along a plane (P31) inclined at a non-zero angle (Ang3) (not shown) relative the plane (P3); the cutting (Cu41) extends from the hole (R11) to the hole (Ho4), and the cutting (Cu42) extends from the hole (R12) to the hole (Ho4) (FIG. 9A).

Finally, two collections of S-shaped holes (H41) are cut along the cylindrical surface of the hole (Ho4); the extreme holes of both the collections are joined with the cuttings (Cu41) and (Cu42) (FIG. 9A).

The region (R3) (FIGS. 9C and 9E) of decreased stiffness assumes the general form of circle (L3) and is formed of four sub-regions (R31), (R32), (R33) and (R34). The sub regions (R31) and (R32) are both formed by cutting the plate (P) (on the side of the plane (P3)) precisely along two separate arcs of the circle (L3). The sub-regions (R33) and (R34) both assume general form of circular segment, and are formed by cutting (on the side of the plane (P3) of the steel plate (P)) two collections of holes (H33$i$) and (H34$i$) along two separate segments of the circle (L3). The holes (H33$i$) (respectively (H34$i$)) are separated by ribs (S33$i$) (respectively (S34$i$)). The cuttings (R31) and (R32) and holes (H33$i$) and (H34$i$) all extend from the plane (P3) to the plane (P31).

In this way four regions (1), (2), (3) and (4) of larger stiffness are formed in the spring plate (P).

Alternately (FIGS. 9G and 9H), the region (R2) may assume the general form of truncated cone based on the circle (L2), and is formed by making a plain cutting (R5) of the plate (P) along the plane (P21) inclined at a non-zero angle (Ang2) relative the plane (P2) (the cutting (R5) extends from the hole (R11) to the hole (R21)), and then cutting the plate (P) along a cone (C2); the axis of symmetry of the cone (C2) is perpendicular to the plane (P2). Thus an element (2) (a region of large stiffness) is completely cut out of the spring plate (P) in this instance. This method of forming the region (R2) is intended to increase road wheel articulation (this can be achieved when the road wheel is coupled with the region (2) of large stiffness).

In the plate of the spring in question (FIGS. 9G and 9H) on the side of the plane (P2) also another region (R6) of decreased stiffness is formed. The region (R6) assumes the general form of two circular arcs (segments of the circle (L2) traced in the plane (P2) of the plate (P)) and is composed of two collections of holes (H61) separated by ribs (S6$i$) placed along these two arcs. The holes (H6$i$) placed along the two arcs extend from the plane (P2) to the holes (R11) and (R12). The role of the region (R6) is to diminish the overall stiffness of the spring.

A complete suspension unit (FIG. 9H) is obtained e.g. by attaching a road wheel arm (Ar) to the region (2) of large stiffness and possibly attaching a flange (Fl) (not shown) (intended to attach the suspension unit to vehicle's frame) to the region (3) of large stiffness.

This kind of the spring/suspension unit is not easy to manufacture, however is believed to be not merely an illustration of the general principles behind the present invention due to it's unique features (compactness, high capacity combined with large deflection of road wheel, and possibility of its characteristic to be optimized).

EXAMPLE 10

Referring to FIGS. 10A-10D, there is shown yet another smooth progressive rate (steel) "spatial" spring and suspension unit using this spring in accordance with the present invention. This example is intended to illustrate a method of producing "spatial" progressive rate steel springs in accordance with the present invention that is substantially simpler and cheaper that those of Examples 8 and 9.

There is a straight line (L) traced in a massive plate (P) (made of spring steel); line (L) divides plate (P) into two parts (PA) and (PZ).

Two points (A) and (B) (not shown) are fixed in the part (PA) of the steel plate (P), and an ellipse (LA) and a circle (LB) with the center at the points (A) and (B) respectively are traced in the part (PA) of the plate (P). An angle (Ang1) (not shown) is chosen. Two regions (RA) and (RB) of decreased stiffness are formed in the part (PA) of the plate (P). The regions (RA) and (RB) assume general form of the ellipse (LA) and the circle (LB) respectively.

To be more precise, the region (RA) (of zero stiffness) is obtained by cutting the portion (PA) of the plate (P) precisely along the ellipse (LA). This is achieved by inclining the cutting tool (e.g. the laser beam) at the suitable angle (Ang1) (not shown) relative the plane of the steel plate (P).

The region (RB) of decreased stiffness is composed of four sub-regions, namely the sub-region (RB1) obtained by cutting the plate (P) along a portion (arc) of the circle (LB), sub-region (RB2) obtained by cutting the plate along another portion (arc) of the circle (LB), and the subregions (RB3) and (RB4) separating the sub-regions (RB1) and (RB2), both assuming the form of a collection of separate elongated holes (HB) separated by the ribs (SB); the holes (HB) and the ribs (SB) are placed substantially along (segments of) the circle (LB). The pairs of the extreme holes (HB11), (HB21) and (HBIn), (HB2$n$) are connected with the sub-regions (RB1) and (RB2) respectively.

Three regions (1A), (2) and (4A) of large stiffness are also formed in the portion (PA) of the plate (P) (and the region (4A) is entirely separated from the plate (P) in this instance).

Similarly, two points (C) and (D) (not shown) are fixed in the part (PZ) of the steel plate (P), and an ellipse (LC) and a circle (LD) with the center at the points (C) and (D) respectively are traced in the part (PZ) of the plate (P). An angle (Ang2) (not shown) is chosen. Two regions (RC) and (RD) of decreased stiffness are formed in the part (PZ) of the plate (P). The regions (RC) and (RD) assume general form of the ellipse (LC) and the circle (LD) respectively.

To be more precise, the region (RC) (of zero stiffness) is obtained by cutting the portion (PC) of the plate (P) precisely along the ellipse (LC). This is achieved by inclining the cutting tool (e.g. the laser beam) at the suitable angle (Ang2) relative the plane of the steel plate (P).

The region (RD) of decreased stiffness is composed of four sub-regions, namely the sub-region (RD1) obtained by cutting the plate along a portion (arc) of the circle (LD), sub-region (RD2) obtained by cutting the plate along another portion (arc) of the circle (LD), and the sub-regions (RD3) and (RD4) separating the sub-regions (RD1) and (RD2), both assuming the form of a collection of separate elongated holes (HD) separated by the ribs (SD); the holes (HD) and the ribs (SD) are placed substantially along (segments of) the circle (LD). The pairs of the extreme holes (HD11), (HD21) and (HDIn), (HD2$n$) are connected with the sub-regions (RD1) and (RD2) respectively.

Three regions (1Z), (3) and (4Z) of large stiffness are also formed in the portion (PZ) of the plate (P) (and the region (4Z) is entirely separated from the plate (P) in this instance).

The region (RO) of decreased stiffness (e.g. in the form of groove) is formed in the plate (P) along the line (L).

The region (4) of large stiffness is formed e.g. by riveting the elements (4A), (4Z) and a suitably shaped additional element (40) separating the elements (4A) and (4Z) (FIG. 10D).

The spring plate (P) is bended along the region (RO) of decreased stiffness so as the portions (PA) and (PZ) of the plate (P) are positioned at a suitably chosen (non-zero) angle (Ang). In this way, initial internal stresses can be introduced within the region (RO).

By placing the element (4) in the plate (P) so as the portions (4A) and (4Z) of the element (4) are accommodated by their respective holes in the portions (PA) and (PZ) of the plate (P) and attaching a road wheel arm (Ar) to the region (or element) (4) of large stiffness we get a complete suspension unit (FIGS. 10C and 10D)

EXAMPLE 11

Referring to FIGS. 11A-11D there is shown a smooth progressive rate spring (S) with adaptable spring characteristic obtained by applying Main Procedure 1 as described in section Summary of the Invention and a complete vehicle suspension unit utilizing this spring, both in accordance with the present invention.

This spring corresponds to the spring of Example 1 in the sense that it is obtained from a spring of this type by choosing an additional point (E) and forming in the spring plate a region (RE) of decreased stiffness corresponding to this point. Thus the geometry of its main regions of decreased stiffness (RA), (RB), (RC) and (RD) of the spring of the present Example is completely analogous to that of the spring of Example 1.

Now, referring to FIGS. 11A-11B, five points (A), (B), (C), (D) and (E) are fixed in the plane of the steel plate (P) (made of spring steel), and five circular arcs (LA), (LB), (LC), (LD) and (LE) with the center at the points (A), (B), (C), (D) and (E) respectively are traced in the plate (P). Five regions (RA), (RB), (RC), (RD) and (RE) of decreased stiffness are formed in the plate (P). The regions (RA), (RB), (RC), (RD) and (RE) assume general form of the circular arc (LA), (LB), (LC), (LD) and (LE) respectively.

To be more precise, the region (RA) (of zero stiffness; in other words the elasticity coefficient of this region equals zero) is obtained by cutting the plate (P) precisely along the arc (LA).

Similarly, the region (RE) (of zero stiffness) is obtained by cutting the plate (P) precisely along the arc (LE).

All the regions (RB), (RC) and (RD) have similar structure.

Thus the region (RB) of decreased stiffness is composed of three sub-regions, namely the sub-region (RB1) obtained by cutting the plate precisely along a portion of the arc (LB), sub-region (RB2) obtained by cutting the plate precisely along another portion of the arc (LB), and the sub-region (RB3) separating the sub-regions (RB1) and (RB2) assuming the form of a collection of separate elongated holes (HB) separated by the ribs (SB); the holes (HB) and the ribs (SB) are placed substantially along the arc (LB). The extreme holes (HB1) and (HBn) are connected with the sub-regions (RB1) and (RB2) respectively.

The region (RC) of decreased stiffness is composed of three sub-regions, namely the sub-region (RC1) obtained by cutting the plate precisely along a portion of the arc (LC), sub-region (RC2) obtained by cutting the plate precisely along another portion of the arc (LC), and the sub-region (RC3) separating the sub-regions (RC1) and (RC2) assuming the form of a collection of separate elongated holes (HC) separated by the ribs (SC); the holes (HC) and the ribs (SC) are placed substantially along the arc (LC). The extreme holes (HC1) and (HCn) are connected with the sub-regions (RC1) and (RC2) respectively.

Similarly, the region (RD) of decreased stiffness is composed of three sub-regions, namely the sub-region (RD1) obtained by cutting the plate along a portion of the arc (LD), sub-region (RD2) obtained by cutting the plate along another portion of the arc (LD), and the sub-region (RD3) separating the sub-regions (RD1) and (RD2) assuming the form of a collection of separate elongated holes (HD) separated by the ribs (SD); the holes (HD) and the ribs (SD) are placed substantially along the arc (LD). The extreme holes (HD1) and (HDn) are connected with the sub-regions (RD1) and (RD2) respectively.

Another two holes (Ha) and (Hb) are cut in the plate (P) of the spring. In fact, the holes (Ha) and (Hb), the regions (RE) and (RA), the sub-regions (RD1) and (RD2) and extreme holes (HD1) and (HDn), the sub-regions (RC1) and (RC2) and extreme holes (HC1) and (HCn) and the sub-regions (RB1) and (RB2) and extreme holes (HB1) and (HBn) are preferably obtained by one continuous cutting.

By forming the regions (RA), (RB), (RC), (RD) and (RE) of decreased stiffness, the regions (1), (2), (3), (4) and (5) of relatively large stiffness are also formed in the plate (P). Note that the region (5) of large stiffness constitutes a separate piece of the plate (P).

In order to obtain the complete progressive rate vehicle suspension unit using this spring (see FIGS. 11C-11D), a vehicle's road wheel arm (Ar) is attached (preferably by riveting) to the region (2) of large stiffness of the spring (S), and a control rod (CR) is pivotally mounted in the plate of the spring (S). Holes (h) are bored in the plate (P) of the spring to enable the suspension unit to be attached (e.g. by riveting) to vehicle's frame. The road wheel (not shown) is pivotally mounted on the pin (PIN) (not shown) attached to the arm (Ar).

Figure 11D:
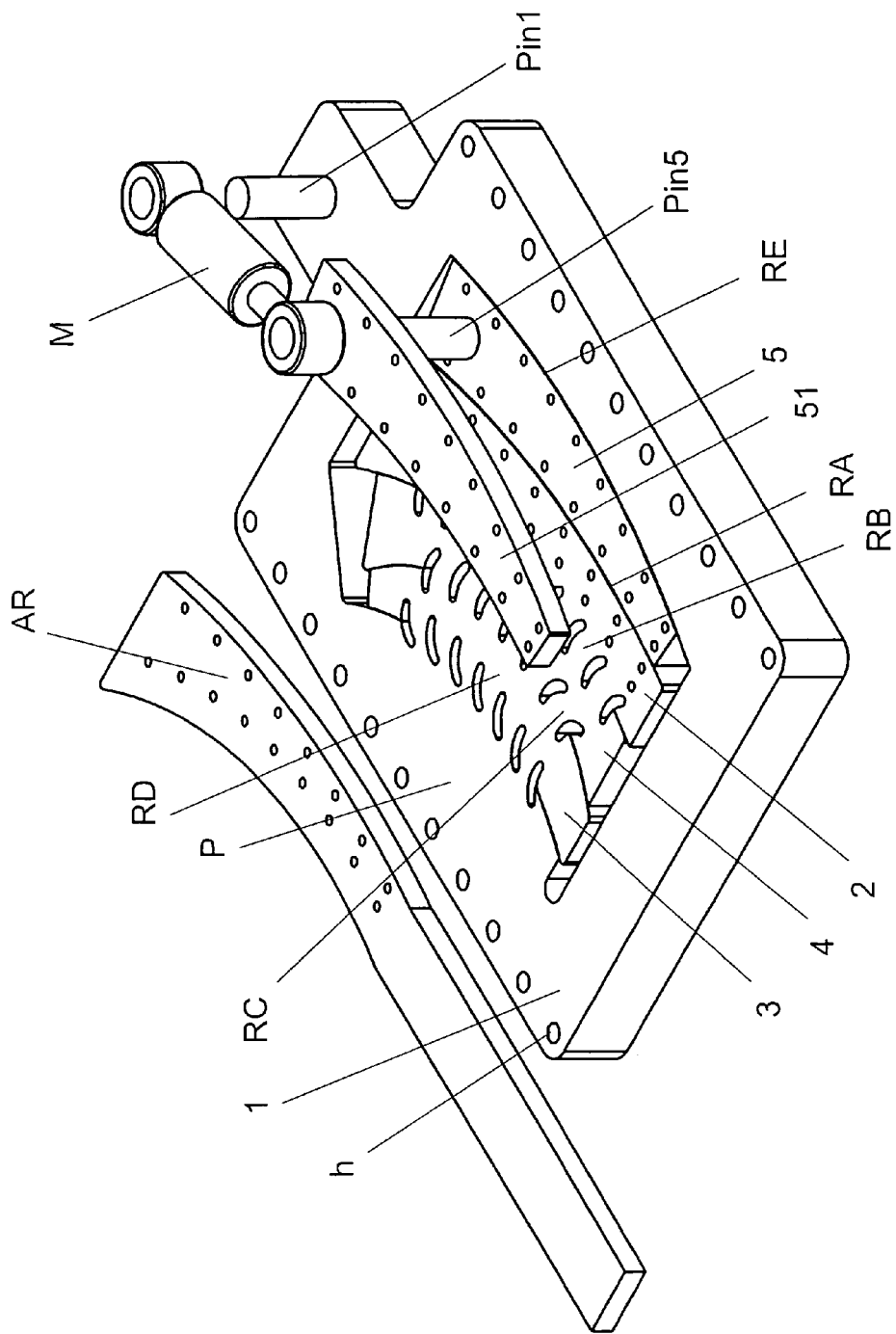

To enable the spring characteristic to be adaptable to changing conditions we apply Step (g) of Main Procedure 1, namely attach a hydraulic motor (M) to the spring plate (P). To be more precise, one end of the motor (M) is fastened to the region (1) of large stiffness with the help of a pin (Pin1), which is accommodated in a hole (h1) bored in the region (1) of large stiffness of the spring. The other end of the motor is fastened to the region (5) of large stiffness through an additional element (51) riveted to the region (5) with the help of a pin (Pin5), which is accommodated in a hole (h5) bored in the region (5) of large stiffness of the spring (FIGS. 11C-11D). The role of the motor is two-fold: First, to keep fixed the configuration (initial geometry and initial internal stresses) of the regions (RA), (RB), (RC) and (RD) of decreased stiffness of the spring (and thus to keep fixed the spring characteristic and the damping characteristic of the suspension unit) under fixed conditions (fixed vehicle's weight and fixed terrain). Second, to vary configuration of the spring and thus adjust its characteristic to changing conditions.

Thus, at a fixed position of the hydraulic motor (M), the configuration (geometry of the regions (RA), (RB), (RC) and (RD) and initial internal stresses within these regions) of the spring is fixed and therefore its characteristic is fixed. In these fixed conditions the work of the spring is precisely the same as the spring with a fixed (non-adaptable) characteristic (see Example 1). By actuating the hydraulic motor (M) we change the position of the region (5) of large stiffness thus deforming the spring and changing its configuration (initial geometry of the regions (RA), (RB), (RC) and (RD) and initial internal stresses within these regions) and thus changing its characteristic and adjusting it to changing conditions. In this way we obtain a spring with adaptable characteristic, as claimed.

Range of variability of spring characteristic depends on the position of the additional point (E) (and maximum force the motor (M) can produce), and is precisely predictable (there are suitable mathematical formulas). Specific shape of the spring characteristics within the compass depend on the position of the points (A), (B), (C) and (D) and all the other parameters having effects on the characteristic of the spring obtained by applying Main Procedure and therefore is precisely predictable.

Essentially the same Discussion applies to the Example 12 presented below.

EXAMPLE 12

FIG. 12A-12C shows a spring with adaptable characteristic substantially of the type of Example 11 with an alternative form of the regions (RA), (RB), (RC), (RD) and (RE) with decreased stiffness; this spring is an "adaptable" variant of the spring of Example 2. Combination of the descriptions of Examples 2 and 11 applies almost literally to this spring with only minor changes.

Thus five points (A), (B), (C), (D) and (E) are fixed in the plane of the steel plate (P) (made of spring steel), and five circular arcs (LA), (LB), (LC) and (LD) with the center at the points (A), (B), (C), (D) and (E) respectively are traced in the plate (P). (These two operations are completely analogous to these of Example 11, and therefore the points (A), (B), (C) and (D) and the arcs (LA), (LB), (LC) and (LD) are not shown in the accompanying Figs . . . ). Five regions (RA), (RB), (RC), (RD) and (RE) of decreased stiffness are formed in the plate (P). The regions (RA), (RB), (RC), (RD) and (RE) assume general form of the circular arc (LA), (LB), (LC), (LD) and (LE) respectively.

To be more precise, all the regions (RA), (RB), (RC), (RD) and (RE) of decreased stiffness (in fact zero stiffness in this instance) are formed by cutting the plate (P) precisely along the circular arcs (LA), (LB), (LC), (LD) and (LE) respectively. Moreover four more holes (Ha), (Hb), (Hc) and (Hd) are cut in the plate (P) of the spring; the boundary of the holes (Ha) and (Hd) is connected with the regions (RA) and (RE) of decreased stiffness; the boundary of the holes (Hb) and (Hc) is connected with the regions (RB) and (RC) of decreased stiffness. In fact, the holes (Ha) and (Hd) and the regions (RA) and (RE) are preferably obtained by one continuous cutting. Similarly, the holes (Hb) and (Hc) and the regions (RB) and (RC) are preferably obtained by one continuous cutting.

By forming the regions (RA), (RB), (RC), (RD) and (RE) of decreased stiffness and cutting the holes (Ha), (Hb), (Hc) and (Hd), the regions (1), (2), (3), (4) and (5) of relatively large stiffness and massive ribs (S1) and (S2) connecting the regions (2) and (3) are also formed in the plate (P); thus the regions (2) and (3) of large stiffness and the ribs (S1) and (S2) constitute a unique whole in this instance, and this whole is separated from the plate (P). Similarly, the regions (4) and (5) of large stiffness are entirely separated from the plate (P).

Again, in order to obtain the complete progressive rate vehicle suspension unit using this spring (see FIGS. 11B-11C), a vehicle's road wheel arm (Ar) is attached to the region (4) of large stiffness of the spring (S) so as to further increase stiffness of this region and preserve the pieces (4) and (2)-(3)-(S1)-(S2) from being separated from the plate (P).

The road wheel (schematically indicated in FIGS. 12B and 12C as (RWh)) is pivotally mounted on the pin (PIN) attached to the arm (Ar). Holes (h) are bored in the plate (P) of the spring to enable the suspension unit to be attached (e.g. by riveting) to vehicle's (e.g. tank) body.

To enable the spring characteristic to be adaptable to changing conditions we apply Step (g) of Main Procedure 1, namely attach a hydraulic motor (M) to the spring plate (P). To be more precise, one end of the motor (M) is fastened to the region (1) of large stiffness and the other end of the motor is fastened to the region (5) of large stiffness (pins accommodated in holes bored in the regions (1) and (5) of large stiffness are used like in Example 11). Like in Example 11, the role of the motor is two-fold. Its first role is to keep fixed the initial configuration of the spring, that is to say the initial geometry of the regions (RA), (RB), (RC) and (RD) of decreased stiffness of the spring and the initial internal stresses within the ribs (S1) and (S2) (and thus to keep fixed the spring characteristic and the damping characteristic of the suspension unit) under fixed conditions (fixed vehicle's weight and fixed terrain). The second role of the hydraulic motor (M) is to vary configuration of the spring and thus adjust its characteristic to changing conditions.

As mentioned above, the rest of the discussion of the work of this spring is completely analogous to that of the spring of Example 11 and thus is omitted.

Suspensions of the types presented in Examples 11 and 12 are intended for vehicles that operate in strongly varying conditions, e.g. the weight of which varies within broad limits and which have to move both on roads and in heavy terrain.

Essentially the same method as that presented in Examples 11 and 12 can be applied to convert any of the springs of Examples 1-7 (and in fact any spring obtained by applying Main Procedure) into a spring with adaptable characteristic.

FIG. 13 show some spring characteristics of the springs according to the invention; in this figure F is the spring force and x stands for spring deflection. The figure in the middle of the sheet show an "exponential like" characteristic of a spring obtained by applying Main Procedure (the steeper graph) as compared with the graph of an exponential function kexp (Cx). This kind of "exponential like" springs is of particular interest as they would be optimal for various applications (e.g. for suspensions for vehicles, the weight of which vary within broad limit during operation process).

The foregoing description discloses twelve preferred embodiments of the invention. One skilled in the art will readily recognize from this description and from the accompanying figures and patent claims, that many changes and modifications can be made to the preferred embodiments without departing from the true spirit, scope and nature of the inventive concepts as defined in the following patent claims.

What I claim is:

1. A method for producing springs with non-linear differentiable dependence of the absolute value of the external force |F| loading the spring on the spring deflection δ from an elastic solid body comprising at least the step of choosing values of the continuous parameters d, l, m, w in the following formula $$|F|=1/r[\Gamma_{12}{}^1 k_{12}(\delta-\delta_0)+\Gamma_{24}{}^1 k_{24}(\alpha-\alpha_0)+\Gamma_{34}{}^1 k_{34}(\beta-\beta_0)+\Gamma_{13}{}^1 k_{13}(\gamma-\gamma_0)]$$

wherein:

$$\Gamma_{12}{}^1=-1;$$

$$\Gamma_{24}{}^1=dl\sin\gamma/-dl\sin\gamma+dw\cos\delta\sin\gamma+dw\sin\delta\cos\gamma;$$

$$\Gamma_{34}{}^1=lw\sin\gamma/-dl\sin\gamma+dw\cos\delta\sin\gamma+dw\sin\delta\cos\gamma;$$

$$\Gamma_{13}{}^1=-dw\cos\delta\sin\gamma-dw\sin\delta\cos\gamma+lw\sin\delta/-dl\sin\gamma+dw\cos\delta\sin\gamma+dw\sin\delta\cos\gamma;$$

r is the arm of the force F.

2. The method according to claim 1, wherein γ, α and β are functions of the deflection δ given by the following formulas:

$$\gamma(\delta)=\gamma_1(\delta)+\gamma_2(\delta);$$

$$\gamma_1(\delta)=\arcsin(w\sin\delta/\sqrt{l^2+w^2-2lw\cos\delta});$$

$$\gamma_2(\delta)=\arc\sin(m/\sqrt{l^2+w^2-2lw\cos\delta}$$
$$\sqrt{1-(d^2-l^2+m^2-w^2+2lw\cos\delta/2dm)^2});$$

$$\alpha(\delta)=\alpha_1(\delta)+\alpha_2(\delta);$$

$$\alpha_1(\delta)=\arc\sin(l\sin\delta/\sqrt{l^2+w^2-2lw\cos\delta});$$

$$\alpha_2(\delta)=\arc\sin(d/\sqrt{l^2+w^2-2lw\cos\delta}$$
$$\sqrt{1-(d^2-l^2+m^2-w^2+2lw\cos\delta/2dm)^2});$$

$$\beta(\delta)=\arc\cos(d^2-l^2+m^2-w^2+2lw\cos\delta/2dm);$$

and $\alpha_0$, $\beta_0$, $\gamma_0$ are initial values of the parameters $\alpha$, $\beta$, $\gamma$ respectively corresponding to the initial value $\delta_0$ of the parameter $\delta$.

3. The method according to claim 1, comprising at least the step of choosing a plane intersecting said elastic body and four points $A_1$, $A_2$, $A_3$, $A_4$ placed in said plane, wherein l is the distance between the points $A_1$, $A_2$, w is the distance between the points $A_1$, $A_4$, d is the distance between the points $A_2$, $A_3$, and m is the distance between points $A_3$, $A_4$.

4. The method according to claim 3, comprising at least the step of tracing in said elastic body 4 circular arcs $C_1$, $C_2$, $C_3$, $C_4$ with centers at the points $A_1$, $A_2$, $A_3$, $A_4$ respectively.

5. The method according to claim 4, comprising at least the step of forming in said elastic body 4 regions $R_1$, $R_2$, $R_3$, $R_4$ of diminished stiffness placed substantially along the arcs $C_1$, $C_2$, $C_3$, $C_4$ respectively.

6. The method according to claim 5, wherein $k_{12}$ is the global torsional stiffness of the region $R_1$, $k_{24}$ is the global torsional stiffness of the region $R_2$, $k_{34}$ is the global torsional stiffness of the region $R_3$, and $k_{13}$ is the global torsional stiffness of the region $R_4$.

7. The method according to claim 5, wherein the step of forming regions of diminished stiffness comprises at least one of the following steps (a)-(d):
  a. the step of cutting holes in some regions of said elastic body;
  b. the step of heat treatment of some regions of said elastic body;
  c. the step of chemical treatment of some regions of said elastic body;
  d. the step of increasing stiffness of some regions of said elastic body by attaching to these regions additional elements.

8. The method according to claim 5, the method comprising the step of introducing initial internal stresses in said regions $R_1$, $R_2$, $R_3$, $R_4$ of diminished stiffness.

9. A spring with non-linear differentiable characteristic and made of elastic solid materials, wherein the dependence of the absolute value $|F|$ of the force loading the spring on the spring deflection $\delta$ is given by the following formula:

$$|F|=1/r[\Gamma_{12}^1 k_{12}(\delta-\delta_0)+\Gamma_{24}^1 k_{24}(\alpha-\alpha_0)+\Gamma_{34}^1 k_{34}(\beta-\beta_0)+\Gamma_{13}^1 k_{13}(\gamma-\gamma_0)]$$

wherein:

$$\Gamma_{12}^1=-1;$$

$$\Gamma_{24}^1=dl\sin\gamma/-dl\sin\gamma+dw\cos\delta\sin\gamma+dw\sin\delta\cos\gamma;$$

$$\Gamma_{34}^1=lw\sin\gamma/-dl\sin\gamma+dw\cos\delta\sin\gamma+dw\sin\delta\cos\gamma;$$

$$\Gamma_{13}^1=-dw\cos\delta\sin\gamma-dw\sin\delta\cos\gamma+lw\sin\delta/-dl\sin\gamma+dw\cos\delta\sin\gamma+dw\sin\delta\cos\gamma;$$

r is the arm of the force F;
wherein $\gamma$, $\alpha$ and $\beta$ are functions of the deflection $\delta$ given by the following formulas:

$$\gamma(\delta)=\gamma_1(\delta)+\gamma_2(\delta);$$

$$\gamma_1(\delta)=\arc\sin(w\sin\delta/\sqrt{l^2+w^2-2lw\cos\delta});$$

$$\gamma_2(\delta)=\arc\sin(m/\sqrt{l^2+w^2-2lw\cos\delta}$$
$$\sqrt{1-(d^2-l^2+m^2-w^2+2lw\cos\delta/2dm)^2});$$

$$\alpha(\delta)=\alpha_1(\delta)+\alpha_2(\delta);$$

$$\alpha_1(\delta)=\arc\sin(l\sin\delta/\sqrt{l^2+w^2-2lw\cos\delta});$$

$$\alpha_2(\delta)=\arc\sin(d/\sqrt{l^2+w^2-2lw\cos\delta}$$
$$\sqrt{1-(d^2-l^2+m^2-w^2+2lw\cos\delta/2dm)^2});$$

$$\beta(\delta)=\arc\cos(d^2-l^2+m^2-w^2+2lw\cos\delta/2dm);$$

$\alpha_0$, $\beta_0$, $\gamma_0$ are initial values of the parameters $\alpha$, $\beta$, $\gamma$ respectively corresponding to the initial value $\delta_0$ of the parameter $\delta$; d, l, m, w are certain continuous parameters.

10. The spring according to claim 9, wherein said spring has 4 regions $R_1$, $R_2$, $R_3$, $R_4$ of diminished stiffness placed substantially along some circular arcs $C_1$, $C_2$, $C_3$, $C_4$ respectively with centers at some points $A_1$, $A_2$, $A_3$, $A_4$ respectively.

11. The spring according to claim 10, wherein l is the distance between the points $A_1$, $A_2$, w is the distance between the points $A_1$, $A_4$, d is the distance between the points $A_2$, $A_3$, and m is the distance between the points $A_3$, $A_4$.

12. The spring according to claim 10, wherein $k_{12}$ is the global torsional stiffness of the region $R_1$, $k_{24}$ is the global torsional stiffness of the region $R_2$, $k_{34}$ is the global torsional stiffness of the region $R_3$, and $k_{13}$ is the global torsional stiffness of the region $R_4$.

13. The spring according to claim 10, wherein initial internal stresses are introduced in said regions $R_1$, $R_2$, $R_3$, $R_4$ of diminished stiffness.

* * * * *